US012326684B2

(12) United States Patent
Suzuki et al.

(10) Patent No.: US 12,326,684 B2
(45) Date of Patent: Jun. 10, 2025

(54) IMAGE FORMING SYSTEM

(71) Applicant: CANON KABUSHIKI KAISHA, Tokyo (JP)

(72) Inventors: Takahiro Suzuki, Saitama (JP); Ryota Fujioka, Chiba (JP); Yoshiro Tsukada, Chiba (JP); Kenichiro Kitajima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/890,452

(22) Filed: Aug. 18, 2022

(65) Prior Publication Data

US 2023/0069158 A1 Mar. 2, 2023

(30) Foreign Application Priority Data

Aug. 26, 2021 (JP) ................................ 2021-138073

(51) Int. Cl.
*G03G 15/00* (2006.01)

(52) U.S. Cl.
CPC .................... *G03G 15/6582* (2013.01); *B65H 2301/5126* (2013.01); *B65H 2401/13* (2013.01); *B65H 2801/27* (2013.01)

(58) Field of Classification Search
CPC ............ B65H 2401/13; B65H 2801/03; B65H 2801/27; B65H 43/04; B65H 37/06; B65H 2511/413; B65H 43/03
See application file for complete search history.

(56) References Cited

U.S. PATENT DOCUMENTS 5,313,256 A * 5/1994 Bov, Jr. .............. G03G 15/6582 399/2
9,959,492 B2 * 5/2018 Saito .................. G03G 15/6585
2009/0034998 A1 * 2/2009 Omata ............... G03G 15/6585 399/45
2013/0036886 A1 * 2/2013 Kato ........................ B65H 7/10 271/227

(Continued)

FOREIGN PATENT DOCUMENTS

EP 2578405 A1 * 4/2013 ......... B32B 37/0046
JP 2012123323 A 6/2012

(Continued)

*Primary Examiner* — Jennifer Bahls
(74) *Attorney, Agent, or Firm* — Canon U.S.A., Inc., IP Division

(57) ABSTRACT

An image forming system includes an image forming apparatus including an image forming unit and a first control unit which controls the image forming unit, a varnish application apparatus provided downstream in a sheet conveyance direction with respect to the image forming apparatus and including a varnish application unit which applies varnish to a sheet and a second control unit which controls the varnish application unit, and a sheet conveyance apparatus provided between the image forming apparatus and the varnish application apparatus in the sheet conveyance direction and including a receiving roller which receives a sheet discharged from the image forming apparatus, a processing unit which performs predetermined processing on a sheet present in the sheet conveyance apparatus, and a third control unit which controls the processing unit, wherein the first control unit is capable of communicating with the second control unit and the third control unit.

6 Claims, 24 Drawing Sheets

(56) References Cited

U.S. PATENT DOCUMENTS

| | | | | |
|---|---|---|---|---|
| 2014/0042686 | A1* | 2/2014 | Konishi | G03G 21/1652<br>270/58.31 |
| 2016/0360053 | A1* | 12/2016 | Suzuki | B31F 1/07 |
| 2018/0063348 | A1* | 3/2018 | Anezaki | G03G 15/6582 |
| 2024/0019805 | A1* | 1/2024 | Yamada | G03G 15/5041 |

FOREIGN PATENT DOCUMENTS

| | | | | |
|---|---|---|---|---|
| JP | 2018-069669 | A | 5/2018 | |
| JP | 2021103265 | A | 7/2021 | |
| WO | WO-2011145028 | A1 * | 11/2011 | B41F 11/02 |

* cited by examiner

IMAGE FORMING SYSTEM

BACKGROUND OF THE INVENTION

Field of the Invention

Aspects of the present invention generally relate to an image forming system which performs varnish application processing on a sheet with a toner image formed thereon.

Description of the Related Art

Recently, image forming apparatuses of the electrophotographic system using toner, taking advantage of the suitability for small lots and the feature of variable data printing, have been entering into the production printing market, in which offset printing machines have ever been dominant. In the production printing market, to heighten the additional value of a printed product, processing for treating a sheet surface for the purpose of addition of gloss, surface protection, or decoration is being performed by performing varnish application processing on a printed product obtained by an image forming apparatus. Varnish is a coating composed primarily of a resin and a solvent, and has differences in features, such as a hardening method and durability, depending on types thereof such as water-based varnish, oil-based varnish, and ultraviolet (UV) varnish.

Moreover, in the production printing market, while performing processing other than printing on a printed product in a conveyance path independent of a printing process is called offline, performing processing other than printing on a printed product in a conveyance path continuous with a printing process is called inline Japanese Patent Application Laid-Open No. 2018-69669 discusses a configuration which performs varnish application processing inline.

However, In the image forming system of the inline type, in the case of performing both varnish application processing and processing other than varnish application processing on a sheet subjected to image formation, depending on the content of processing, performing varnish application processing may cause the occurrence of, for example, a decrease in quality of a printed product or a decrease in productivity due to a conveyance failure.

SUMMARY OF THE INVENTION

Aspects of the present invention are generally directed to providing an image forming system which performs varnish application processing and processing other than varnish application processing inline on a sheet with an image formed thereon by an image forming apparatus and which is capable of preventing or reducing, for example, a decrease in quality of a printed product or a decrease in productivity due to a conveyance failure.

According to an aspect of the present invention, an image forming system includes an image forming apparatus including an image forming unit configured to form an image on a sheet and a first control unit configured to control the image forming unit, a varnish application apparatus provided downstream in a sheet conveyance direction with respect to the image forming apparatus, the varnish application apparatus including a varnish application unit configured to apply varnish to a sheet and a second control unit configured to control the varnish application unit, and a sheet conveyance apparatus provided between the image forming apparatus and the varnish application apparatus in the sheet conveyance direction, the sheet conveyance apparatus including a receiving roller configured to receive a sheet discharged from the image forming apparatus, a processing unit configured to perform predetermined processing on a sheet present in the sheet conveyance apparatus, and a third control unit configured to control the processing unit, wherein the first control unit is capable of communicating with the second control unit and the third control unit.

According to another aspect of the present invention, an image forming system includes an image forming apparatus including an image forming unit configured to form an image on a sheet and a first control unit configured to control the image forming unit, a varnish application apparatus provided downstream in a sheet conveyance direction with respect to the image forming apparatus, the varnish application apparatus including a varnish application unit configured to apply varnish to a sheet with an image formed thereon by the image forming unit and a second control unit configured to control the varnish application unit, and a sheet processing apparatus provided downstream in the sheet conveyance direction with respect to the varnish application apparatus, the sheet processing apparatus including a receiving roller configured to receive a sheet discharged from the varnish application apparatus, a processing unit configured to perform predetermined processing on a sheet received by the receiving roller, and a third control unit configured to control the processing unit, wherein the first control unit is capable of communicating with the second control unit and the third control unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

However, for example, the dimension, quality of material, shape, and relative location of each constituent component described in each exemplary embodiment should not be construed to limit the scope of the present invention to only those, unless, particularly, there is a specific description.

Figure 1:
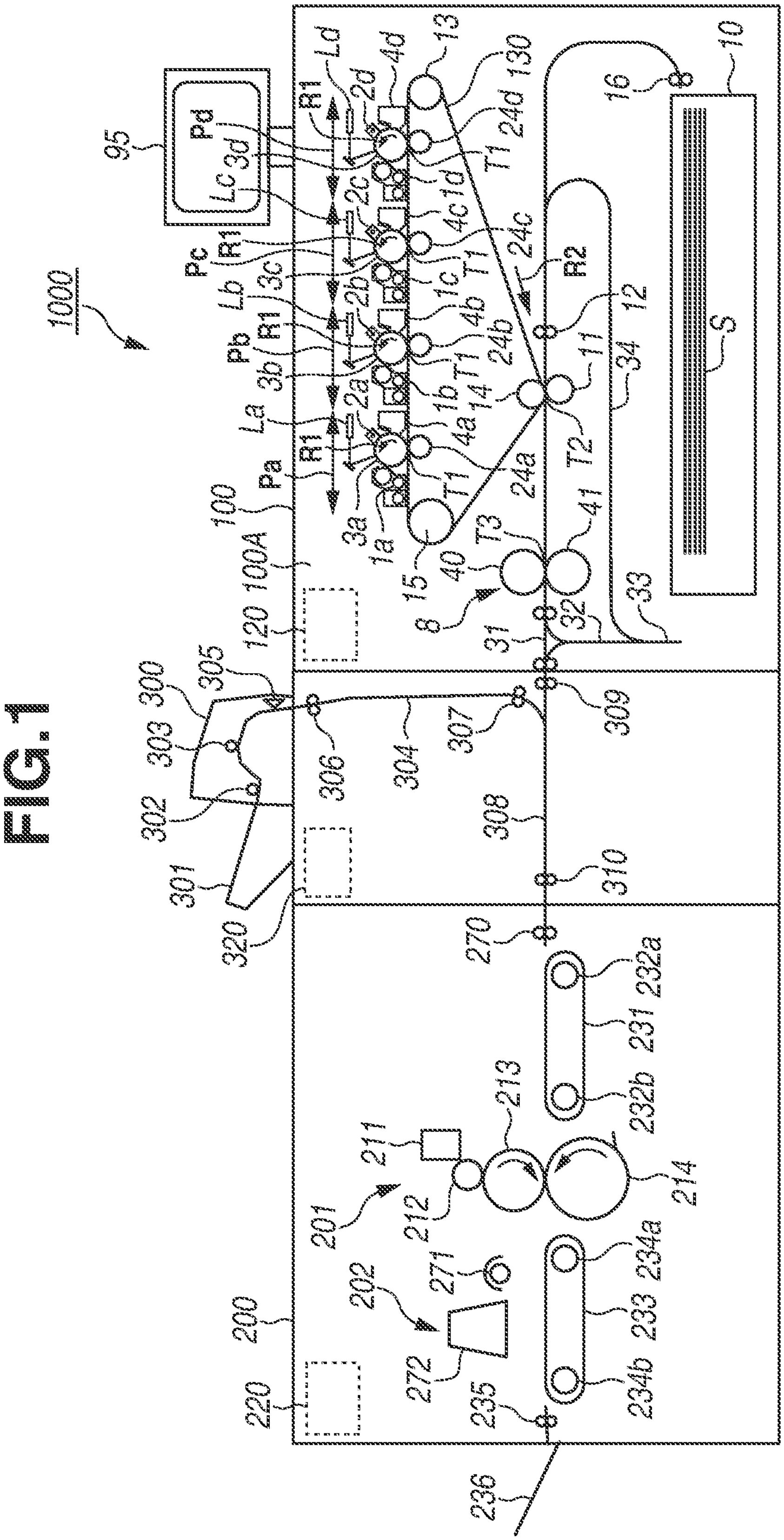
FIG. 1 is an outline sectional view of an image forming system in a first exemplary embodiment.

As illustrated in FIG. 1, an image forming system 1000 in a first exemplary embodiment includes an image forming apparatus 100, which forms an image on a sheet, a varnish application apparatus 200, which applies varnish to a sheet with an image formed thereon, and an inserter 300, which inserts a sheet between the image forming apparatus 100 and the varnish application apparatus 200. In the first exemplary embodiment, the inserter 300 is an example of a sheet conveyance apparatus.

The image forming apparatus 100, the inserter 300, and the varnish application apparatus 200 are connected in series, so that varnish can be applied to a sheet conveyed from the image forming apparatus 100 or a sheet conveyed from the inserter 300. Thus, varnish application processing is performed on a sheet during a period from when the sheet is fed by the image forming apparatus 100 or the inserter 300 to when the sheet is discharged to outside the image forming system 1000.

<Image Forming Apparatus>

The image forming apparatus 100 illustrated in FIG. 1 is a tandem-type color printer of the electrophotographic system. The image forming apparatus 100 includes image forming portions Pa, Pb, Pc, and Pd which respectively form images of yellow, magenta, cyan, and black. The image forming apparatus 100 forms a toner image on a sheet S according to a print signal received from a document reading device (not illustrated) connected to an apparatus body 100A or an external apparatus 170 (FIG. 2), such as a personal computer, connected to the image forming apparatus 100 in such a way as to be able to communicate therewith. The image forming apparatus 100 includes an operation unit 95 equipped with a touch panel. The image forming apparatus 100 is configured to be able to receive an instruction (print signal) from the user via the external apparatus 170 or the operation unit 95.

Furthermore, in the case of the first exemplary embodiment, an image forming unit which forms a toner image on a sheet S is configured with the image forming portions Pa to Pd, primary transfer rollers 24*a* to 24*d*, an intermediate transfer belt 130, a plurality of rollers 13 to 15, which suspends the intermediate transfer belt 130 in a tensioned manner, and a secondary transfer outer roller 11. Moreover, examples of the sheet S include various types of sheet materials, such as various paper types including plain paper, heavy paper, rough paper, embossed paper, and coated paper, a plastic film, and a cloth.

As illustrated in FIG. 1, the image forming portions Pa, Pb, Pc, and Pd are arranged side by side along the rotational direction of the intermediate transfer belt 130. The intermediate transfer belt 130 is suspended in a tensioned manner by the plurality of rollers 13, 14, and 15 and is configured to move in the direction of arrow R2. Then, the intermediate transfer belt 130 bears thereon and conveys a toner image which has been primarily transferred thereto. The secondary transfer outer roller 11 is arranged at a position facing the secondary transfer inner roller 14, which suspends the intermediate transfer belt 130 in a tensioned manner, via the intermediate transfer belt 130, thus forming a secondary transfer portion T2 for transferring a toner image borne on the intermediate transfer belt 130 to the sheet S. A fixing device 8 is arranged downstream in the sheet conveyance direction of the secondary transfer portion T2. Furthermore, in the first exemplary embodiment, although not illustrated, a plurality of conveyance roller pairs for conveying the sheet S is provided in a conveyance path illustrated in FIG. 1.

A cassette 10, in which sheets S are stored, is arranged at a lower portion of the image forming apparatus 100. Here, the cassette 10 is an example of a sheet storing portion. The sheet S is conveyed by a conveyance roller 16 from the cassette 10 toward a registration roller 12. After that, the sheet S is conveyed to the secondary transfer portion T2 by the registration roller 12 beginning to rotate in synchronization with a toner image formed on the intermediate transfer belt 130 as described below.

Furthermore, while, here, a single cassette 10 is illustrated, a plurality of cassettes 10 can be arranged in such a way as to be able to store sheets S differing in size or thickness, and, in that case, a sheet S selected from any one of the plurality of cassettes 10 is conveyed. Moreover, not only a sheet S stored in the cassette 10 but also a sheet S stored in a manual-feed portion (not illustrated) or a feeding device mounted to an outer portion of the image forming apparatus 100 can be configured to be conveyed.

Four image forming portions Pa, Pb, Pc, and Pd included in the image forming apparatus 100 are assumed to have substantially the same configuration except for differing in developing colors. Accordingly, here, the image forming portion Pa for yellow is described as a typical example, and the other image forming portions Pb, Pc, and Pd are omitted from description.

The image forming portion Pa includes a photosensitive drum 3*a* arranged as a photosensitive member. The photosensitive drum 3*a* is driven to rotate in the direction of arrow RE A charging device 2*a*, an exposure device La, a developing device 1*a*, a primary transfer roller 24*a*, and a drum cleaning device 4*a* are arranged around the photosensitive drum 3*a*.

A process for forming, for example, a full-color image by the image forming apparatus 100 is described. First, when an image forming operation is started, the photosensitive drum 3*a* is charged uniformly by the charging device 2*a*. The charging device 2*a* is, for example, a corona charger for radiating charged particles associated with corona discharge to charge the photosensitive drum 3*a* to a dark portion potential of the uniform negative polarity. Next, the photosensitive drum 3*a* is exposed by laser light corresponding to an image signal emitted from the exposure device La.

With this exposure, an electrostatic latent image corresponding to the image signal is formed on the surface of the photosensitive drum 3*a*. The electrostatic latent image formed on the photosensitive drum 3*a* is developed into a toner image, which is a visible image, by a developer including toner and carrier stored in the developing device 1*a*. In the case of the first exemplary embodiment, each of the developing devices 1*a* to 1*d* uses a two-component developer containing non-magnetic toner and carrier having a magnetic property.

The primary transfer roller 24*a* is provided at a position facing the photosensitive drum 3*a* across the intermediate transfer belt 130. A toner image formed on the photosensitive drum 3*a* is primarily transferred to the intermediate transfer belt 130 at a primary transfer portion T1, which is formed between the photosensitive drum 3*a* and the primary transfer roller 24*a* via the intermediate transfer belt 130. At this time, a primary transfer bias is being applied to the primary transfer roller 24*a*. Toner remaining on the photosensitive drum 3*a* after primary transfer is removed by the drum cleaning device 4*a*.

Such an operation is sequentially performed at the respective image forming portions Pa to Pd for yellow, magenta, cyan, and black, and four color toner images are superposed on each other on the intermediate transfer belt 130. After that, a sheet S stored in the cassette 10 is conveyed to the secondary transfer portion T2 in conformity with timing of formation of the toner images. Then, in response to a secondary transfer bias being applied to the secondary transfer outer roller 11, the toner images formed on the intermediate transfer belt 130 are secondarily transferred to the sheet S in a collective manner. Toner remaining on the intermediate transfer belt 130 after secondary transfer is removed by a belt cleaning device (not illustrated).

Next, the sheet S with the toner images transferred thereto is conveyed to the fixing device 8. The fixing device 8 includes a fixing roller 40, which is able to rotate while being in contact with a surface of the sheet S with the unfixed toner images formed thereon, and a pressure roller 41, which comes into pressure contact with the fixing roller 40 to form a fixing nip portion T3. Furthermore, while, here, the fixing roller 40 and the pressure roller 41 are described as an example, the present exemplary embodiment is not limited to this, and one or both of the fixing roller 40 and the pressure roller 41 can be a rotatable endless belt.

A heater (not illustrated) is provided inside the fixing roller 40. The fixing device 8 pinches and conveys the sheet S with the toner images borne thereon at the fixing nip portion T3 and thus heats and presses the sheet S and fuse toner, thus fixing the toner images to the sheet S. In this way, a series of image forming process ends.

In the case of the first exemplary embodiment, the image forming apparatus 100 is capable of performing two-sided printing. In the case of one-sided printing, a sheet S having passed over the fixing device 8 passes through a discharge conveyance path 31 and is then discharged from the image forming apparatus 100. On the other hand, in the case of two-sided printing, a sheet S having passed over the fixing device 8 is conveyed to a conveyance path 32 and is then sent to an inversion path 33. The sheet S sent to the inversion path 33 is conveyed in a switch-back manner toward a two-sided conveyance path 34, so that the front surface and back surface of the sheet S are switched around. The sheet S with the front surface and back surface thereof switched around is conveyed from the two-sided conveyance path 34 toward the registration roller 12 and is then subjected to a process similar to that for toner image formation on one side, so that toner images are also formed on the other surface. Then, the sheet S with toner images fixed to both sides thereof passes through the discharge conveyance path 31 and is then discharged from the image forming apparatus 100.

While the image forming apparatus 100 in the first exemplary embodiment is described with a tandem-type color printer of the electrophotographic system, which forms an image on a sheet with use of toner, taken as an example, an image forming apparatus differing in printing system or configuration can be employed as long as it is capable of performing varnish application processing inline on a printed product by being connected to the varnish application apparatus 200. For example, an image forming apparatus which forms an image with use of ink can be employed.

<Inserter>

In the image forming system 1000 in the first exemplary embodiment, as mentioned above, the inserter 300 is connected to the downstream side of the image forming apparatus 100. The inserter 300 includes a stacking tray 301. Sheets stacked on the stacking tray 301 are conveyed to the inside of the inserter 300 by a sheet feed roller 302. Then, only one sheet separated by a separation roller 303 is conveyed to a conveyance path 304. The stacking tray 301 is equipped with a sheet presence or absence sensor (not illustrated). The sheet conveyed to the conveyance path 304 is conveyed by the separation roller 303 and a conveyance roller (not illustrated) a predetermined amount from the position at which the leading edge of the sheet has been detected by a registration sensor 305, and is then temporarily stopped in a state in which the leading edge of the sheet has collided with a registration roller 306 being in a stopped state and the sheet has formed a loop. With this operation, any skew of the sheet occurring during the sheet feeding and conveyance operation is corrected.

Then, after the sheet is stopped a predetermined time with the leading edge thereof colliding with the registration roller 306, the separation roller 303, the registration roller 306, and a conveyance roller 307 are driven, so that the sheet is conveyed via a joint portion between the conveyance path 304 and a conveyance path 308. In the first exemplary embodiment, the conveyance path 308 is an example of a first conveyance path, and the conveyance path 304 is an example of a second conveyance path. Moreover, the sheet feed roller 302, the separation roller 303, the registration roller 306, and the conveyance roller 307 are an example of an insertion processing unit and is an example of a processing unit which performs predetermined processing on a sheet present in the inserter 300.

The inserter 300 is provided with a receiving roller 309, which receives a sheet discharged from the image forming apparatus 100. Therefore, the inserter 300 is configured to be able to convey both a sheet S with an image formed thereon by the image forming apparatus 100 and a sheet S stacked on the stacking tray 301.

The sheet fed from the image forming apparatus 100 or the sheet fed from the stacking tray 301 is discharged by a discharge roller 310 from the inserter 300 via the conveyance path 308. With these operations, the inserter 300 is able to insert a sheet into a series of sheets conveyed from the image forming apparatus 100 at an optional position and then convey the sheets to a subsequent apparatus.

<Varnish Application Apparatus>

The varnish application apparatus 200 is connected to the downstream side of the inserter 300 in the sheet conveyance direction of the image forming system 1000. Then, the varnish application apparatus 200 performs varnish application processing on a sheet fed from the inserter 300.

A sheet discharged by the discharge roller 310 of the inserter 300 is received by a receiving roller 270 of the varnish application apparatus 200. The sheet conveyed by the receiving roller 270 is then conveyed by a conveyance belt 231. The conveyance belt 231 is suspended in a tensioned manner by tensile suspension rollers 232*a* and 232*b*. In response to a driving force being transmitted to one of the tensile suspension rollers 232*a* and 232*b*, the conveyance belt 231 is rotated in a counterclockwise direction as viewed in FIG. 1. Moreover, the conveyance belt 231 is made from a stainless steel and conveys a sheet while attracting the sheet to the belt outer circumferential surface thereof by suction with a suction device (not illustrated) via suction holes (not illustrated) bored on the belt surface thereof.

Then, the sheet conveyed by the receiving roller 270 is conveyed by the conveyance belt 231 to a varnish application portion 201, which is an example of a varnish application unit. In the varnish application portion 201, varnish reserved in a varnish reservoir portion 211 is supplied to a varnish application roller 213 by a varnish supply roller 212. The varnish reservoir portion 211 is connected to a varnish supply device (not illustrated) in a state in which varnish is reserved in a container of the rectangular parallelepiped shape, so that varnish is supplied in a circulating manner Additionally, at the time of application of varnish, the varnish reservoir portion 211 opens a varnish supply port (not illustrated) and thus supplies varnish to the varnish supply roller 212.

The varnish supply roller 212 and the varnish application roller 213 are in abutting contact with each other, and, at this abutting contact portion, a varnish with a predetermined film thickness is supplied from the varnish supply roller 212 to the varnish application roller 213. While, in the first exemplary embodiment, the varnish supply roller 212 used here is an anilox roller with a line screen (cell interval of the roller) of 100 lines per inch, a different line screen can be used depending on the viscosity of varnish.

Moreover, the varnish application roller 213 is a rubber roller and is arranged opposite to a varnish drum 214. The varnish drum 214 is uniformly pressed toward the rotational axis direction of the varnish drum 214 by a pressure unit (not illustrated) in such a way as to form a nip with the varnish application roller 213. The varnish drum 214 is a metallic roller. Moreover, in the varnish drum 214, the length in the rotational axis direction thereof is set to a length larger than or equal to the maximum size of width of a sheet compatible with the image forming system 1000. In the first exemplary embodiment, the length in the rotational axis direction of the varnish drum 214 is set to 350 millimeters (mm).

The varnish application roller 213 coming into contact with the surface of a sheet which is being conveyed by the varnish drum 214 causes varnish to be applied to the sheet. In this way, varnish application processing on a sheet is enabled in the varnish application portion 201.

The varnish application roller 213 and the varnish drum 214 are driven to rotate in the respective directions of arrows illustrated in FIG. 1 in such a manner that the surface movement speed becomes 200 millimeters per second (mm/s). The varnish supply roller 212 is in contact with the varnish application roller 213 and is driven to rotate following the varnish application roller 213. Each member is supported by supporting members at both end portions thereof (not illustrated) in the roller rotational axis direction.

The sheet with varnish applied to the surface thereof by the varnish application roller 213 is pinched and conveyed by the varnish application roller 213 and the varnish drum 214 to a varnish hardening portion 202, which is an example of a varnish hardening unit.

The varnish hardening portion 202 performs hardening of varnish applied to the sheet surface by the varnish application portion 201. The sheet pinched and conveyed by the varnish application roller 213 and the varnish drum 214 is passed to a conveyance belt 233. The conveyance belt 233 is suspended in a tensioned manner by tensile suspension rollers 234*a* and 234*b*. In response to a driving force being transmitted to one of the tensile suspension rollers 234*a* and 234*b*, the conveyance belt 233 is rotated n a counterclockwise direction as viewed in FIG. 1. Moreover, the conveyance belt 233 is made from a stainless steel and conveys a sheet while attracting the sheet to the belt outer circumferential surface thereof by suction with a suction device (not illustrated) via suction holes (not illustrated) bored on the belt surface thereof. With this operation, the sheet passes through the varnish hardening portion 202 while being in close contact with the belt outer circumferential surface.

A heater 271 and an ultraviolet (UV) radiation unit 272 are provided above the conveyance belt 233 in the vertical direction. The varnish hardening portion 202 hardens varnish while the sheet is being conveyed by the conveyance belt 233. The varnish hardening portion 202 performs processing for causing the heater 271 to heat the sheet surface and causing the UV radiation unit 272 to harden varnish.

The heater 271 is used to heat a varnish-applied portion to increase a reaction rate of varnish at the time of UV radiation. The heater 271 is supported by a supporting member (not illustrated) and uniformly heats the entire area of the sheet in the width direction thereof perpendicular to the sheet conveyance direction. The heating temperature of a sheet of paper which is heated by the heater 271 is 30° C. to 40° C. In the UV radiation unit 272, UV light-emitting diodes (LEDs) are arranged by a supporting member (not illustrated) at a height of 200 mm from the conveyance belt 233 and uniformly radiate UV to the entire area in the longitudinal direction of a sheet of paper, for example, at irradiation energy of 150 milliwatt per square centimeter ($mW/cm^2$).

The sheet conveyed by the conveyance belt 233 is discharged to a discharge tray 236 by a discharge roller 235. In this way, varnish application processing can be performed by the varnish application apparatus 200 on a sheet with an image formed thereon by the image forming apparatus 100 or a sheet stacked on the stacking tray 301 of the inserter 300. Thus, the image forming system 1000 in the first exemplary embodiment is able to perform varnish application processing on both a sheet with an image formed thereon by the image forming apparatus 100 and a sheet inserted from the inserter 300.

Furthermore, while, in the first exemplary embodiment, an example of the varnish application portion 201 which applies varnish to the whole surface of a sheet by the varnish application roller 213 has been described, a varnish application portion 201 which is capable of partially applying varnish by a varnish coater of the ejection type such as a spot varnish coater can be employed. Moreover, a configuration in which a conveyance path for allowing a sheet not to pass through the varnish application portion 201 and the varnish hardening portion 202 can be employed. This configuration enables selectively performing varnish application processing on a sheet conveyed from the image forming apparatus 100 or a sheet conveyed from the inserter 300.

<Control of Image Forming System>

Figure 2:
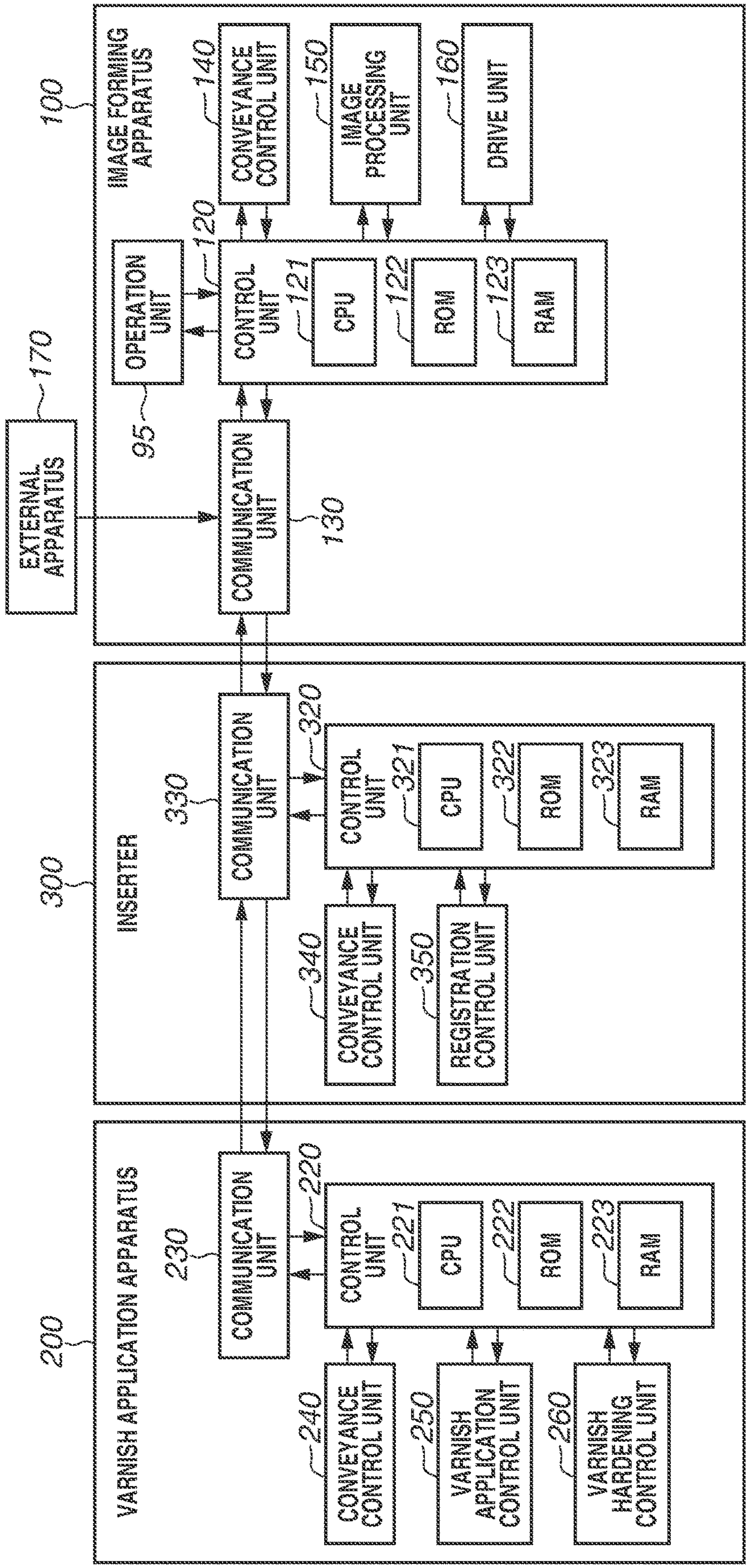
FIG. 2 is a control block diagram in the first exemplary embodiment.

Next, an operation and control of the image forming system 1000 in the first exemplary embodiment are described with reference to a control block diagram and a flowchart. FIG. 2 is a control block diagram of the image forming system 1000.

The image forming apparatus 100 includes a control unit 120, the varnish application apparatus 200 includes a control unit 220, and the inserter 300 includes a control unit 320. The control units 120, 220, and 320 are configured to be able to communicate with each other via communication units 130, 230, and 330.

An operation unit 95 is a user interface which is capable of issuing a notification to the user and allows the user to input an operation execution instruction for the image forming system 1000. Then, the operation unit 95 includes, for example, a touch panel which displays software keys and receives a touch operation. Furthermore, the operation unit 95 can be a combination of a display and operation buttons.

The control unit 120 of the image forming apparatus 100, which serves as a unit which controls the entirety of the image forming apparatus 100, includes a central processing unit (CPU) 121, a read-only memory (ROM) 122, and a random access memory (RAM) 123. The ROM 122 stores various programs used for the CPU 121 to control the image forming apparatus 100. The RAM 123 is used as a primary storage region for the CPU 121 to control various programs.

The control unit 120 is capable of receiving a print signal from an external apparatus 170 such as a personal computer (PC) via the communication unit 130. Moreover, the control unit 120 is capable of receiving a print signal via the operation unit 95. The print signal, which is a signal generated according to the processing content set by the user, includes, for example, the presence or absence of execution of various processing operations, such as image forming processing, insertion processing, and varnish application processing, the number of sheets to be processed, and the type of a sheet to be processed. In the first exemplary embodiment, the control unit 120 is an example of a first control unit.

Furthermore, the control of the entirety of the image forming apparatus 100 includes conveyance control for feeding and conveying a sheet to an image forming portion, control for performing image processing based on the received print signal, and control of, for example, the image forming portions Pa, Pb, Pc, and Pd, the intermediate transfer belt 130, and the fixing device 8 in forming an image on a sheet. The control unit 120 performs conveyance control by controlling conveyance units, such as the conveyance roller 16 and the registration roller 12, via a conveyance control unit 140. Moreover, the control unit 120 performs image processing control via an image processing unit 150. Moreover, the control unit 120 controls, for example, drive motors (not illustrated) mounted in the image forming apparatus 100 via a drive unit 160.

The drive unit 160 rotationally drives, for example, the image forming portions Pa, Pb, Pc, and Pd, the intermediate transfer belt 130, and the fixing device 8 by controlling the drive motors (not illustrated).

Furthermore, while, in the first exemplary embodiment, a configuration in which the conveyance control unit 140, the image processing unit 150, and the drive unit 160 are provided on a one-by-one basis has been described as an example, each or any one of them can be configured with a plurality of units. Moreover, a configuration in which the control unit 120 directly controls driving of, for example, the image forming portions Pa, Pb, Pc, and Pd, the intermediate transfer belt 130, and the fixing device 8 can be employed.

The control unit 220 of the varnish application apparatus 200 includes a CPU 221, a ROM 222, and a RAM 223. The ROM 222 stores various programs used for the CPU 221 to control the varnish application apparatus 200. The RAM 223 is used as a primary storage region for the CPU 221 to control various programs. Furthermore, the control of the varnish application apparatus 200 includes, for example, conveyance control for each conveyance unit which conveys a sheet inside the varnish application apparatus 200, varnish application control for performing a varnish application operation on a sheet, and varnish hardening control. The control unit 220 controls sheet conveyance inside the varnish application apparatus 200 by controlling, for example, the receiving roller 270, the tensile suspension rollers **232*a*, 232*b*, 234*a*, and 234*b*, and the discharge roller 235 via a conveyance control unit 240. Moreover, the control unit 220 performs control for applying varnish to a sheet by controlling, for example, the amount of supply of varnish to the varnish application roller 213 by the varnish supply roller 212 via a varnish application control unit 250. In the first exemplary embodiment, the control unit 220** is an example of a second control unit.

Moreover, the control unit 220 performs control for hardening varnish on a sheet by controlling an output of the heater 271 and radiation force of, for example, the UV radiation unit 272 via a varnish hardening control unit 260.

The varnish application apparatus 200 is connected to the image forming apparatus 100 via the communication unit 230.

When the control unit 120 has received a print signal, the image forming apparatus 100 transmits an instruction for the presence or absence of varnish application processing to the varnish application apparatus 200 via the communication unit 130. In this way, the varnish application apparatus 200 performs varnish application processing on a sheet based on a job received by the image forming apparatus 100.

Moreover, the control unit 320 of the inserter 300 includes a CPU 321, a ROM 322, and a RAM 323. The ROM 322 stores various programs used for the CPU 321 to control the inserter 300. The RAM 323 is used as a primary storage region for the CPU 321 to control various programs. Furthermore, the control of the inserter 300 includes, for example, conveyance control for conveying a sheet stacked on the stacking tray 301, conveyance control for conveying a sheet to the conveyance path 308, and conveyance control for a sheet by the registration roller 306.

The control unit 320 of the inserter 300 controls conveyance units, such as the sheet feed roller 302, the separation roller 303, the conveyance roller 307, the receiving roller 309, and the discharge roller 310, via a conveyance control unit 340, to convey a sheet in the conveyance path 304 and the conveyance path 308. Moreover, the control unit 320 controls the registration roller 306 via a registration control unit 350 to perform skew correction to a sheet. In the first exemplary embodiment, the control unit 320 is an example of a third control unit.

The inserter 300 is connected to the image forming apparatus 100 via the communication unit 330. When having received a job from the user, the image forming apparatus 100 transmits, to the inserter 300 via the communication unit 130, an instruction for, for example, timing of insertion of a sheet from the stacking tray 301. In this way, the inserter 300 performs insertion processing for inserting a sheet based on a print signal received by the image forming apparatus 100.

Furthermore, while, in the first exemplary embodiment, a configuration in which the varnish application apparatus 200 is connected to the communication unit 130 of the image forming apparatus 100 via the communication unit 330 of the inserter 300 has been described, another configuration can be employed. For example, a configuration in which the communication unit 230 of the varnish application apparatus 200 is directly connected to the communication unit 130 of the image forming apparatus 100 can be employed.

As mentioned above, the image forming apparatus 100, the inserter 300, and the varnish application apparatus 200 are connected to each other via the communication units 130, 230, and 330. Accordingly, in a case where a print signal has been input to the image forming system 1000, the image forming apparatus 100 transmits a processing content corresponding to the print signal to the inserter 300 and the varnish application apparatus 200. Moreover, in a case where an abnormality has occurred in the image forming apparatus 100, the image forming apparatus 100 is able to transmit a stop signal for stopping an operation of the varnish application apparatus 200 or the inserter 300. Additionally, since the communication units 130, 230, and 330 are able to perform bidirectional communication with each other, in a case where an abnormality has occurred in the varnish application apparatus 200 or the inserter 300, the image forming apparatus 100 is also able to stop an operation thereof in response to receiving information transmitted from the communication unit 230 or 330.

While, in the first exemplary embodiment, a configuration in which the entirety of the image forming system 1000 is controlled by the control unit 120 included in the image forming apparatus 100 is described, the present exemplary embodiment does not need to be limited to this configuration. For example, a configuration in which a controller serving as a control unit for controlling the entirety of the image forming system 1000 is provided in a housing different from that of the image forming apparatus 100 and outside of the image forming apparatus 100 can be employed. In this case, the control unit only needs to have a configuration which is connected to the control unit 220 of the varnish application apparatus 200 or the control unit 320 of the inserter 300 via the control unit 120 of the image forming apparatus 100. Moreover, the controller unit can have a configuration which is directly connected to each of the control units 120, 220, and 320.

Figure 3:
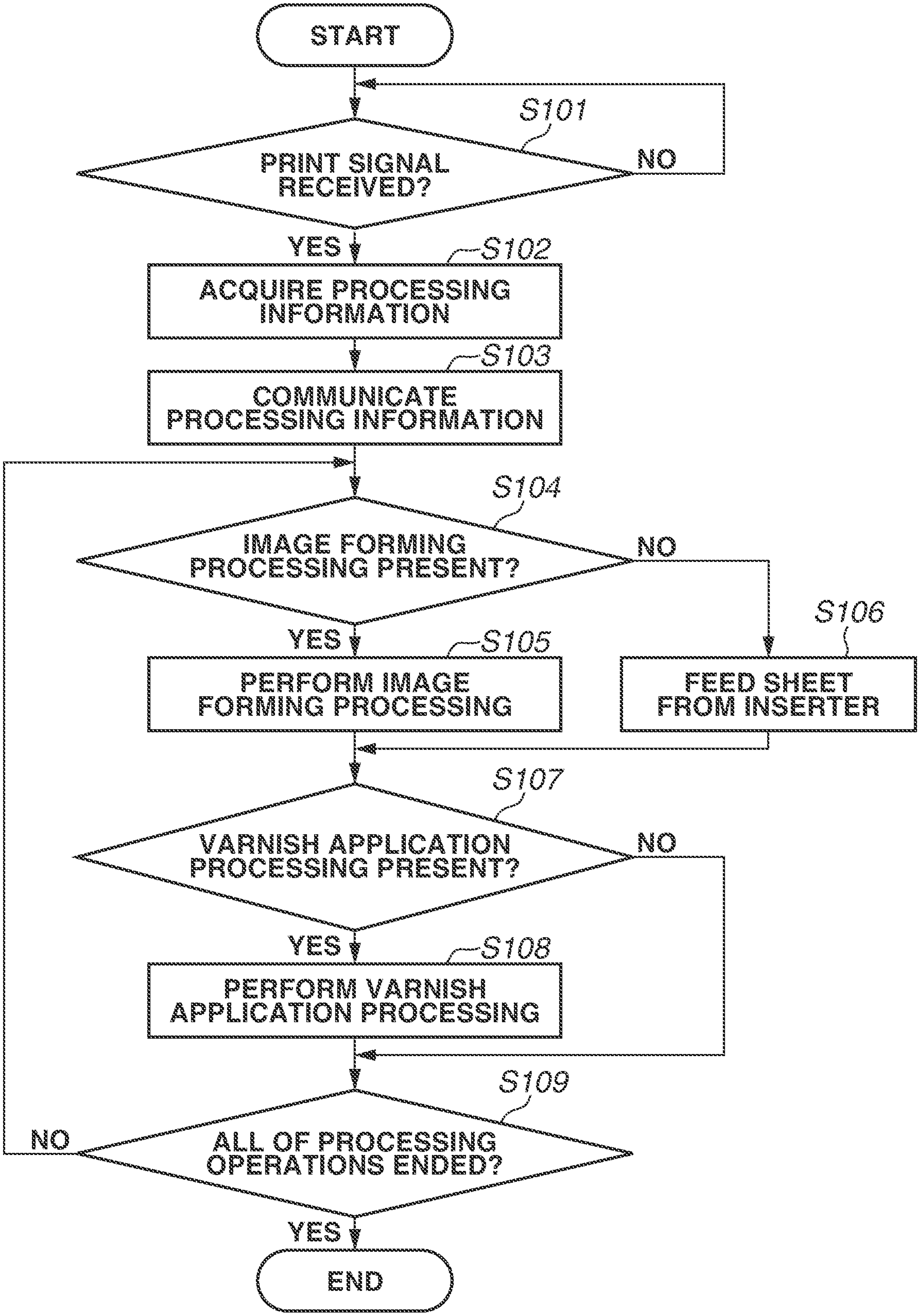
FIG. 3 is a flowchart illustrating a control flow in the first exemplary embodiment.

Next, a control flow representing a series of operations of image forming processing which is performed by the image forming apparatus 100, insertion processing which is performed by the inserter 300, and varnish application processing which is performed by the varnish application apparatus 200 in the image forming system 1000 is described. FIG. 3 is a flowchart illustrating the control flow in the image forming system 1000 in the first exemplary embodiment.

The control flow illustrated in FIG. 3 is started when a print signal is received in a standby state in which, for example, the adjustment of the entirety of the image forming system 1000 is completed. Here, the standby state is a state in which, in the image forming apparatus 100, the temperature of the fixing device 8 has reached a predetermined temperature available for fixing a toner image and is also a state in which, in response to receiving a print signal, the image forming apparatus 100 is ready to immediately form an image on a sheet. Moreover, the standby state is a state in which, in the varnish application apparatus 200, varnish is being supplied to the varnish application roller 213, is a state in which the heater 271 has reached a predetermined temperature and the radiation force of the UV radiation unit 272 has become a predetermined radiation force, and is also a state in which the varnish application apparatus 200 is ready to apply varnish to a sheet and harden the applied varnish.

If the control unit 120 has received a print signal via the communication unit 130 or the operation unit 95 (YES in step S101), then in step S102, the control unit 120 acquires processing information related to image forming processing, insertion processing, and varnish application processing included in the print signal. Moreover, if the control unit 120 has not received a print signal (NO in step S101), the control unit 120 waits until receiving a print signal, thus maintaining the standby state of the image forming system 1000.

Then, in step S103, based on the processing information acquired in step S102, the control unit 120 transmits processing information related to the presence or absence of insertion processing to the inserter 300 via the communication units 130, 230, and 330 and transmits processing information related to the presence or absence of varnish application processing to the varnish application apparatus 200. While, here, an example in which the control unit 120 transmits processing information related to the presence or absence of insertion processing and the presence or absence of varnish application processing is described, a configuration in which, only when there are insertion processing and varnish application processing, the control unit 120 transmits each piece of processing information to the inserter 300 or the varnish application apparatus 200 can be employed.

Next, in step S104, the control unit 120 determines the presence or absence of image forming processing to be performed by the image forming apparatus 100, based on the processing information acquired in step S102. If image forming processing to be performed by the image forming apparatus 100 is present (YES in step S104), then in step S105, the control unit 120 controls the conveyance control unit 140, the image processing unit 150, and the drive unit 160 to perform image forming processing on a sheet fed from the cassette 10. In the first exemplary embodiment, a case where image forming processing is absent (NO in step S104) means a case where insertion processing in which a sheet is fed by the inserter 300 is performed.

Therefore, if image forming processing is absent (NO in step S104), then in step S106, the control unit 120 transmits a signal to the control unit 320 via the communication units 130 and 330 and thus causes the control unit 320 to control the conveyance control unit 340 and the registration control unit 350 to feed a sheet stacked on the stacking tray 301 of the inserter 300.

Then, in step S107, the control unit 120 determines whether to perform varnish application processing on a sheet with an image formed thereon by the image forming apparatus 100 in step S105 or a sheet fed from the inserter 300 in step S106, based on the processing information acquired in step S102.

If it is determined to perform varnish application processing (YES in step S107), then in step S108, the control unit 120 transmits a signal to the control unit 220 via the communication units 130 and 230 and thus causes the control unit 220 to control the conveyance control unit 240, the varnish application control unit 250, and the varnish hardening control unit 260 to perform varnish application processing by the varnish application apparatus 200.

On the other hand, if it is determined not to perform varnish application processing (NO in step S107), the control unit 120 transmits a signal to the control unit 220 via the communication units 130 and 230 and thus causes the control unit 220 to move the varnish application roller 213 away from the varnish drum 214, thus allowing passage of a sheet. At this time, the sheet is conveyed by the conveyance belts 231 and 233. Furthermore, a configuration in which a conveyance roller pair for pinching and conveying a sheet when the varnish application roller 213 is moved away from the varnish drum 214 is further provided can be employed.

Then, in step S109, the control unit 120 determines whether all of the processing operations included in the print signal received in step S101 have ended. If it is determined that all of the processing operations have ended (YES in step S109), the control unit 120 causes the image forming system 1000 to transition to the standby state. Moreover, if it is determined that not all of the processing operations have ended (NO in step S109), the control unit 120 returns the processing to step S104 and then performs each processing operation on a next sheet.

While, in the first exemplary embodiment, a configuration in which the control units 220 and 320 operate based on a signal received from the control unit 120 of the image forming apparatus 100 has been described as an example, a configuration in which, after transmission of the processing information in step S103, the control units 220 and 320 perform respective control operations taking, for example, conveyance timing of a sheet as the starting point can be employed. Thus, a configuration in which, in step S103, the control unit 120 transmits processing information including timing for performing insertion processing to the control unit 320 of the inserter 300, in step S104, the control unit 320 determines the presence or absence of execution of insertion processing, and, then in step S105, the control unit 320 controls the inserter 300 can be employed. Moreover, a configuration in which, in step S103, the control unit 120 transmits processing information including timing for performing varnish application processing to the control unit 220 of the varnish application apparatus 200, in step S107, the control unit 220 determines the presence or absence of execution of varnish application processing, and, in step S108, the control unit 220 controls the varnish application apparatus 200 can be employed.

In this way, in the image forming system 1000, in which the image forming apparatus 100, the inserter 300, and the varnish application apparatus 200 are connected inline, arranging the inserter 300 between the image forming apparatus 100 and the varnish application apparatus 200 enables performing varnish application processing even on a sheet fed from the inserter 300. Therefore, according to the image forming system 1000 in the first exemplary embodiment, it is possible to perform varnish application processing even on a sheet which does not pass through the image forming apparatus 100.

For example, however, in the case of an image forming system in which the inserter 300 is connected downstream of the varnish application apparatus 200 in the sheet conveyance direction, the varnish application apparatus 200 is able to perform varnish application processing on only a sheet which has passed through the secondary transfer portion T2 and the fixing nip portion T3 of the image forming apparatus 100. In this case, it is difficult to perform varnish application processing on a sheet which has had a change by passing through the secondary transfer portion T2 and the fixing nip portion T3. Specifically, it is difficult to perform varnish application processing on a sheet material such as a film which has a change by being affected by a transfer bias of the secondary transfer portion T2 or a heat of the fixing nip portion T3. For example, in the case of causing such a sheet to pass through the secondary transfer portion T2 and the fixing nip portion T3 and feeding the sheet from the image forming apparatus 100, since a change occurs in the sheet, for example, the color or gloss of the sheet after varnish application processing changes, so that a printed product which the user desires may not be able to be obtained.

Moreover, in a configuration in which the inserter 300 is connected downstream of the varnish application apparatus 200, for example, in the case of feeding, from the image forming apparatus 100, a sheet which has a change by passing thorough the secondary transfer portion T2 and the fixing nip portion T3 and performing varnish application processing on the sheet by the varnish application apparatus 200, a new configuration is needed. For example, a configuration for conveying a sheet through the secondary transfer portion T2 and the fixing nip portion T3 with the rollers thereof moved away from each other becomes necessary, so that the apparatus may become larger in size. Moreover, to prevent or reduce a sheet from being affected by a transfer bias of the secondary transfer portion T2 or a heat of the fixing nip portion T3, it is necessary to perform control in such a way as to decrease the transfer bias or the heat of the fixing device 8 with respect to a standby state which is ready to perform image forming processing on a sheet. In the case of performing such control, when the image forming apparatus 100 serially conveys both a sheet which has a change by passing through the secondary transfer portion T2 and the fixing nip portion T3 and an ordinary sheet, it becomes impossible to perform serial processing in the image forming apparatus 100 because of performing control to decrease the transfer bias or the temperature of the fixing device 8, so that the image forming system 1000 may result in low productivity.

On the other hand, in the first exemplary embodiment, the inserter 300 is connected downstream of the image forming apparatus 100 and upstream of the varnish application apparatus 200 in the sheet conveyance direction. This enables a sheet which has a change by passing through the secondary transfer portion T2 and the fixing nip portion T3 to be fed from the inserter 300, so that it is possible to perform varnish application processing without incurring an increase in size of the apparatus or a reduction in productivity. Therefore, it is possible to perform varnish application processing on a sheet with a material desired by the user.

As described above, in the first exemplary embodiment, in an image forming system which performs both varnish application processing and processing other than the varnish application processing inline on a sheet with an image formed thereon by an image forming apparatus, it is possible to prevent or reduce a decrease in quality of a printed product and a decrease in productivity and it is possible to provide a printed product which the user desires.

Figure 4:
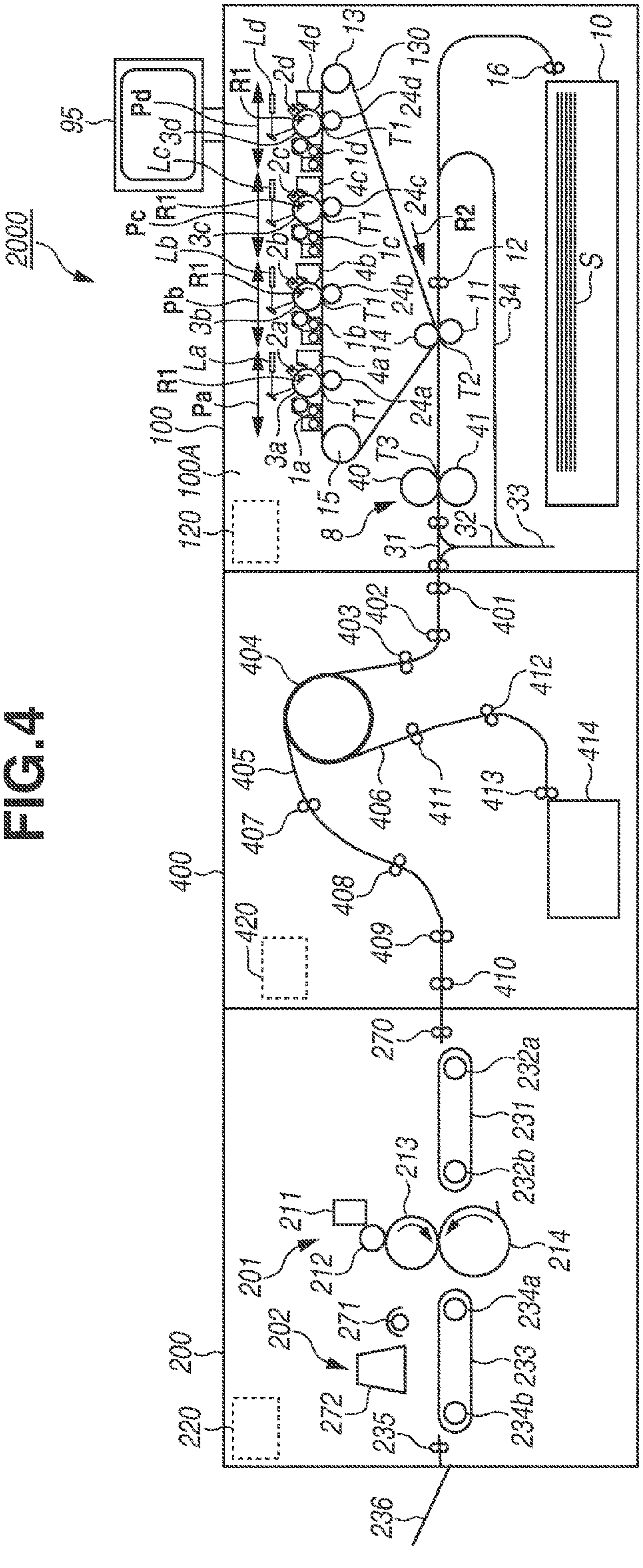
FIG. 4 is an outline sectional view of an image forming system in a second exemplary embodiment.

Next, a second exemplary embodiment of the present invention is described. As illustrated in FIG. 4, an image forming system 2000 in the second exemplary embodiment includes an image forming apparatus 100, which forms an image on a sheet, a varnish application apparatus 200, which applies varnish to a sheet with an image formed thereon, and a stacker 400, which performs stack processing on sheets between the image forming apparatus 100 and the varnish application apparatus 200. In the second exemplary embodiment, the stacker 400 is an example of a sheet conveyance apparatus.

The image forming apparatus 100, the stacker 400, and the varnish application apparatus 200 are connected in series, so that varnish can be applied to a sheet conveyed from the image forming apparatus 100. Thus, varnish application processing is performed on a sheet during a period from when the sheet is fed by the image forming apparatus 100 to when the sheet is discharged to outside the image forming system 2000.

In the image forming system 2000 in the second exemplary embodiment, the image forming apparatus 100 and the varnish application apparatus 200 have respective configurations similar to those in the first exemplary embodiment, and the respective constituent elements thereof are assigned the respective same reference characters and are, therefore, omitted from description.

<Stacker>

The stacker 400 includes a conveyance path for conveying a sheet conveyed from the image forming apparatus 100 to the varnish application apparatus 200 and a conveyance path for storing a sheet conveyed from the image forming apparatus 100 in the inside of the stacker 400. The stacker 400, which is controlled by a control unit 420 described below, conveys a sheet to the varnish application apparatus 200 or stores a sheet in the inside of the stacker 400 based on a print signal which the image forming system 2000 has received.

A receiving roller 401 conveys a sheet discharged from the image forming apparatus 100 through the discharge conveyance path 31 to the inside of the stacker 400. The sheet conveyed to the inside of the stacker 400 by the receiving roller 401 is then conveyed to a conveyance direction switching mechanism 404 by conveyance rollers 402 and 403.

The conveyance direction switching mechanism 404 conveys a sheet while wrapping the sheet therearound, and is able to selectively convey a sheet to one of a first conveyance path 405 and a second conveyance path 406. For example, in a case where varnish application processing is included in the print signal received by the image forming system 2000, the conveyance direction switching mechanism 404 conveys a sheet to the first conveyance path 405, and, in a case where varnish application processing is not included in the received print signal, the conveyance direction switching mechanism 404 conveys a sheet to the second conveyance path 406.

The sheet conveyed to the first conveyance path 405 is conveyed by conveyance rollers 407, 408 and 409 and is then conveyed to the outside of the stacker 400 by a discharge roller 410. Then, the sheet discharged by the discharge roller 410 is received into the varnish application apparatus 200 by the receiving roller 270 and is then subjected to varnish application processing by the varnish application apparatus 200. The varnish application processing to be performed by the varnish application apparatus 200 is similar to that described in the first exemplary embodiment and is, therefore, omitted from description.

On the other hand, the sheet conveyed to the second conveyance path 406 is sequentially conveyed by conveyance rollers 411, 412, and 413 and is then stacked and stored in a storage portion 414. In the second exemplary embodiment, storing a sheet in the storage portion 414 is referred to as "stack processing". In the second exemplary embodiment, the conveyance rollers 411, 412, and 413 are an example of a processing unit which performs predetermined processing on sheets in the stacker 400 and are an example of a stack processing unit which performs stack processing for stacking a sheet.

In the second exemplary embodiment, the stacker 400 is connected downstream of the image forming apparatus 100 and upstream of the varnish application apparatus 200 in the sheet conveyance direction. As long as this configuration is satisfied, a configuration in which another processing apparatus such as an inserter can be connected between the stacker 400 and the varnish application apparatus 200.

<Control of Image Forming System>

Figure 5:
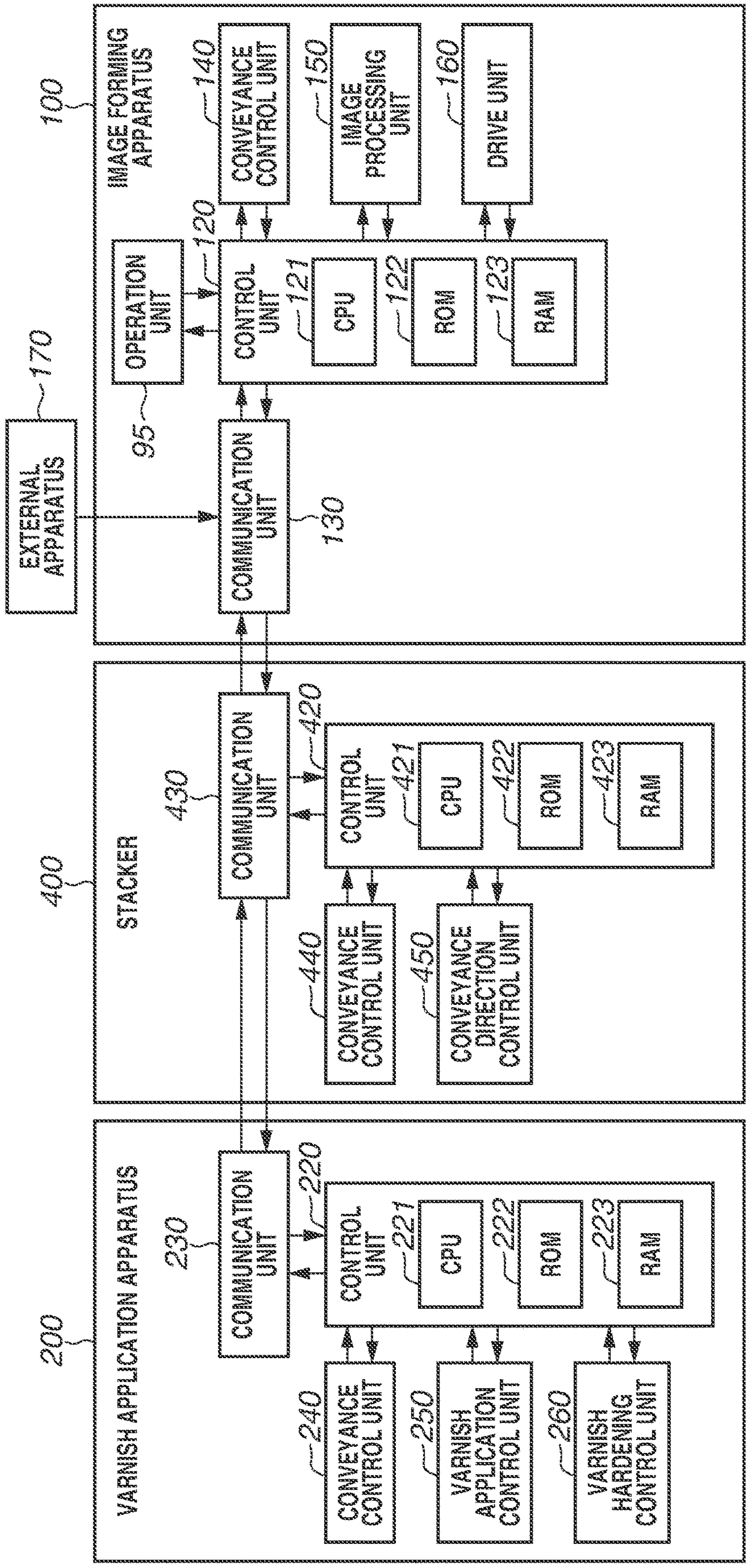
FIG. 5 is a control block diagram in the second exemplary embodiment.
Figure 6:
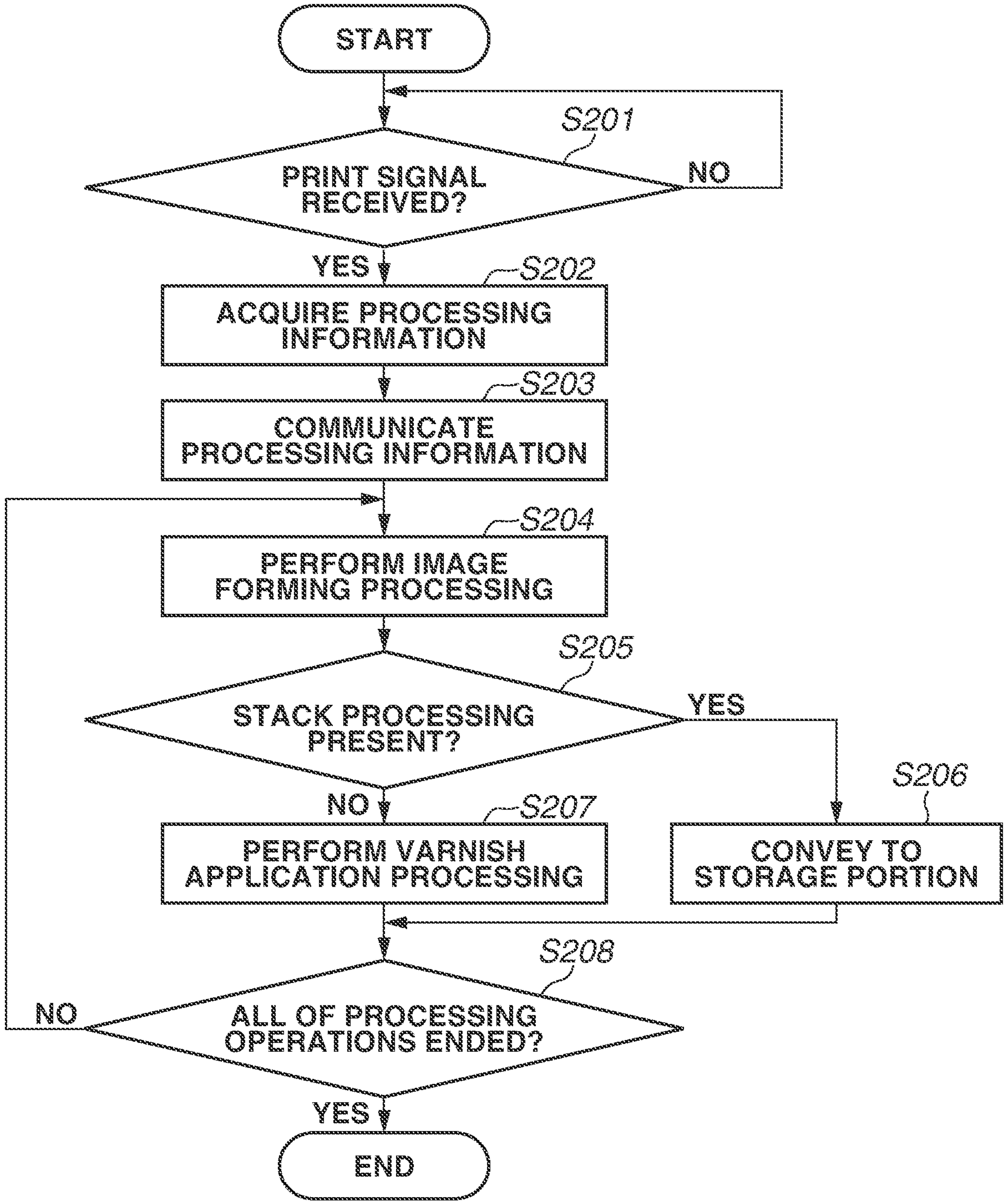
FIG. 6 is a flowchart illustrating a control flow in the second exemplary embodiment.

Next, an operation and control of the image forming system 2000 in the second exemplary embodiment are described. FIG. 5 is a control block diagram of the image forming system 2000, and FIG. 6 is a flowchart illustrating the control flow of the image forming system 2000 in the second exemplary embodiment. In the second exemplary embodiment, configurations of the image forming apparatus 100 and the varnish application apparatus 200 are similar to those in the first exemplary embodiment, and the respective constituent elements thereof are assigned the respective same reference characters and are, therefore, omitted from description.

In the image forming system 2000, the image forming apparatus 100 includes a control unit 120, the varnish application apparatus 200 includes a control unit 220, and the stacker 400 includes a control unit 420. The control units 120, 220, and 420 are configured to be able to communicate with each other via communication units 130, 230, and 430. In the second exemplary embodiment, the control unit 120 is an example of a first control unit, the control unit 220 is an example of a second control unit, and the control unit 420 is an example of a third control unit.

The control unit 120 of the image forming apparatus 100 is capable of receiving a print signal from an external apparatus 170 such as a PC via the communication unit 130. Moreover, the control unit 120 is capable of receiving a print signal via the operation unit 95. The print signal, which is a signal generated according to the processing content set by the user, includes, for example, the presence or absence of execution of various processing operations, such as image forming processing, stack processing, and varnish application processing, the number of sheets to be processed, and the type of a sheet to be processed.

The control unit 420 of the stacker 400 includes a CPU 421, a ROM 422, and a RAM 423. The ROM 422 stores various programs used for the CPU 421 to control the stacker 400. The RAM 423 is used as a primary storage region for the CPU 421 to control various programs. Furthermore, the control of the stacker 400 includes, for example, conveyance control for conveying a sheet conveyed into the stacker 400 and conveyance control for changing the conveyance direction.

The control unit 420 of the stacker 400 controls conveyance units, such as the receiving roller 401 and the conveyance rollers 402, 403, 407 to 409, and 411 to 413, via a conveyance control unit 440, thus performing conveyance control in the first conveyance path 405 and the second conveyance path 406. Moreover, the control unit 420 controls the conveyance direction switching mechanism 404 via a conveyance direction control unit 450, thus performing stack processing for sheets. In the second exemplary embodiment, the control unit 420 is an example of a third control unit.

The stacker 400 is connected to the image forming apparatus 100 via the communication unit 430. In response to receiving a job from the user, the image forming apparatus 100 transmits, to the stacker 400 via the communication unit 130, an instruction for, for example, timing for switching the conveyance direction by the conveyance direction switching mechanism 404. In this way, the stacker 400 switches the sheet conveyance direction based on a print signal received by the image forming apparatus 100 and thus performs stack processing for storing sheets in the stacker 400. While, in the second exemplary embodiment, a drum-shaped mechanism has been described as the conveyance direction switching mechanism 404, a configuration in which the conveyance direction is switched by, for example, a diverter can be employed.

Furthermore, while, in the second exemplary embodiment, a configuration in which the varnish application apparatus 200 is connected to the communication unit 130 of the image forming apparatus 100 via the communication unit 430 of the stacker 400 has been described, another configuration can be employed.

For example, a configuration in which the communication unit 230 of the varnish application apparatus 200 is directly connected to the communication unit 130 of the image forming apparatus 100 can be employed.

As mentioned above, the image forming apparatus 100, the stacker 400, and the varnish application apparatus 200 are connected via the communication units 130, 230, and 430. Accordingly, in a case where a print signal has been input to the image forming system 2000, the image forming apparatus 100 transmits a processing content corresponding to the print signal to the stacker 400 and the varnish application apparatus 200. Moreover, in a case where an abnormality has occurred in the image forming apparatus 100, the image forming apparatus 100 is able to transmit a stop signal for stopping an operation of the varnish application apparatus 200 or the stacker 400. Additionally, since the communication units 130, 230, and 430 are able to perform bidirectional communication with each other, in a case where an abnormality has occurred in the varnish application apparatus 200 or the stacker 400, the image forming apparatus 100 is also able to stop an operation thereof in response to receiving information transmitted from the communication unit 230 or 430.

While, in the second exemplary embodiment, a configuration in which the entirety of the image forming system 2000 is controlled by the control unit 120 included in the image forming apparatus 100 is described, the present exemplary embodiment does not need to be limited to this configuration. For example, a configuration in which a controller serving as a control unit for controlling the entirety of the image forming system 2000 is provided in a housing different from that of the image forming apparatus 100 and outside of the image forming apparatus 100 can be employed. In this case, the control unit only needs to have a configuration which is connected to the control unit 220 of the varnish application apparatus 200 or the control unit 420 of the stacker 400 via the control unit 120 of the image forming apparatus 100. Moreover, the controller unit can have a configuration which is directly connected to each of the control units 120, 220, and 420.

Next, a control flow representing a series of operations of image forming processing which is performed by the image forming apparatus 100, stack processing which is performed by the stacker 400, and varnish application processing which is performed by the varnish application apparatus 200 in the image forming system 2000 is described.

The control flow illustrated in FIG. 6 is started when a print signal is received in a standby state in which, for example, the adjustment of the entirety of the image forming system 2000 is completed. Here, the standby state is a state in which, in the image forming apparatus 100, the temperature of the fixing device 8 has reached a predetermined temperature available for fixing a toner image and is also a state in which, in response to receiving a print signal, the image forming apparatus 100 is ready to immediately form an image on a sheet. Moreover, the standby state is a state in which, in the varnish application apparatus 200, varnish is being supplied to the varnish application roller 213, is a state in which the heater 271 has reached a predetermined temperature and the radiation force of the UV radiation unit 272 has become a predetermined radiation force, and is also a state in which the varnish application apparatus 200 is ready to apply varnish to a sheet and harden the applied varnish.

If the control unit 120 has received a print signal via the communication unit 130 or the operation unit 95 (YES in step S201), then in step S202, the control unit 120 acquires processing information related to image forming processing, stack processing, and varnish application processing included in the print signal. Moreover, if the control unit 120 has not received a print signal (NO in step S201), the control unit 120 waits until receiving a print signal, thus maintaining the standby state of the image forming system 2000.

Then, in step S203, based on the processing information acquired in step S202, the control unit 120 transmits processing information related to the presence or absence of stack processing to the stacker 400 via the communication units 130, 230, and 430 and transmits processing information related to the presence or absence of varnish application processing to the varnish application apparatus 200. While, here, an example in which the control unit 120 transmits processing information related to the presence or absence of stack processing and the presence or absence of varnish application processing is described, a configuration in which, only when there are stack processing and varnish application processing, the control unit 120 transmits each piece of processing information to the stacker 400 or the varnish application apparatus 200 can be employed.

Next, in step S204, the control unit 120 controls the conveyance control unit 140, the image processing unit 150, and the drive unit 160 based on the processing information acquired in step S202, thus performing image forming processing on a sheet fed from the cassette 10.

Then, in step S205, the control unit 120 determines whether to perform stack processing based on the processing information acquired in step S202.

If it is determined to perform stack processing (YES in step S205), then in step S206, the control unit 120 transmits a signal to the control unit 420 via the communication units 130 and 430 and thus causes the control unit 420 to control the conveyance control unit 440 and the conveyance direction control unit 450 to perform stack processing to the storage portion 414.

If it is determined not to perform stack processing (NO in step S205), then in step S207, the control unit 120 transmits a signal to the control unit 220 via the communication units 130 and 230 and thus causes the control unit 220 to control the conveyance control unit 240, the varnish application control unit 250, and the varnish hardening control unit 260 to perform varnish application processing by the varnish application apparatus 200.

Then, in step S208, the control unit 120 determines whether all of the processing operations included in the print signal received in step S201 have ended. If it is determined that all of the processing operations have ended (YES in step S208), the control unit 120 causes the image forming system 2000 to transition to the standby state. Moreover, if it is determined that not all of the processing operations have ended (NO in step S208), the control unit 120 returns the processing to step S204 and then performs each processing operation on a next sheet.

While, in the second exemplary embodiment, a configuration in which the control units 220 and 420 operate based on a signal received from the control unit 120 of the image forming apparatus 100 has been described as an example, a configuration in which, after transmission of the processing information in step S203, the control units 220 and 420 perform respective control operations taking, for example, conveyance timing of a sheet as the starting point can be employed. Thus, a configuration in which, in step S203, the control unit 120 transmits processing information including timing for performing stack processing to the control unit 420 of the stacker 400, in step S205, the control unit 420 determines the presence or absence of execution of stack processing, and, then in step S206, the control unit 420 controls the stacker 400 can be employed. Moreover, a configuration in which, in step S203, the control unit 120 transmits processing information including timing for performing varnish application processing to the control unit 220 of the varnish application apparatus 200 and, in step S207, the control unit 220 controls the varnish application apparatus 200 can be employed.

In this way, in the image forming system 2000, in which the image forming apparatus 100, the stacker 400, and the varnish application apparatus 200 are connected inline, since the stacker 400 is arranged between the image forming apparatus 100 and the varnish application apparatus 200, even in a configuration in which the varnish application apparatus 200 does not include a separation mechanism for the varnish application roller 213, it is possible to discharge, from the image forming system 2000, a sheet with an image formed thereon by the image forming apparatus 100 without applying varnish application processing to the sheet. Thus, it is possible to provide an image forming system 2000 capable of selectively performing varnish application processing on a sheet with an image formed thereon by the image forming apparatus 100. Moreover, it is also possible to switch a discharge destination depending on the presence or absence of varnish application processing by discharging, to the discharge tray 236, a sheet with an image formed thereon by the image forming apparatus 100 and then subjected to varnish application processing and discharging, to the storage portion 414, a sheet with an image formed thereon by the image forming apparatus 100 and not being subjected to varnish application processing.

As described above, in the second exemplary embodiment, in an image forming system which performs both varnish application processing and processing other than the varnish application processing inline on a sheet with an image formed thereon by an image forming apparatus, it is possible to prevent or reduce a decrease in quality of a printed product and a decrease in productivity and it is possible to provide a printed product which the user desires.

Figure 7:
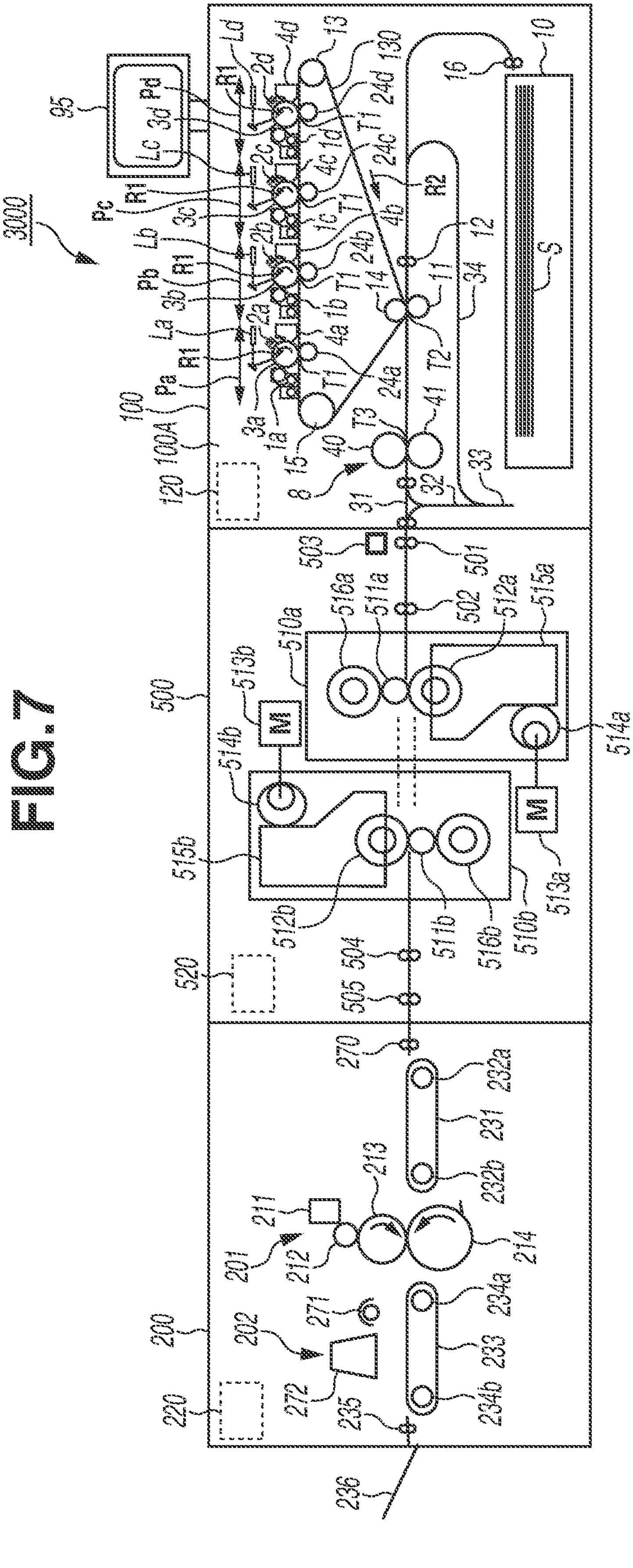
FIG. 7 is an outline sectional view of an image forming system in a third exemplary embodiment.

Next, a third exemplary embodiment of the present invention is described. As illustrated in FIG. 7, an image forming system 3000 in the third exemplary embodiment includes an image forming apparatus 100, which forms an image on a sheet, a varnish application apparatus 200, which applies varnish to a sheet with an image formed thereon, and a decurler apparatus 500, which corrects any curl of a sheet between the image forming apparatus 100 and the varnish application apparatus 200. In the third exemplary embodiment, the decurler apparatus 500 is an example of a sheet conveyance apparatus.

The image forming apparatus 100, the decurler apparatus 500, and the varnish application apparatus 200 are connected in series, so that varnish can be applied to a sheet conveyed from the image forming apparatus 100. Thus, varnish application processing and curl correction processing are performed on a sheet during a period from when the sheet is fed by the image forming apparatus 100 to when the sheet is discharged to outside the image forming system 3000.

In the image forming system 3000 in the third exemplary embodiment, the image forming apparatus 100 and the varnish application apparatus 200 have respective configurations similar to those in the first exemplary embodiment, and the respective constituent elements thereof are assigned the respective same reference characters and are, therefore, omitted from description.

<Decurler Apparatus>

The decurler apparatus 500 receives a sheet conveyed from the image forming apparatus 100 and then conveys the sheet to the varnish application apparatus 200, which is connected downstream of the decurler apparatus 500. Then, the decurler apparatus 500 corrects any curl occurring in a sheet with an image formed thereon by the image forming apparatus 100, and conveys the curl-corrected sheet to the varnish application apparatus 200.

A receiving roller 501 conveys a sheet discharged from the image forming apparatus 100 through the discharge conveyance path 31 to the inside of the decurler apparatus 500. The sheet conveyed to the inside of the decurler apparatus 500 by the receiving roller 501 is then conveyed to decurler portions 510*a* and 510*b* via a conveyance roller 502. The decurler portions 510*a* and 510*b* are arranged in a vertically inverted relationship with each other and are thus able to correct curls in respective different directions. In the third exemplary embodiment, the decurler portions 510*a* and 510*b* are an example of a sheet processing unit which performs predetermined processing on a sheet present in the decurler apparatus 500.

The decurler portion 510*a* includes a drive roller 511*a* and an adjustment roller 512*a*, which is larger in diameter than the drive roller 511*a* and is capable of adjusting a pressure force to be applied to the drive roller 511*a*. The pressure force of the adjustment roller 512*a* is adjusted by an arm mechanism 515*a*, which rotatably supports the adjustment roller 512*a*, being pressed by a decurler cam 514*a*, which rotates by driving of a motor 513*a*. The pressure force of the adjustment roller 512*a* is changed based on a result obtained by estimating the state of curl of a sheet from a paper type or a condition of, for example, temperature and humidity detected by a sensor (not illustrated).

Moreover, the position of the drive roller 511*a* obtained when the drive roller 511*a* is pressed against the adjustment roller 512*a* is restricted by the drive roller 511*a* coming into abutting contact with a backup roller 516*a*. Moreover, the drive roller 511*a* is driven to rotate by a motor (not illustrated).

The decurler portion 510*a* corrects any curl formed in a sheet by causing the drive roller 511*a* and the adjustment roller 512*a* to pinch and convey the sheet.

Furthermore, in the decurler portion 510*b*, constituent elements similar to those of the decurler portion 510*a* are arranged in a vertically inverted relationship and are assigned the respective similar reference characters, and are, therefore, omitted from description. In this way, since the decurler portion 510*b* is arranged in an inverted relationship with the decurler portion 510*a*, whichever of an upward curl and a downward curl the curl occurring in a sheet is, it is possible to correct the curl by the decurler apparatus 500. The decurler portions 510*a* and 510*b* are capable of conveying a sheet without performing decurl processing, by performing adjustment in such a way as to make the pressure forces of the adjustment rollers 512*a* and 512*b* weaker than those thereof obtained at the time of decurl processing.

Moreover, a sensor 503 for detecting a sheet is provided on the upstream side of the decurler portion 510*a* in the sheet conveyance direction. Then, a control unit 520 described below predicts timing at which a sheet arrives at the decurler portions 510*a* and 510*b* based on a result of detection by the sensor 503, and drives the motors 513*a* and 513*b* in such a manner that a predetermined pressure is applied to a sheet which passes through the decurler portions 510*a* and 510*b*.

In the third exemplary embodiment, in a case where an image is formed on only a first surface (one surface) of a sheet by the image forming apparatus 100, when the sheet is being conveyed by the receiving roller 501 with the first surface of the sheet facing up in the vertical direction (face-up), curl correction for the sheet is performed by the decurler portion 510*a*, which is on the upstream side in the sheet conveyance direction. Moreover, when the sheet is being conveyed by the receiving roller 501 with the first surface of the sheet facing down in the vertical direction (face-down), curl correction for the sheet is performed by the decurler portion 510*b*, which is on the downstream side in the sheet conveyance direction.

Furthermore, in a case where images are formed on both surfaces of a sheet by the image forming apparatus 100, which of the decurler portions 510*a* and 510*b* to use to perform curl correction is determined depending on which of facing up and facing down in the vertical direction the surface with an image formed later thereon out of the first surface and the second surface is. Thus, in a case where an image has been formed on the second surface after the first surface, when the sheet is being conveyed by the receiving roller 501 with the second surface facing up in the vertical direction, curl correction for the sheet is performed by the decurler portion 510*a*, which is on the upstream side. Moreover, in a case where an image has been formed on the second surface after the first surface, when the sheet is being conveyed by the receiving roller 501 with the second surface facing down in the vertical direction, curl correction for the sheet is performed by the decurler portion 510*b*, which is on the downstream side.

The sheet with any curl corrected by the decurler portion 510*a* or 510*b* is conveyed by a conveyance roller 504 and is then discharged by a discharge roller 505 to the outside of the decurler apparatus 500. In the third exemplary embodiment, since the varnish application apparatus 200 is connected on the downstream side of the decurler apparatus 500, the sheet discharged by the discharge roller 505 is passed to the receiving roller 270 of the varnish application apparatus 200.

In this way, whichever of face-up and face-down a curl is occurring in a sheet with an image formed thereon by the image forming apparatus 100, it is possible to convey, to the varnish application apparatus 200, the sheet with a curl corrected by the decurler portion 510*a* or 510*b*.

In the third exemplary embodiment, the decurler apparatus 500 is connected downstream of the image forming apparatus 100 and upstream of the varnish application apparatus 200 in the sheet conveyance direction. As long as this configuration is employed, a configuration in which another processing apparatus such as an inserter is connected between the decurler apparatus 500 and the varnish application apparatus 200 can be employed. Moreover, a configuration in which another processing apparatus such as a stacker is connected between the image forming apparatus 100 and the decurler apparatus 500 can be employed.

<Control of Image Forming System>

Figure 8:
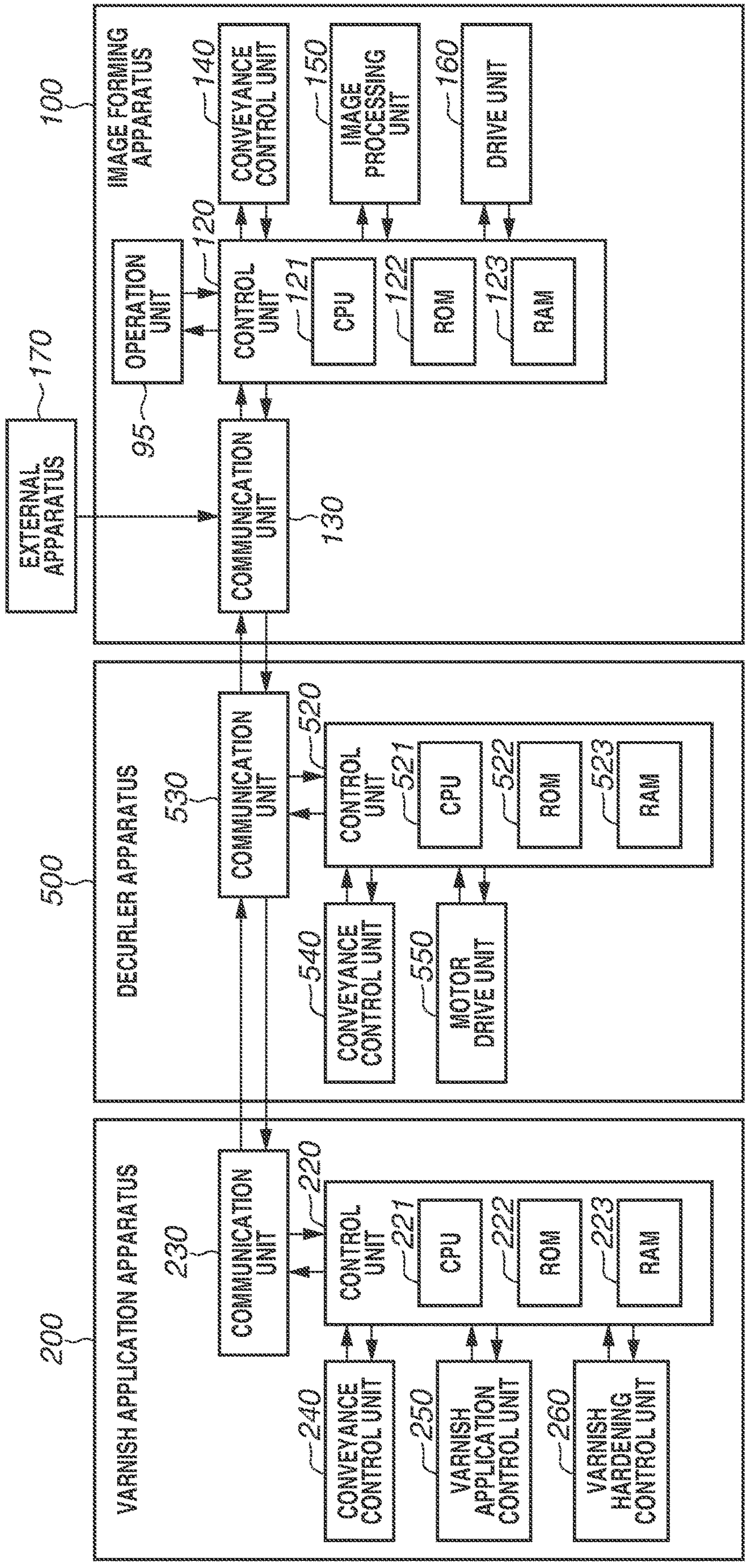
FIG. 8 is a control block diagram in the third exemplary embodiment.
Figure 9:
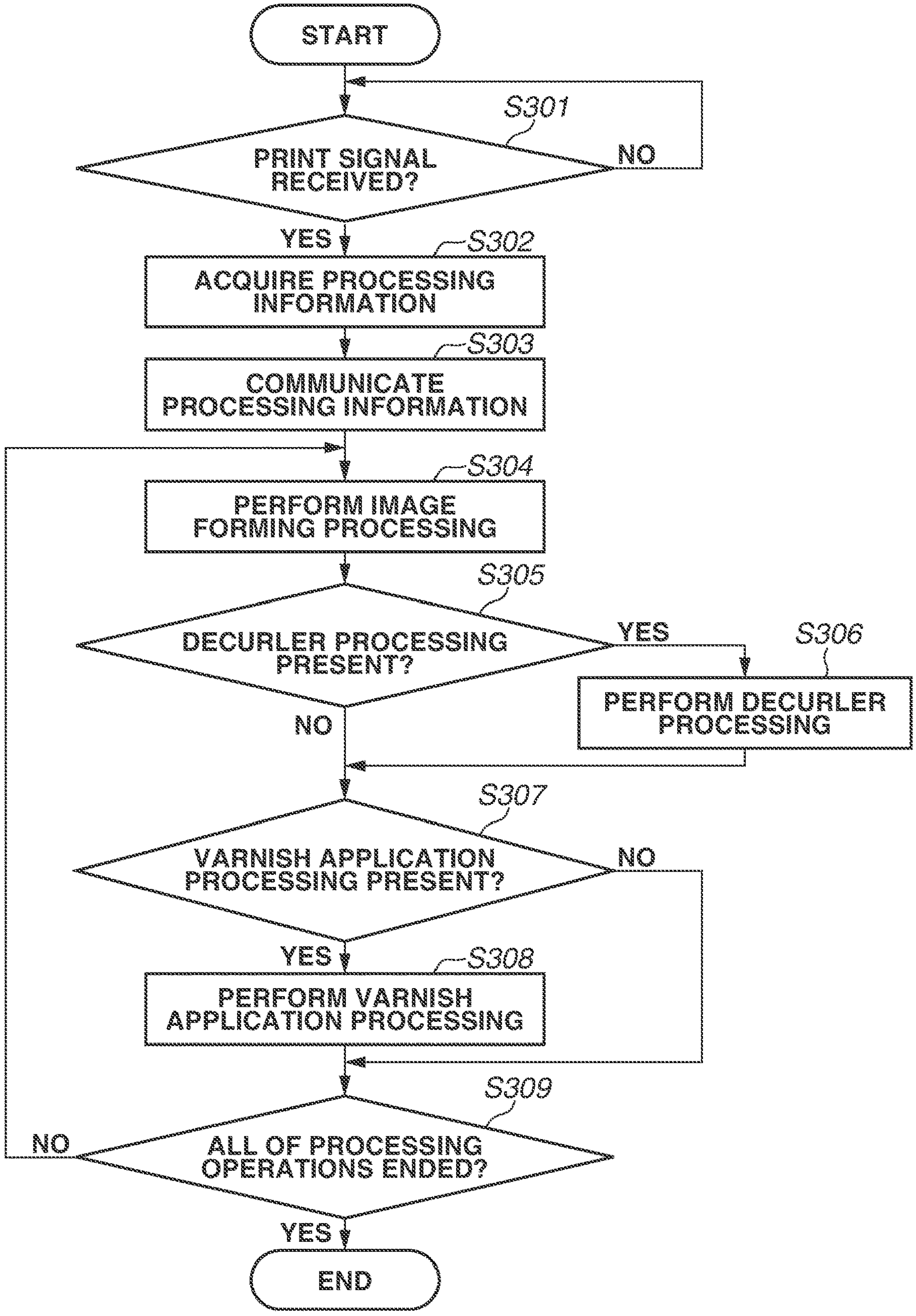
FIG. 9 is a flowchart illustrating a control flow in the third exemplary embodiment.

Next, an operation and control of the image forming system 3000 in the third exemplary embodiment are described. FIG. 8 is a control block diagram of the image forming system 3000, and FIG. 9 is a flowchart illustrating the control flow of the image forming system 3000 in the third exemplary embodiment. In the third exemplary embodiment, configurations of the image forming apparatus 100 and the varnish application apparatus 200 are similar to those in the first exemplary embodiment, and the respective constituent elements thereof are assigned the respective same reference characters and are, therefore, omitted from description.

In the image forming system 3000, the image forming apparatus 100 includes a control unit 120, the varnish application apparatus 200 includes a control unit 220, and the decurler apparatus 500 includes a control unit 520. The control units 120, 220, and 520 are configured to be able to communicate with each other via communication units 130, 230, and 530. In the third exemplary embodiment, the control unit 120 is an example of a first control unit, the control unit 220 is an example of a second control unit, and the control unit 520 is an example of a third control unit.

The control unit 120 of the image forming apparatus 100 is capable of receiving a print signal from an external apparatus 170 such as a PC via the communication unit 130. Moreover, the control unit 120 is capable of receiving a print signal via the operation unit 95. The print signal, which is a signal generated according to the processing content set by the user, includes, for example, the presence or absence of execution of various processing operations, such as image forming processing, decurl processing, and varnish application processing, the number of sheets to be processed, and the type of a sheet to be processed.

The control unit 520 of the decurler apparatus 500 includes a CPU 521, a ROM 522, and a RAM 523. The ROM 522 stores various programs used for the CPU 521 to control the decurler apparatus 500. The RAM 523 is used as a primary storage region for the CPU 521 to control various programs. Furthermore, the control of the decurler apparatus 500 includes, for example, conveyance control for conveying a sheet conveyed into the decurler apparatus 500 and adjustment control for pressure forces by the adjustment rollers 512*a* and 512*b*.

The control unit 520 of the decurler apparatus 500 controls conveyance units, such as the receiving roller 501, the conveyance rollers 502 and 504, and the discharge roller 505, via a conveyance control unit 540, thus performing conveyance control for a sheet present in the decurler apparatus 500. Moreover, the control unit 520 drives the motors 513*a* and 513*b* via a motor drive unit 550, thus performing adjustment control for pressure forces by the adjustment rollers 512*a* and 512*b*.

The decurler apparatus 500 is connected to the image forming apparatus 100 via the communication unit 530.

When having received a job from the user, the image forming apparatus 100 transmits, to the decurler apparatus 500 via the communication unit 130, an instruction about which of the decurler portions 510*a* and 510*b* to use to perform decurl processing and an instruction about, for example, pressure forces of the adjustment rollers 512*a* and 512*b*. In this way, the decurler apparatus 500 performs decurl processing based on a print signal received by the image forming apparatus 100.

Furthermore, while, in the third exemplary embodiment, a configuration in which the varnish application apparatus 200 is connected to the communication unit 130 of the image forming apparatus 100 via the communication unit 530 of the decurler apparatus 500 has been described, another configuration can be employed. For example, a configuration in which the communication unit 230 of the varnish application apparatus 200 is directly connected to the communication unit 130 of the image forming apparatus 100 can be employed.

As mentioned above, the image forming apparatus 100, the decurler apparatus 500, and the varnish application apparatus 200 are connected via the communication units 130, 230, and 530. Accordingly, in a case where a print signal has been input to the image forming system 3000, the image forming apparatus 100 transmits a processing content corresponding to the print signal to the decurler apparatus 500 and the varnish application apparatus 200. Moreover, in a case where an abnormality has occurred in the image forming apparatus 100, the image forming apparatus 100 is able to transmit a stop signal for stopping an operation of the varnish application apparatus 200 or the decurler apparatus 500. Additionally, since the communication units 130, 230, and 530 are able to perform bidirectional communication with each other, in a case where an abnormality has occurred in the varnish application apparatus 200 or the decurler apparatus 500, the image forming apparatus 100 is also able to stop an operation thereof in response to receiving information transmitted from the communication unit 230 or 530.

While, in the third exemplary embodiment, a configuration in which the entirety of the image forming system 3000 is controlled by the control unit 120 included in the image forming apparatus 100 is described, the present exemplary embodiment does not need to be limited to this configuration. For example, a configuration in which a controller serving as a control unit for controlling the entirety of the image forming system 3000 is provided in a housing different from that of the image forming apparatus 100 and outside of the image forming apparatus 100 can be employed. In this case, the control unit only needs to have a configuration which is connected to the control unit 220 of the varnish application apparatus 200 or the control unit 520 of the decurler apparatus 500 via the control unit 120 of the image forming apparatus 100. Moreover, the controller unit can have a configuration which is directly connected to each of the control units 120, 220, and 520.

Next, a control flow representing a series of operations of image forming processing which is performed by the image forming apparatus 100, decurl processing which is performed by the decurler apparatus 500, and varnish application processing which is performed by the varnish application apparatus 200 in the image forming system 3000 is described.

The control flow illustrated in FIG. 9 is started when a print signal is received in a standby state in which, for example, the adjustment of the entirety of the image forming system 3000 is completed. Here, the standby state is a state in which, in the image forming apparatus 100, the temperature of the fixing device 8 has reached a predetermined temperature available for fixing a toner image and is also a state in which, in response to receiving a print signal, the image forming apparatus 100 is ready to immediately form an image on a sheet. Moreover, the standby state is a state in which, in the varnish application apparatus 200, varnish is being supplied to the varnish application roller 213, is a state in which the heater 271 has reached a predetermined temperature and the radiation force of the UV radiation unit 272 has become a predetermined radiation force, and is also a state in which the varnish application apparatus 200 is ready to apply varnish to a sheet and harden the applied varnish.

If the control unit 120 has received a print signal via the communication unit 130 or the operation unit 95 (YES in step S301), then in step S302, the control unit 120 acquires processing information related to image forming processing, decurl processing, and varnish application processing included in the print signal. Moreover, if the control unit 120 has not received a print signal (NO in step S301), the control unit 120 waits until receiving a print signal, thus maintaining the standby state of the image forming system 3000.

Then, in step S303, based on the processing information acquired in step S302, the control unit 120 transmits processing information related to the presence or absence of decurl processing to the decurler apparatus 500 via the communication units 130, 230, and 530 and transmits processing information related to the presence or absence of varnish application processing to the varnish application apparatus 200. While, here, an example in which the control unit 120 transmits processing information related to the presence or absence of decurl processing and the presence or absence of varnish application processing is described, a configuration in which, only when there are decurl processing and varnish application processing, the control unit 120 transmits each piece of processing information to the decurler apparatus 500 or the varnish application apparatus 200 can be employed.

Next, in step S304, the control unit 120 controls the conveyance control unit 140, the image processing unit 150, and the drive unit 160 based on the processing information acquired in step S302, thus performing image forming processing on a sheet fed from the cassette 10.

Then, in step S305, the control unit 120 determines whether to perform decurl processing on a sheet with an image formed thereon by the image forming apparatus 100 in step S304, based on the processing information acquired in step S302.

If it is determined to perform decurl processing (YES in step S305), then in step S306, the control unit 120 transmits a signal to the control unit 520 via the communication units 130 and 530 and thus causes the control unit 520 to control the conveyance control unit 540 and the motor drive unit 550 to perform decurl processing by the decurler apparatus 500.

On the other hand, if it is determined not to perform decurl processing (NO in step S305), then in step S307, the control unit 120 determines whether to perform varnish application processing on a sheet with an image formed thereon by the image forming apparatus 100 in step S304, based on the processing information acquired in step S302.

If it is determined to perform varnish application processing (YES in step S307), then in step S308, the control unit 120 transmits a signal to the control unit 220 via the communication units 130 and 230 and thus causes the control unit 220 to control the conveyance control unit 240, the varnish application control unit 250, and the varnish hardening control unit 260 to perform varnish application processing by the varnish application apparatus 200.

On the other hand, if it is determined not to perform varnish application processing (NO in step S307), the control unit 120 transmits a signal to the control unit 220 via the communication units 130 and 230 and thus causes the control unit 220 to move the varnish application roller 213 away from the varnish drum 214, thus allowing passage of a sheet. At this time, the sheet is conveyed by the conveyance belts 231 and 233. Furthermore, a configuration in which a conveyance roller pair for pinching and conveying a sheet when the varnish application roller 213 is moved away from the varnish drum 214 is further provided can be employed.

Then, in step S309, the control unit 120 determines whether all of the processing operations included in the print signal received in step S301 have ended. If it is determined that all of the processing operations have ended (YES in step S309), the control unit 120 causes the image forming system 3000 to transition to the standby state. Moreover, if it is determined that not all of the processing operations have ended (NO in step S309), the control unit 120 returns the processing to step S304 and then performs each processing operation on a next sheet.

While, in the third exemplary embodiment, a configuration in which the control units 220 and 520 operate based on a signal received from the control unit 120 of the image forming apparatus 100 has been described as an example, a configuration in which, after transmission of the processing information in step S303, the control units 220 and 520 perform respective control operations taking, for example, conveyance timing of a sheet as the starting point can be employed. Thus, a configuration in which, in step S303, the control unit 120 transmits processing information including timing for performing decurl processing to the control unit 520 of the decurler apparatus 500, in step S305, the control unit 520 determines the presence or absence of execution of decurl processing, and, then in step S306, the control unit 520 controls the decurler apparatus 500 can be employed. Moreover, a configuration in which, in step S303, the control unit 120 transmits processing information including timing for performing varnish application processing to the control unit 220 of the varnish application apparatus 200, in step S307, the control unit 220 determines the presence or absence of execution of varnish application processing, and, in step S308, the control unit 220 controls the varnish application apparatus 200 can be employed.

In this way, in the image forming system 3000, in which the image forming apparatus 100, the decurler apparatus 500, and the varnish application apparatus 200 are connected inline, arranging the decurler apparatus 500 between the image forming apparatus 100 and the varnish application apparatus 200 enables conveying, to the varnish application apparatus 200, a sheet with a curl thereof corrected. With this configuration, it is possible to prevent or reduce a failure from occurring at the time of varnish application processing due to a curled sheet being conveyed to the varnish application apparatus 200. Specifically, it is possible to prevent or reduce an unevenness in the amount of application of varnish from occurring due to a sheet curled in such a manner that the leading edge or trailing edge of the sheet rises being conveyed to the varnish application apparatus 200. Moreover, it is possible to prevent or reduce a varnish application starting position or a varnish application ending position from deviating due to a sheet being curled.

Moreover, according to the third exemplary embodiment, it is possible to prevent or reduce a conveyance failure such as a paper jam from occurring in the varnish application apparatus 200 due to a curled sheet being conveyed. Specifically, it is possible to prevent or reduce a conveyance failure from occurring due to the front edge of a curled sheet being unable to enter a nip portion formed between the varnish application roller 213 and the varnish drum 214. Moreover, even in a case where the curled sheet has been able to enter a nip portion formed between the varnish application roller 213 and the varnish drum 214, the curled sheet when being subjected to varnish application processing becomes larger in curl. Accordingly, the sheet gets stuck at a portion between the UV radiation unit 272 and the conveyance belt 233, through which the sheet is conveyed after varnish application, so that a conveyance failure may occur. On the other hand, in the third exemplary embodiment, since a sheet with any curl thereof removed in advance by the decurler apparatus 500 is conveyed to the varnish application apparatus 200, it is possible to prevent or reduce such a conveyance failure.

As described above, in the third exemplary embodiment, in an image forming system which performs both varnish application processing and processing other than the varnish application processing inline on a sheet with an image formed thereon by an image forming apparatus, it is possible to prevent or reduce a decrease in quality of a printed product and a decrease in productivity caused by, for example, a conveyance failure and it is possible to provide a printed product which the user desires.

Figure 10:
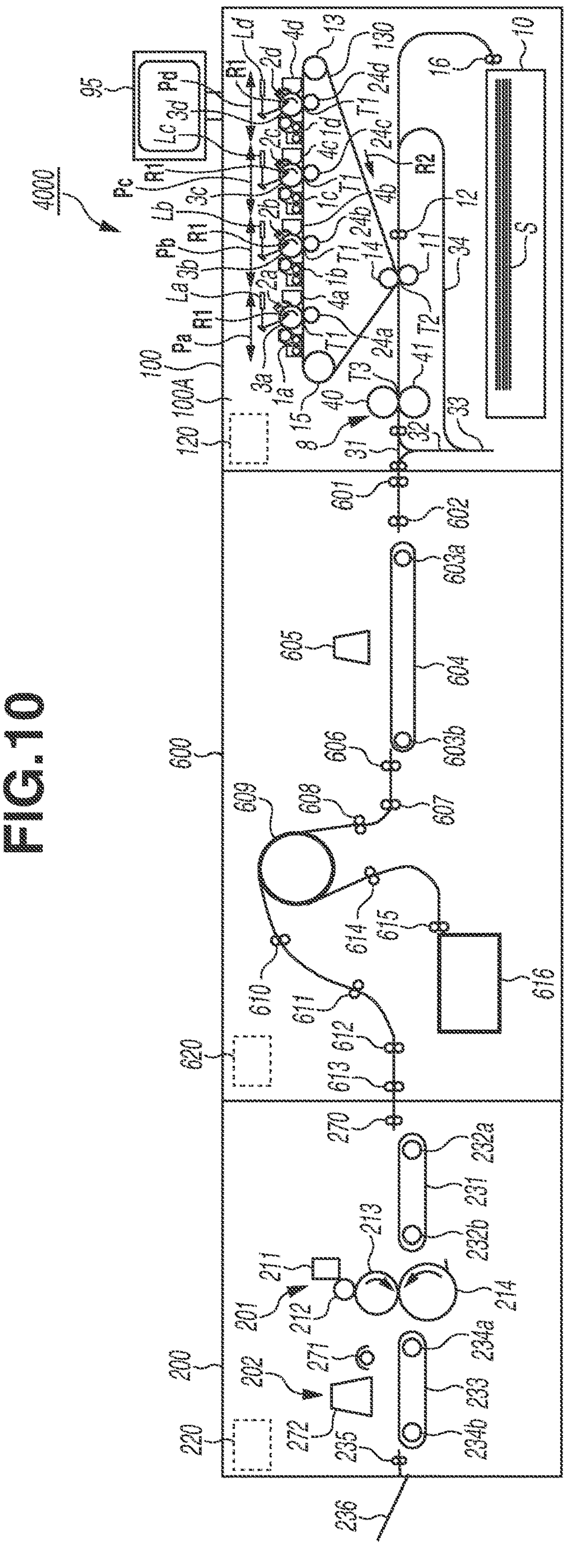
FIG. 10 is an outline sectional view of an image forming system in a fourth exemplary embodiment.

Next, a fourth exemplary embodiment of the present invention is described. As illustrated in FIG. 10, an image forming system 4000 in the fourth exemplary embodiment includes an image forming apparatus 100, which forms an image on a sheet, a varnish application apparatus 200, which applies varnish to a sheet with an image formed thereon, and an inspection apparatus 600, which reads an image on a sheet between the image forming apparatus 100 and the varnish application apparatus 200. The inspection apparatus 600 is used to determine and select an image quality of a printed product discharged from the image forming apparatus 100 and before passing through the varnish application apparatus 200, thus enabling performing varnish application on only a printed product satisfying a predetermined quality desired by the user. In the fourth exemplary embodiment, the inspection apparatus 600 is an example of a sheet conveyance apparatus.

The image forming apparatus 100, the inspection apparatus 600, and the varnish application apparatus 200 are connected in series, so that varnish can be applied to a sheet conveyed from the image forming apparatus 100. Thus, inspection processing and varnish application processing are performed on a sheet during a period from when the sheet is fed by the image forming apparatus 100 to when the sheet is discharged to outside the image forming system 4000.

In the image forming system 4000 in the fourth exemplary embodiment, the image forming apparatus 100 and the varnish application apparatus 200 have respective configurations similar to those in the first exemplary embodiment, and the respective constituent elements thereof are assigned the respective same reference characters and are, therefore, omitted from description.

<Inspection Apparatus>

The inspection apparatus 600 receives a sheet conveyed from the image forming apparatus 100 and then conveys the sheet to the varnish application apparatus 200, which is connected downstream of the inspection apparatus 600. Then, the inspection apparatus 600 reads an image formed on the sheet by the image forming apparatus 100 to determine whether the sheet with the image formed thereon is a printed product satisfying a predetermined quality. A control unit 620 of the inspection apparatus 600 or the control unit 120 of the image forming apparatus 100 detects a difference between a previously set reference image and an image read by the inspection apparatus 600 and thus determines whether there is, for example, a clerical error or a smudge in the read image. As a result of determination, the inspection apparatus 600 conveys only a printed product satisfying a previously set threshold value to the varnish application apparatus 200, and discharges a printed product not satisfying the previously set threshold value to a discharge tray 616 provided in the inspection apparatus 600.

A receiving roller 601 conveys, to the inside of the inspection apparatus 600, a sheet discharged from the image forming apparatus 100 through the discharge conveyance path 31. The sheet conveyed to the inside of the inspection apparatus 600 by the receiving roller 601 is further conveyed toward the downstream side by a conveyance roller 602 and is then conveyed to a conveyance belt 604, which is suspended in a tensioned manner by tensile suspension rollers 603_a_ and 603_b_. A scanner portion 605 is provided above the conveyance belt 604 in the vertical direction. With this configuration, while a sheet discharged from the image forming apparatus 100 is being conveyed by the conveyance belt 604, an image on the sheet is read by the scanner portion 605, which is an example of a reading unit.

The scanner portion 605, which is an image scanner including a light source for image reading and a line sensor or a spectroscopic sensor, reads an image by performing scanning the surface of a sheet conveyed by the conveyance belt 604. The image read here is used for the control unit 620 described below to determine the presence or absence of an abnormal image, and what is called inspection processing is performed in such a manner that, if there is no abnormal image, the result of determination is "OK" and, if there is an abnormal image, the result of determination is "NG". Here, an image to be determined as "NG" is an image in which what is called a streaky or dot-like image void or smudge is superposed on a previously set reference image or an image in which the color difference ΔE00 does not fall within a designated allowable range with respect to the color gamut of an original. Generally, when the color difference ΔE00 is less than or equal to 2.0, the difference is said to be unlikely to be recognizable as a human sense of vision, and, even in the fourth exemplary embodiment, the allowable range for the color difference ΔE00 is defined to be less than or equal to 2.0.

Then, the sheet, an image on which has been read by the scanner portion 605, is further conveyed by the conveyance belt 604 toward the downstream side in the conveyance direction, and is then conveyed to a conveyance direction switching mechanism 609 via conveyance rollers 606, 607, and 608.

Here, the conveyance of a sheet after an image on the sheet has been read by the scanner portion 605 is described. The conveyance direction switching mechanism 609 selects a conveyance destination for the sheet according to "OK" or "NG" determined by the control unit 620 upon receiving a result of inspection processing by the control unit 620.

In a case where the result of inspection processing is "OK", the conveyance direction switching mechanism 609 switches the conveyance direction in such a way as to convey the sheet toward a conveyance roller 610. The sheet conveyed by the conveyance roller 610 is then conveyed to a discharge roller 613 by conveyance rollers 611 and 612.

Then, the sheet the result of inspection processing about which is "OK" is discharged from the inspection apparatus 600 by the discharge roller 613, and is then conveyed to the varnish application apparatus 200.

In a case where the result of inspection processing is "NG", the conveyance direction switching mechanism 609 switches the conveyance direction in such a way as to convey the sheet toward a conveyance roller 614. The sheet conveyed by the conveyance roller 614 is stored in the discharge tray 616, which is provided in the inspection apparatus 600, by a conveyance roller 615. Furthermore, in the fourth exemplary embodiment, the varnish application apparatus 200 does not include any other conveyance path, other than a sheet conveyance path for performing varnish application processing, inside the varnish application apparatus 200.

In this way, the inspection apparatus 600 performs inspection processing based on an image read by the scanner portion 605, and, as mentioned above, as a result of inspection processing, the inspection apparatus 600 conveys a sheet in which any abnormal image is not included to the varnish application apparatus 200, which is on the downstream side of the inspection apparatus 600, and stores a sheet in which an abnormal image is included in the discharge tray 616. Accordingly, this enables discharging a sheet in which an abnormal image is included without applying varnish application processing by the varnish application apparatus 200 to the sheet.

While, in the fourth exemplary embodiment, a drum-shaped mechanism has been described as the conveyance direction switching mechanism 609, a configuration in which the conveyance direction is switched by, for example, a diverter can be employed.

Moreover, in the fourth exemplary embodiment, the inspection apparatus 600 is connected downstream of the image forming apparatus 100 and upstream of the varnish application apparatus 200 in the sheet conveyance direction. As long as this configuration is employed, a configuration in which another processing apparatus such as an inserter is connected between the image forming apparatus 100 and the inspection apparatus 600 can be employed. Moreover, a configuration in which another processing apparatus such as a stacker is connected between the inspection apparatus 600 and the varnish application apparatus 200 can be employed.

<Control of Image Forming System>

Figure 11:
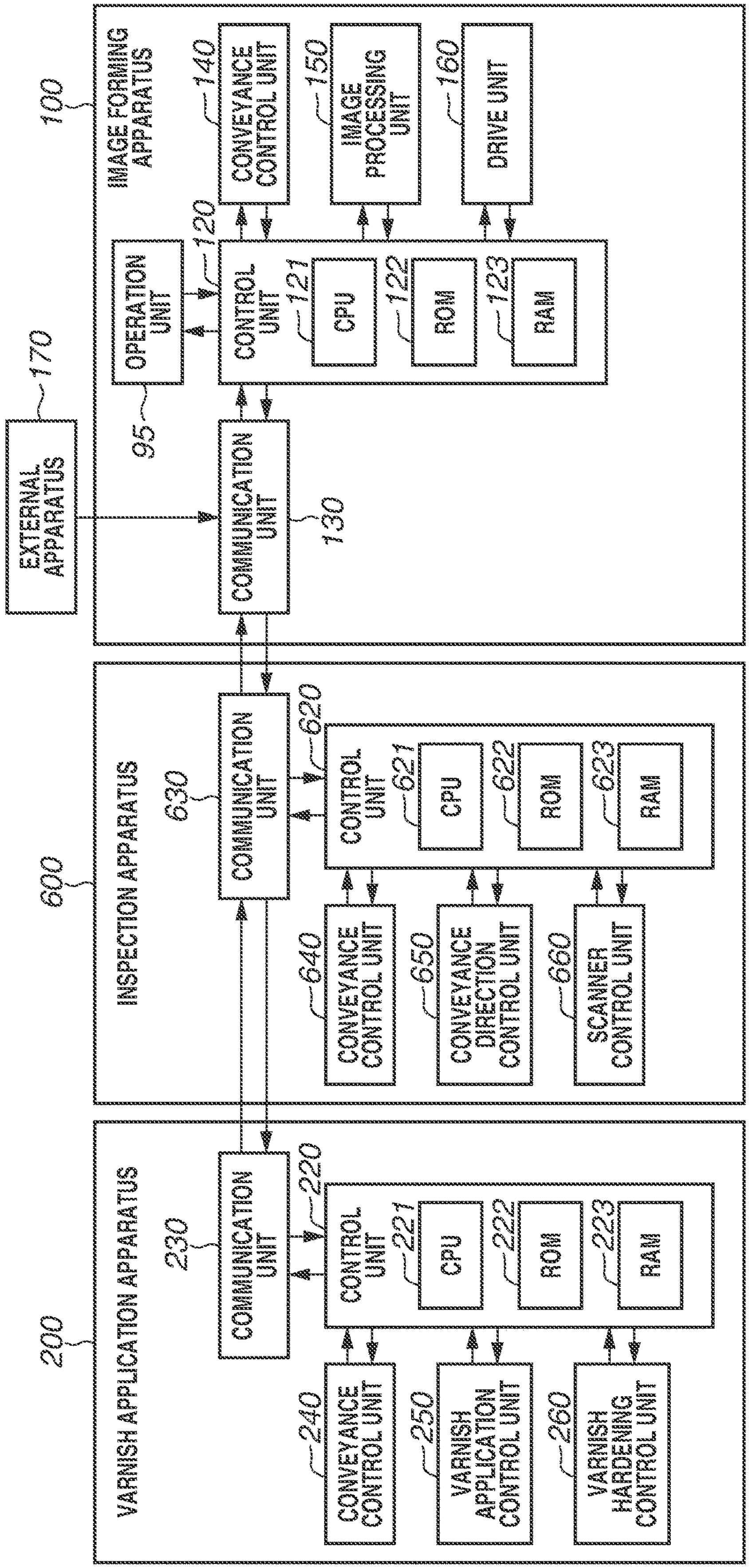
FIG. 11 is a control block diagram in the fourth exemplary embodiment.
Figure 12:
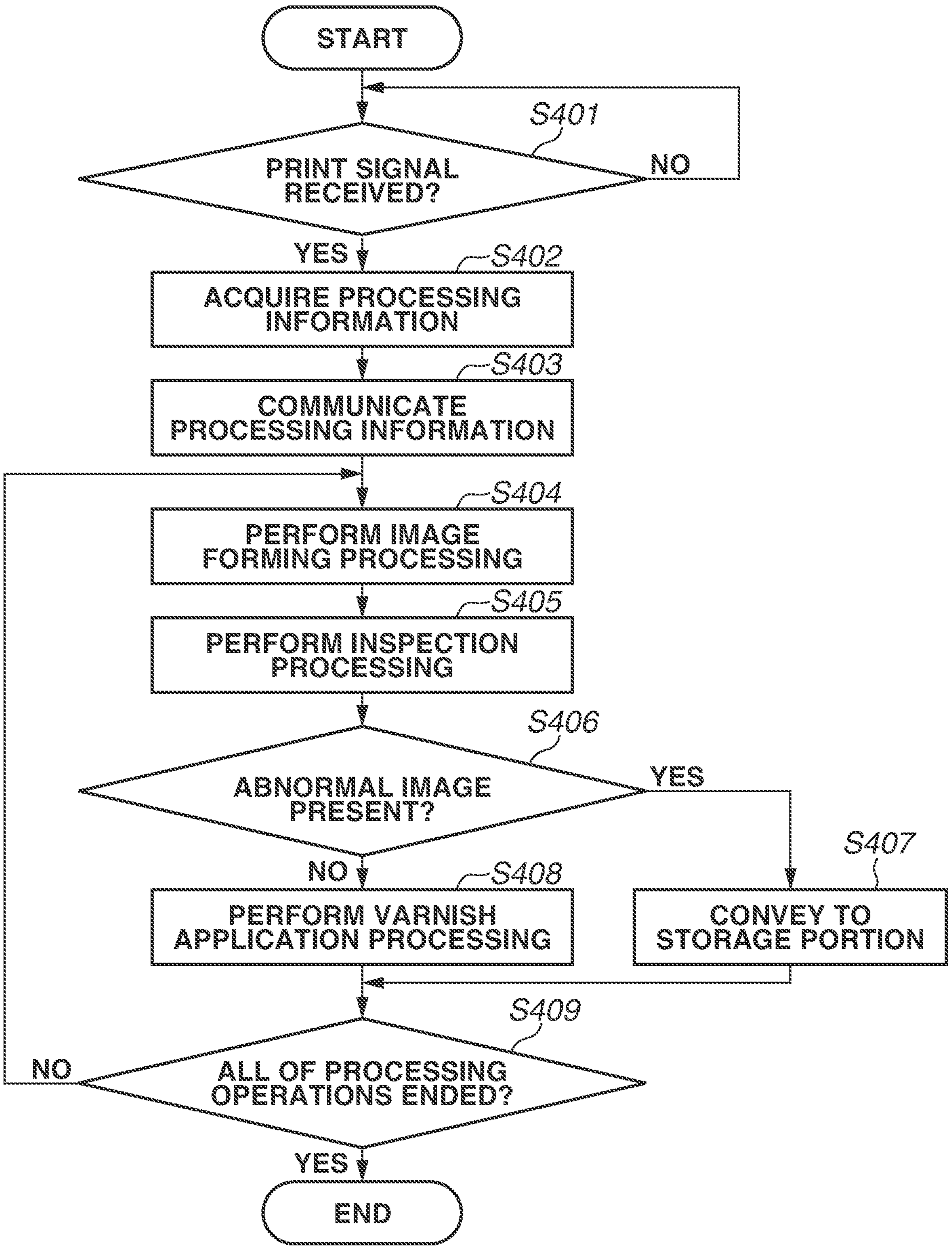
FIG. 12 is a flowchart illustrating a control flow in the fourth exemplary embodiment.

Next, an operation and control of the image forming system 4000 in the fourth exemplary embodiment are described. FIG. 11 is a control block diagram of the image forming system 4000, and FIG. 12 is a flowchart illustrating the control flow of the image forming system 4000 in the fourth exemplary embodiment. In the fourth exemplary embodiment, configurations of the image forming apparatus 100 and the varnish application apparatus 200 are similar to those in the first exemplary embodiment, and the respective constituent elements thereof are assigned the respective same reference characters and are, therefore, omitted from description.

In the image forming system 4000, the image forming apparatus 100 includes a control unit 120, the varnish application apparatus 200 includes a control unit 220, and the inspection apparatus 600 includes a control unit 620. The control units 120, 220, and 620 are configured to be able to communicate with each other via communication units 130, 230, and 630. In the fourth exemplary embodiment, the control unit 120 is an example of a first control unit, the control unit 220 is an example of a second control unit, and the control unit 620 is an example of a third control unit.

The control unit 120 of the image forming apparatus 100 is capable of receiving a print signal from an external apparatus 170 such as a PC via the communication unit 130. Moreover, the control unit 120 is capable of receiving a print signal via the operation unit 95. The print signal, which is a signal generated according to the processing content set by the user, includes, for example, the presence or absence of execution of various processing operations, such as image forming processing, inspection processing, and varnish application processing, the number of sheets to be processed, and the type of a sheet to be processed.

The control unit 620 of the inspection apparatus 600 includes a CPU 621, a ROM 622, and a RAM 623. The ROM 622 stores various programs used for the CPU 621 to control the inspection apparatus 600. The RAM 623 is used as a primary storage region for the CPU 621 to control various programs. Furthermore, the control of the inspection apparatus 600 includes, for example, conveyance control for conveying a sheet conveyed into the inspection apparatus 600, control of reading by the scanner portion 605, and conveyance control for changing the conveyance direction.

The control unit 620 of the inspection apparatus 600 controls conveyance units, such as the receiving roller 601, the tensile suspension rollers 603*a* and 603*b*, the conveyance rollers 606 to 608 and 610 to 612, the discharge roller 613, and the conveyance rollers 614 and 615, via a conveyance control unit 640, thus performing conveyance control for a sheet present in the inspection apparatus 600. Moreover, the control unit 620 controls the conveyance direction switching mechanism 609 via a conveyance direction control unit 650, thus performing processing for switching the sheet conveyance direction. Moreover, the control unit 620 controls a scanner control unit 660, thus performing reading processing by the scanner portion 605.

The inspection apparatus 600 is connected to the image forming apparatus 100 via a communication unit 630. When having received a print signal from the user, the control unit 120 of the image forming apparatus 100 transmits, for example, reference image data for inspection processing and a determination condition for an abnormal image to the inspection apparatus 600 via the communication unit 130. The control unit 620 of the inspection apparatus 600 performs inspection processing based on, for example, the reference image data and the determination condition for an abnormal image received from the control unit 120 of the image forming apparatus 100 and image data read by the scanner portion 605.

While, in the fourth exemplary embodiment, a configuration in which the presence or absence of an abnormal image is detected by the control unit 620 of the inspection apparatus 600 has been described, a configuration in which the presence or absence of an abnormal image is detected by another control unit based on an image read by the scanner portion 605 can be employed. For example, a configuration in which an image read by the scanner portion 605 of the inspection apparatus 600 is transmitted to the control unit 120 of the image forming apparatus 100 via the control unit 620 and a comparison with reference image data is made by or the presence or absence of an abnormal image is detected by the control unit 120 can be employed.

Furthermore, while, in the fourth exemplary embodiment, a configuration in which the varnish application apparatus 200 is connected to the communication unit 130 of the image forming apparatus 100 via the communication unit 630 of the inspection apparatus 600 has been described, another configuration can be employed.

For example, a configuration in which the communication unit 230 of the varnish application apparatus 200 is directly connected to the communication unit 130 of the image forming apparatus 100 can be employed.

As mentioned above, the image forming apparatus 100, the inspection apparatus 600, and the varnish application apparatus 200 are connected to each other via the communication units 130, 230, and 630. Accordingly, in a case where a print signal has been input to the image forming system 4000, the image forming apparatus 100 transmits a processing content corresponding to the print signal to the inspection apparatus 600 and the varnish application apparatus 200. Moreover, in a case where an abnormality has occurred in the image forming apparatus 100, the image forming apparatus 100 is able to transmit a stop signal for stopping an operation of the varnish application apparatus 200 or the inspection apparatus 600. Additionally, since the communication units 130, 230, and 630 are able to perform bidirectional communication with each other, in a case where an abnormality has occurred in the varnish application apparatus 200 or the inspection apparatus 600, the image forming apparatus 100 is also able to stop an operation thereof in response to receiving information transmitted from the communication unit 230 or 630.

While, in the fourth exemplary embodiment, a configuration in which the entirety of the image forming system 4000 is controlled by the control unit 120 included in the image forming apparatus 100 is described, the present exemplary embodiment does not need to be limited to this configuration. For example, a configuration in which a controller serving as a control unit for controlling the entirety of the image forming system 4000 is provided in a housing different from that of the image forming apparatus 100 and outside of the image forming apparatus 100 can be employed. In this case, the control unit only needs to have a configuration which is connected to the control unit 220 of the varnish application apparatus 200 or the control unit 620 of the inspection apparatus 600 via the control unit 120 of the image forming apparatus 100. Moreover, the controller unit can have a configuration which is directly connected to each of the control units 120, 220, and 620.

Next, a control flow representing a series of operations of image forming processing which is performed by the image forming apparatus 100, inspection processing which is performed by the inspection apparatus 600, and varnish application processing which is performed by the varnish application apparatus 200 in the image forming system 4000 is described.

The control flow illustrated in FIG. 12 is started when a print signal is received in a standby state in which, for example, the adjustment of the entirety of the image forming system 4000 is completed. Here, the standby state is a state in which, in the image forming apparatus 100, the temperature of the fixing device 8 has reached a predetermined temperature available for fixing a toner image and is also a state in which, in response to receiving a print signal, the image forming apparatus 100 is ready to immediately form an image on a sheet. Moreover, the standby state is a state in which, in the varnish application apparatus 200, varnish is being supplied to the varnish application roller 213, is a state in which the heater 271 has reached a predetermined temperature and the radiation force of the UV radiation unit 272 has become a predetermined radiation force, and is also a state in which the varnish application apparatus 200 is ready to apply varnish to a sheet and harden the applied varnish.

If the control unit 120 has received a print signal via the communication unit 130 or the operation unit 95 (YES in step S401), then in step S402, the control unit 120 acquires processing information related to image forming processing, inspection processing, and varnish application processing included in the print signal. Moreover, if the control unit 120 has not received a print signal (NO in step S401), the control unit 120 waits until receiving a print signal, thus maintaining the standby state of the image forming system 4000.

Then, in step S403, based on the processing information acquired in step S402, the control unit 120 transmits reference image data required for inspection processing and processing information serving as a determination criterion for an abnormal image to the inspection apparatus 600 via the communication units 130, 230, and 630 and transmits processing information related to the presence or absence of varnish application processing to the varnish application apparatus 200.

Next, in step S404, the control unit 120 controls the conveyance control unit 140, the image processing unit 150, and the drive unit 160 based on the processing information acquired in step S402, thus performing image forming processing on a sheet fed from the cassette 10.

Then, in step S405, the control unit 120 outputs a signal to the control unit 620 via the communication units 130 and 630 and thus causes the control unit 620 to control the conveyance direction control unit 650 and the scanner control unit 660, thus performing reading processing by the scanner portion 605 and then performing inspection processing based on reference image data and processing information serving as a determination criterion for an abnormal image acquired in step S403.

Then, in step S406, the control unit 120 determines the presence or absence of an abnormal image as a result of the inspection processing performed in step S405.

If it is determined that an abnormal image is included (YES in step S406), then in step S407, the control unit 120 outputs a signal to the control unit 620 via the communication units 130 and 630 and thus causes the control unit 620 to control the conveyance control unit 640 and the conveyance direction control unit 650, thus storing, in the discharge tray 616, a sheet in which an abnormal image is included.

If it is determined that no abnormal image is included (NO in step S406), then in step S408, the control unit 120 outputs a signal to the control unit 220 via the communication units 130 and 230 and thus causes the control unit 220 to control the conveyance control unit 240, the varnish application control unit 250, and the varnish hardening control unit 260 to perform varnish application processing by the varnish application apparatus 200.

Then, in step S409, the control unit 120 determines whether all of the processing operations included in the print signal received in step S401 have ended. If it is determined that all of the processing operations have ended (YES in step S409), the control unit 120 causes the image forming system 4000 to transition to the standby state. Moreover, if it is determined that not all of the processing operations have ended (NO in step S409), the control unit 120 returns the processing to step S404 and then performs each processing operation on a next sheet.

While, in the fourth exemplary embodiment, a configuration in which the control units 220 and 620 operate based on a signal received from the control unit 120 of the image forming apparatus 100 has been described as an example, a configuration in which, after transmission of the processing information in step S403, the control units 220 and 620 perform respective control operations taking, for example, conveyance timing of a sheet as the starting point can be employed. Thus, a configuration in which, in step S403, the control unit 120 transmits processing information including timing for performing varnish application processing to the control unit 220 of the varnish application apparatus 200 and, in step S408, the control unit 220 controls the varnish application apparatus 200 can be employed.

Moreover, while, in the fourth exemplary embodiment, a configuration in which inspection processing is performed on all of the sheets with images formed thereon by the image forming apparatus 100 has been described, a configuration in which, in response to the presence or absence of inspection processing being set, inspection processing is performed only in a case where inspection processing has been set can be employed. In a case where inspection is not to be performed, the inspection apparatus 600 only needs to convey a sheet discharged from the image forming apparatus 100 to the varnish application apparatus 200 without reading an image on the sheet.

In this way, in the image forming system 4000, in which the image forming apparatus 100, the inspection apparatus 600, and the varnish application apparatus 200 are connected inline, since the inspection apparatus 600 is arranged between the image forming apparatus 100 and the varnish application apparatus 200, it becomes possible to perform inspection processing of an image before a sheet is conveyed to the varnish application apparatus 200. With respect to a printed product discharged from the image forming apparatus 100, it also becomes possible to determine and select an image quality before the sheet passes through the varnish application apparatus 200 and perform varnish application on only a printed product satisfying a desired predetermined quality. This enables preventing a shortage of varnish caused by varnish application processing being performed on a sheet including an abnormal image.

Moreover, if the inspection apparatus 600 is connected downstream of the varnish application apparatus 200, inspection processing is performed on a sheet on which varnish application processing has been performed. In this case, since the sheet becomes glossy due to the varnish application processing, it may be impossible to correctly perform the determination of an abnormal image in inspection processing. On the other hand, in the fourth exemplary embodiment, since varnish application processing is performed after inspection processing is performed and the determination of an abnormal image is correctly performed, it is possible to correctly perform inspection processing by the inspection apparatus 600.

As described above, in the fourth exemplary embodiment, in an image forming system which performs both varnish application processing and processing other than the varnish application processing inline on a sheet with an image formed thereon by an image forming apparatus, it is possible to prevent or reduce a decrease in quality of a printed product and it is possible to provide a printed product which the user desires.

Figure 13:
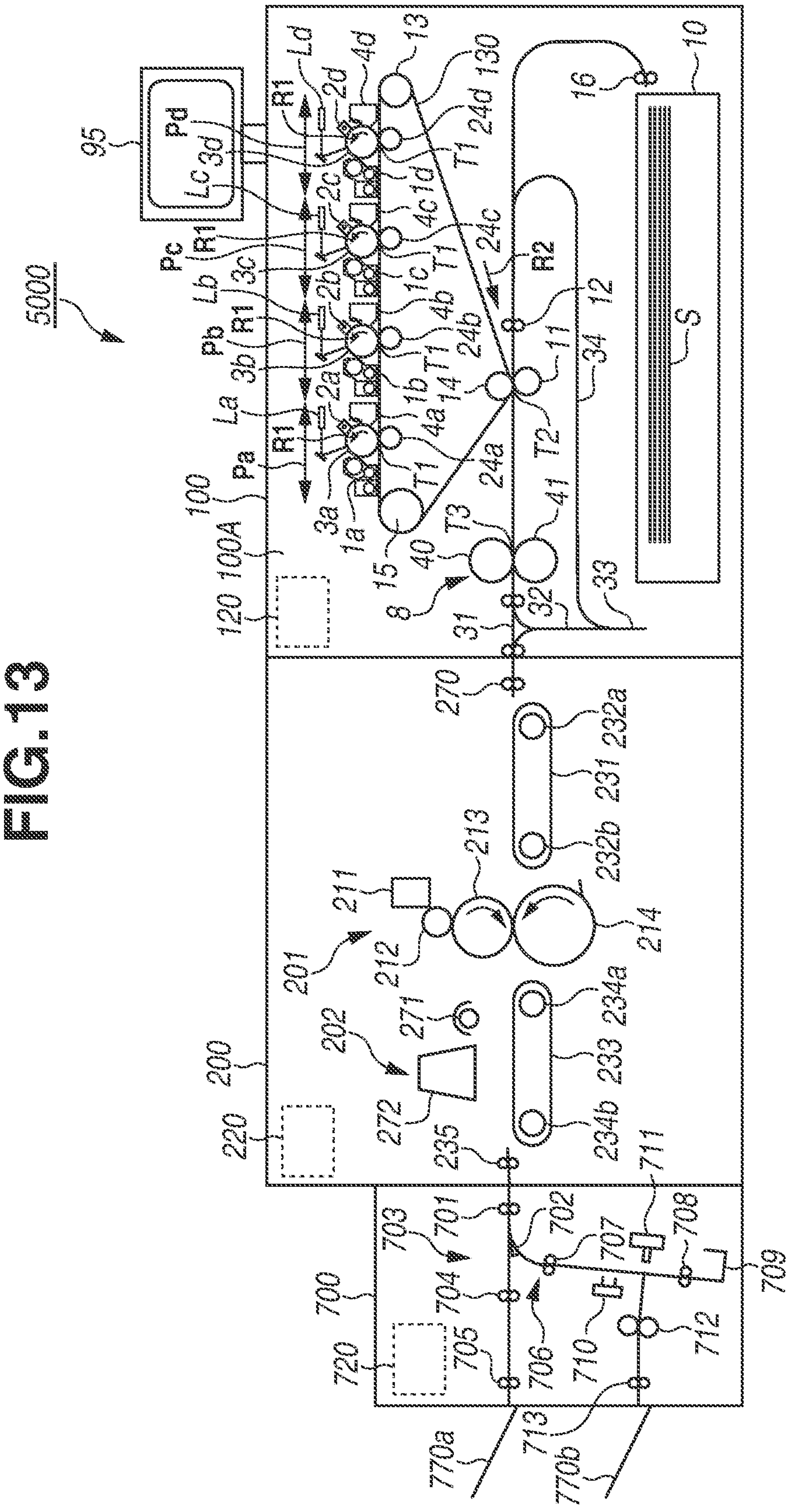
FIG. 13 is an outline sectional view of an image forming system in a fifth exemplary embodiment.

Next, a fifth exemplary embodiment of the present invention is described. As illustrated in FIG. 13, an image forming system 5000 in the fifth exemplary embodiment includes an image forming apparatus 100, which forms an image on a sheet, a varnish application apparatus 200, which applies varnish to a sheet with an image formed thereon, and a binding processing apparatus 700, which performs binding processing of a plurality of sheets. In the fifth exemplary embodiment, the binding processing apparatus 700 is an example of a sheet conveyance apparatus.

The image forming apparatus 100, the varnish application apparatus 200, and the binding processing apparatus 700 are connected in series and are configured to be able to apply varnish to sheets conveyed from the image forming apparatus 100 and perform binging processing of the sheets. Thus, varnish application processing and binding processing are performed on a sheet during a period from when the sheet is fed by the image forming apparatus 100 to when the sheet is discharged to outside the image forming system 5000.

In the image forming system 5000 in the fifth exemplary embodiment, the image forming apparatus 100 and the varnish application apparatus 200 have respective configurations similar to those in the first exemplary embodiment, and the respective constituent elements thereof are assigned the respective same reference characters and are, therefore, omitted from description. Furthermore, the fifth exemplary embodiment differs from the first to fourth exemplary embodiments in that the varnish application apparatus 200 is connected to the image forming apparatus 100. Accordingly, the receiving roller 270 of the varnish application apparatus 200 conveys a sheet discharged from the image forming apparatus 100 through the discharge conveyance path 31 to the inside of the varnish application apparatus 200. Moreover, a sheet discharged by the discharge roller 235 of the varnish application apparatus 200 is then conveyed to the binding processing apparatus 700.

<Binding Processing Apparatus>

The binding processing apparatus 700 performs saddle stitch processing on a plurality of sheets. A sheet discharged by the discharge roller 235 of the varnish application apparatus 200 is then conveyed to the inside of the binding processing apparatus 700 by a receiving roller 701 of the binding processing apparatus 700.

In a case where binding processing is not included in a print signal which the image forming system 5000 has received, a sheet which is conveyed by the receiving roller 701 is conveyed to a first conveyance path 703 via a diverter 702 and is then discharged to a discharge tray 770*a*, which is provided at the binding processing apparatus 700, via a conveyance roller 704 and a discharge roller 705. Thus, the sheet is discharged to the outside of the image forming system 5000.

Moreover, in a case where binding processing is included in a print signal which the image forming apparatus 100 has received, a sheet which is conveyed by the receiving roller 701 is conveyed to a second conveyance path 706 via the diverter 702 and is then conveyed by conveyance rollers 707 and 708. The sheet which is conveyed by the conveyance roller 708 is conveyed until the leading edge of the sheet in the conveyance direction is stacked on a saddle processing tray 709.

Then, after all of the sheets required for binding processing are stacked on the saddle processing tray 709, the saddle processing tray 709 is moved upward in the vertical direction to a position available for saddle stitch processing by a stapler unit 710. When the stapler unit 710 moves to a position corresponding to the center of the sheets, the binding processing apparatus 700 performs binding processing on the sheets by the stapler unit 710. Additionally, the saddle processing tray 709 moves the sheets, and a paper guide plate 711 operates in such a way as to push out the center position of the sheets toward a fold roller 712.

With this operation, the sheets the central portion of which has been folded along the position subjected to binding processing by the stapler unit 710 are further conveyed toward the downstream side while receiving a predetermined pressure applied by the fold roller 712. Then, the sheets are discharged, as a printed product with saddle stitch performed thereon, by a discharge roller 713 to a discharge tray 770*b*, which is provided at the binding processing apparatus 700. Here, the stapler unit 710 is an example of a binding processing unit, and the fold roller 712 is an example of a fold processing unit. Moreover, the stapler unit 710 and the fold roller 712 are an example of a processing unit which performs predetermined processing on a sheet received by the receiving roller 701. Furthermore, while, in the fifth exemplary embodiment, saddle stitch processing has been described as an example of processing which is performed by the binding processing apparatus 700, an apparatus which performs another type of binding processing, such as end binding, corner binding, or stapleless binding, can be employed.

Moreover, in the fifth exemplary embodiment, the binding processing apparatus 700 is connected downstream of the varnish application apparatus 200 in the sheet conveyance direction. As long as this configuration is satisfied, a configuration in which another processing apparatus such as an inserter, an inspection apparatus, or a decurler apparatus can be connected between the image forming apparatus 100 and the varnish application apparatus 200.

<Control of Image Forming System>

Figure 14:
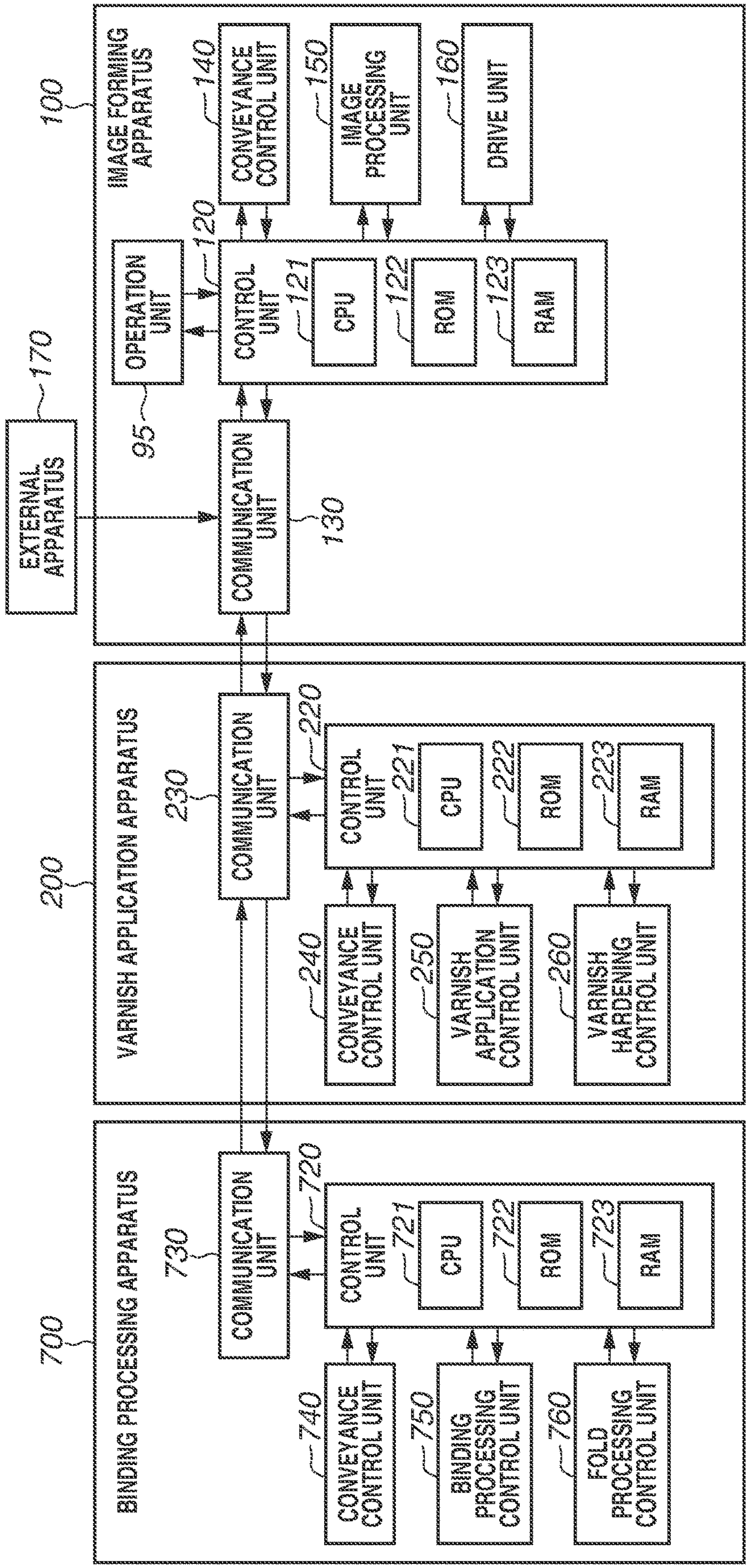
FIG. 14 is a control block diagram in the fifth exemplary embodiment.
Figure 15:
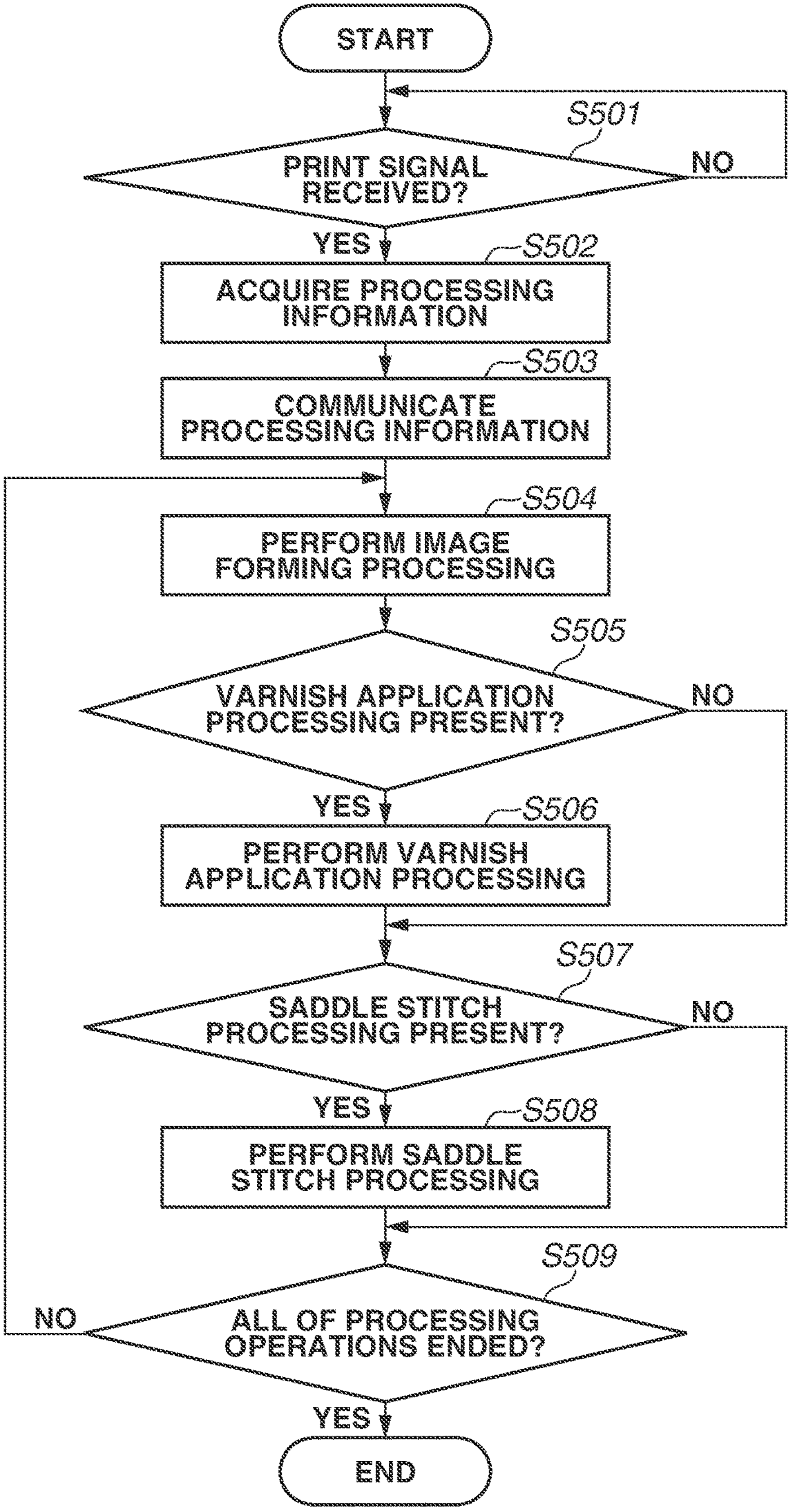
FIG. 15 is a flowchart illustrating a control flow in the fifth exemplary embodiment.

Next, an operation and control of the image forming system 5000 in the fifth exemplary embodiment are described. FIG. 14 is a control block diagram of the image forming system 5000, and FIG. 15 is a flowchart illustrating the control flow of the image forming system 5000 in the fifth exemplary embodiment. In the fifth exemplary embodiment, configurations of the image forming apparatus 100 and the varnish application apparatus 200 are similar to those in the first exemplary embodiment, and the respective constituent elements thereof are assigned the respective same reference characters and are, therefore, omitted from description.

In the image forming system 5000, the image forming apparatus 100 includes a control unit 120, the varnish application apparatus 200 includes a control unit 220, and the binding processing apparatus 700 includes a control unit 720. The control units 120, 220, and 720 are configured to be able to communicate with each other via communication units 130, 230, and 730. In the fifth exemplary embodiment, the control unit 120 is an example of a first control unit, the control unit 220 is an example of a second control unit, and the control unit 720 is an example of a third control unit.

The control unit 120 of the image forming apparatus 100 is capable of receiving a print signal from an external apparatus 170 such as a PC via the communication unit 130. Moreover, the control unit 120 is capable of receiving a print signal via the operation unit 95. The print signal, which is a signal generated according to the processing content set by the user, includes, for example, the presence or absence of execution of various processing operations, such as image forming processing, binding processing, and varnish application processing, the number of sheets to be processed, and the type of a sheet to be processed.

The control unit 720 of the binding processing apparatus 700 includes a CPU 721, a ROM 722, and a RAM 723. The ROM 722 stores various programs used for the CPU 721 to control the binding processing apparatus 700. The RAM 723 is used as a primary storage region for the CPU 721 to control various programs. Furthermore, the control of the binding processing apparatus 700 includes, for example, conveyance control for conveying a sheet conveyed into the binding processing apparatus 700, binding processing control by the stapler unit 710, and fold processing control by the fold roller 712.

The control unit 720 of the binding processing apparatus 700 controls conveyance units, such as the receiving roller 701, the conveyance rollers 704, 707, and 708, and the discharge rollers 705 and 713, via a conveyance control unit 740, thus performing conveyance control of a sheet in the binding processing apparatus 700. Moreover, the control unit 720 controls the stapler unit 710 via a binding processing control unit 750, thus performing binding processing for sheets. Moreover, the control unit 720 controls a fold processing control unit 760, thus performing fold processing by the fold roller 712.

The binding processing apparatus 700 is connected to the image forming apparatus 100 via the communication unit 730.

When receiving a print signal from the user, the control unit 120 of the image forming apparatus 100 transmits information about, for example, the binding position and the number of sheets for binding processing to the binding processing apparatus 700 via the communication unit 130. The control unit 720 of the binding processing apparatus 700 performs binding processing on sheets based on the information received from the control unit 120 of the image forming apparatus 100.

Furthermore, while, in the fifth exemplary embodiment, a configuration in which the binding processing apparatus 700 is connected to the communication unit 130 of the image forming apparatus 100 via the communication unit 230 of the varnish application apparatus 200 has been described, another configuration can be employed. For example, a configuration in which the communication unit 730 of the binding processing apparatus 700 is directly connected to the communication unit 130 of the image forming apparatus 100 can be employed.

As mentioned above, the image forming apparatus 100, the varnish application apparatus 200, and the binding processing apparatus 700 are connected via the communication units 130, 230, and 730. Accordingly, in a case where a print signal has been input to the image forming system 5000, the image forming apparatus 100 transmits a processing content corresponding to the print signal to the binding processing apparatus 700 and the varnish application apparatus 200. Moreover, in a case where an abnormality has occurred in the image forming apparatus 100, the image forming apparatus 100 is able to transmit a stop signal for stopping an operation of the varnish application apparatus 200 or the binding processing apparatus 700. Additionally, since the communication units 130, 230, and 730 are able to perform bidirectional communication with each other, in a case where an abnormality has occurred in the varnish application apparatus 200 or the binding processing apparatus 700, the image forming apparatus 100 is also able to stop an operation thereof in response to receiving information transmitted from the communication unit 230 or 730.

While, in the fifth exemplary embodiment, a configuration in which the entirety of the image forming system 5000 is controlled by the control unit 120 included in the image forming apparatus 100 is described, the present exemplary embodiment does not need to be limited to this configuration. For example, a configuration in which a controller serving as a control unit for controlling the entirety of the image forming system 5000 is provided in a housing different from that of the image forming apparatus 100 and outside of the image forming apparatus 100 can be employed. In this case, the control unit only needs to have a configuration which is connected to the control unit 220 of the varnish application apparatus 200 or the control unit 720 of the binding processing apparatus 700 via the control unit 120 of the image forming apparatus 100. Moreover, the controller unit can have a configuration which is directly connected to each of the control units 120, 220, and 720.

Next, a control flow representing a series of operations of image forming processing which is performed by the image forming apparatus 100, varnish application processing which is performed by the varnish application apparatus 200, and saddle stitch processing which is performed by the binding processing apparatus 700 in the image forming system 5000 is described.

The control flow illustrated in FIG. 15 is started when a print signal is received in a standby state in which, for example, the adjustment of the entirety of the image forming system 5000 is completed. Here, the standby state is a state in which, in the image forming apparatus 100, the temperature of the fixing device 8 has reached a predetermined temperature available for fixing a toner image and is also a state in which, in response to receiving a print signal, the image forming apparatus 100 is ready to immediately form an image on a sheet. Moreover, the standby state is a state in which, in the varnish application apparatus 200, varnish is being supplied to the varnish application roller 213, is a state in which the heater 271 has reached a predetermined temperature and the radiation force of the UV radiation unit 272 has become a predetermined radiation force, and is also a state in which the varnish application apparatus 200 is ready to apply varnish to a sheet and harden the applied varnish.

If the control unit 120 has received a print signal via the communication unit 130 or the operation unit 95 (YES in step S501), then in step S502, the control unit 120 acquires processing information related to image forming processing, varnish application processing, and saddle stitch processing included in the print signal. Moreover, if the control unit 120 has not received a print signal (NO in step S501), the control unit 120 waits until receiving a print signal, thus maintaining the standby state of the image forming system 5000.

Then, in step S503, based on the processing information acquired in step S502, the control unit 120 transmits processing information related to the presence or absence of saddle stitch processing to the binding processing apparatus 700 via the communication units 130, 230, and 730 and transmits processing information related to the presence or absence of varnish application processing to the varnish application apparatus 200. While, here, an example in which the control unit 120 transmits processing information related to the presence or absence of saddle stitch processing and the presence or absence of varnish application processing is described, a configuration in which, only when there are saddle stitch processing and varnish application processing, the control unit 120 transmits each piece of processing information to the binding processing apparatus 700 or the varnish application apparatus 200 can be employed.

Next, in step S504, the control unit 120 controls the conveyance control unit 140, the image processing unit 150, and the drive unit 160 based on the processing information acquired in step S502, thus performing image forming processing on a sheet fed from the cassette 10.

Then, in step S505, the control unit 120 determines whether to perform varnish application processing on a sheet with an image formed thereon by the image forming apparatus 100 in step S504, based on the processing information acquired in step S502.

If it is determined to perform varnish application processing (YES in step S505), then in step S506, the control unit 120 transmits a signal to the control unit 220 via the communication units 130 and 230 and thus causes the control unit 220 to control the conveyance control unit 240, the varnish application control unit 250, and the varnish hardening control unit 260 to perform varnish application processing by the varnish application apparatus 200.

On the other hand, if it is determined not to perform varnish application processing (NO in step S505), the control unit 120 transmits a signal to the control unit 220 via the communication units 130 and 230 and thus causes the control unit 220 to move the varnish application roller 213 away from the varnish drum 214, thus allowing passage of a sheet. At this time, the sheet is conveyed by the conveyance belts 231 and 233. Furthermore, a configuration in which a conveyance roller pair for pinching and conveying a sheet when the varnish application roller 213 is moved away from the varnish drum 214 is further provided can be employed.

Next, in step S507, the control unit 120 determines whether to perform saddle stitch processing by the binding processing apparatus 700 based on the processing information acquired in step S502.

If it is determined to perform saddle stitch processing (YES in step S507), then in step S508, the control unit 120 outputs a signal to the control unit 720 via the communication units 130 and 730 and thus causes the control unit 720 to control the conveyance control unit 740, the binding processing control unit 750, and the fold processing control unit 760, thus performing saddle stitch processing by the binding processing apparatus 700.

On the other hand, if it is determined not to perform saddle stitch processing (NO in step S507), then in step S509, the control unit 120 determines whether all of the processing operations included in the print signal received in step S501 have ended.

If it is determined that all of the processing operations have ended (YES in step S509), the control unit 120 causes the image forming system 5000 to transition to the standby state. Moreover, if it is determined that not all of the processing operations have ended (NO in step S509), the control unit 120 returns the processing to step S504 and then performs each processing operation on a next sheet.

While, in the fifth exemplary embodiment, a configuration in which the control units 220 and 720 operate based on a signal received from the control unit 120 of the image forming apparatus 100 has been described as an example, a configuration in which, after transmission of the processing information in step S503, the control units 220 and 720 perform respective control operations taking, for example, conveyance timing of a sheet as the starting point can be employed. Thus, a configuration in which, in step S503, the control unit 120 transmits processing information including timing for performing varnish application processing to the control unit 220 of the varnish application apparatus 200, in step S505, the control unit 220 determines the presence or absence of execution of varnish application processing, and, in step S506, the control unit 220 controls the varnish application apparatus 200 can be employed. Moreover, a configuration in which, in step S503, the control unit 120 transmits processing information including timing for performing saddle stitch processing to the control unit 720 of the binding processing apparatus 700, in step S507, the control unit 720 determines the presence or absence of execution of saddle stitch processing, and, in step S508, the control unit 720 controls the binding processing apparatus 700 can be employed.

In this way, in the image forming system 5000, in which the image forming apparatus 100, the varnish application apparatus 200, and the binding processing apparatus 700 are connected inline, since the binding processing apparatus 700 is arranged on the downstream side of the varnish application apparatus 200, it is possible to perform saddle stitch processing even on sheets with varnish applied thereto.

If, however, the binding processing apparatus 700 is connected between the image forming apparatus 100 and the varnish application apparatus 200, the varnish application apparatus 200 becomes able to perform varnish application processing only on the uppermost surface of a printed product subjected to saddle stitch processing. On the other hand, in the image forming system 5000 in the fifth exemplary embodiment, since the binding processing apparatus 700 is connected to the downstream side of the varnish application apparatus 200, it becomes possible to perform binding processing on sheets with varnish application processing performed thereon. Accordingly, a printed product is not limited in surfaces to which to apply varnish, and, in the case of performing saddle stitch bookbinding, it becomes possible to perform varnish application processing even on sheets other than the cover sheet.

As described above, in the fifth exemplary embodiment, in an image forming system which performs both varnish application processing and processing other than the varnish application processing inline on a sheet with an image formed thereon by an image forming apparatus, it is possible to prevent or reduce a decrease in quality of a printed product and it is possible to provide a printed product which the user desires.

Figure 16:
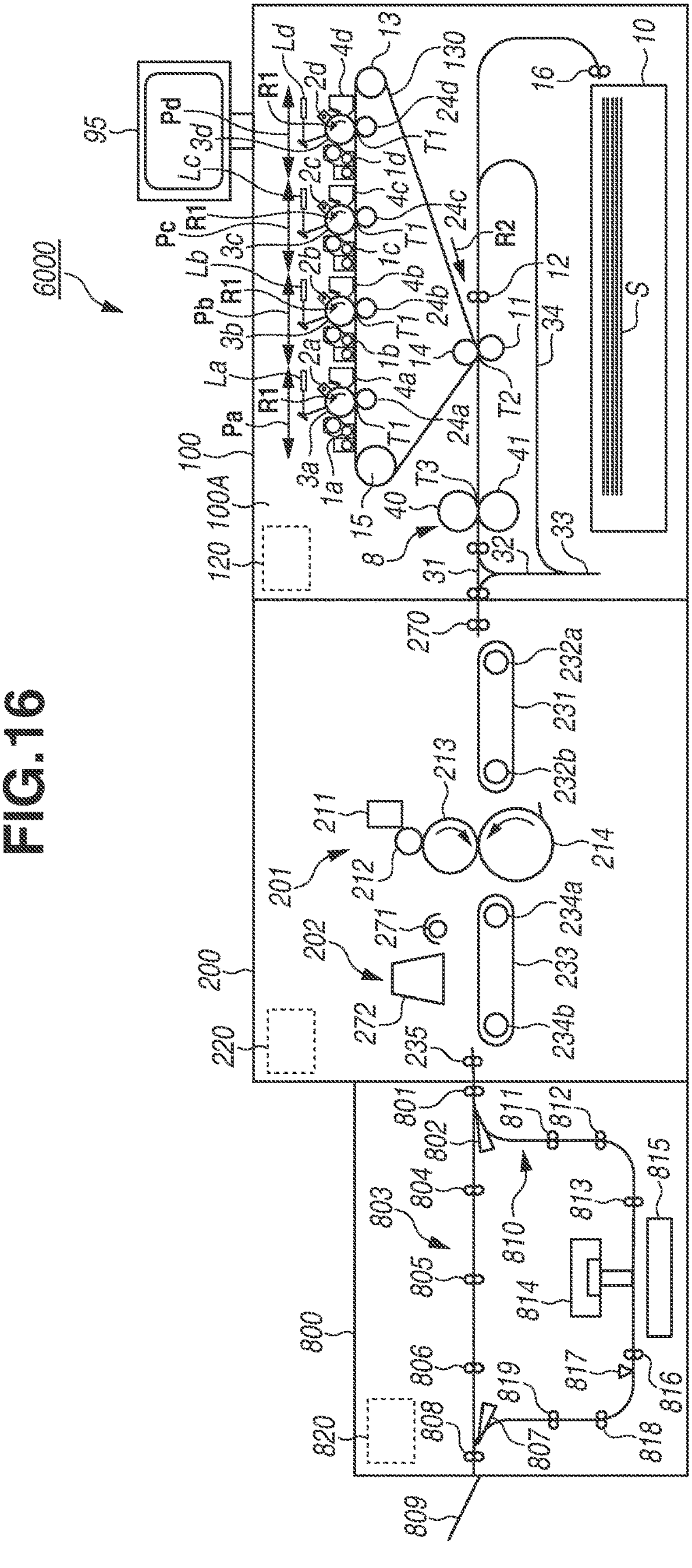
FIG. 16 is an outline sectional view of an image forming system in a sixth exemplary embodiment.

Next, a sixth exemplary embodiment of the present invention is described. As illustrated in FIG. 16, an image forming system 6000 in the sixth exemplary embodiment includes an image forming apparatus 100, which forms an image on a sheet, a varnish application apparatus 200, which applies varnish to a sheet with an image formed thereon, and a punching processing apparatus 800, which performs punching processing on a sheet. In the sixth exemplary embodiment, the punching processing apparatus 800 is an example of a sheet conveyance apparatus.

The image forming apparatus 100, the varnish application apparatus 200, and the punching processing apparatus 800 are connected in series and are configured to be able to apply varnish to a sheet conveyed from the image forming apparatus 100 and perform punching processing on the sheet. Thus, varnish application processing and punching processing are performed on a sheet during a period from when the sheet is fed by the image forming apparatus 100 to when the sheet is discharged to outside the image forming system 6000.

In the image forming system 6000 in the sixth exemplary embodiment, the image forming apparatus 100 and the varnish application apparatus 200 have respective configurations similar to those in the first exemplary embodiment, and the respective constituent elements thereof are assigned the respective same reference characters and are, therefore, omitted from description. Furthermore, as with the fifth exemplary embodiment, the sixth exemplary embodiment differs from the first to fourth exemplary embodiments in that the varnish application apparatus 200 is connected to the image forming apparatus 100. Accordingly, the receiving roller 270 of the varnish application apparatus 200 conveys a sheet discharged from the image forming apparatus 100 through the discharge conveyance path 31 to the inside of the varnish application apparatus 200. Moreover, a sheet discharged by the discharge roller 235 of the varnish application apparatus 200 is then conveyed to the punching processing apparatus 800.

<Punching Processing Apparatus>

The punching processing apparatus 800 performs punching processing for making holes in a sheet. A sheet discharged by the discharge roller 235 of the varnish application apparatus 200 is conveyed to the inside of the punching processing apparatus 800 by a receiving roller 801 of the punching processing apparatus 800.

In a case where punching processing is not included in a print signal which the image forming system 6000 has received, a sheet which is conveyed by the receiving roller 801 is conveyed toward a first conveyance path 803 by a diverter 802 and is then conveyed through the first conveyance path 803 by conveyance rollers 804, 805, and 806. Then, the sheet conveyed by the conveyance roller 806 is guided to a discharge roller 808 by a diverter 807 and is then discharged to a discharge tray 809, which is provided at the punching processing apparatus 800, via the discharge roller 808. Thus, the sheet is discharged to the outside of the image forming system 6000.

Moreover, in a case where punching processing is included in a print signal which the image forming apparatus 100 has received, a sheet which is conveyed by the receiving roller 801 is conveyed toward a second conveyance path 810 by the diverter 802 and is then conveyed through the second conveyance path 810 by conveyance rollers 811, 812, and 813.

Then, the sheet conveyed by the conveyance roller 813 is then conveyed to between a punching unit 814, which has a shearing tool for punching processing, and a punching die 815, and any skew of the sheet is corrected by a correction roller 816. In the sixth exemplary embodiment, the punching unit 814 and the punching die 815 are an example of a processing unit which performs predetermined processing on a sheet received by the receiving roller 801, and are an example of a boring processing unit which performs boring processing on a sheet.

A sensor 817 is provided on the downstream side of the punching unit 814 in the sheet conveyance direction. The sensor 817 is capable of detecting the leading edge of a sheet. Then, the position of punching processing by the punching unit 814 is determined based on the position of the end portion of the sheet detected by the sensor 817. Furthermore, in the case of performing punching processing, a configuration of performing punching processing after moving the punching unit 814 based on a result of detection by the sensor 817 or performing punching processing without moving the punching unit 814.

Moreover, in the case of performing punching processing, the punching unit 814 moves downward in the vertical direction toward the punching die 815 in a state in which the conveyance by the correction roller 816 and the conveyance roller 813 is stopped, a shearing tool provided in the punching unit 814 punches through a sheet. Moreover, a collection box (not illustrated) is provided below the punching die 815, thus enabling collecting punching scraps caused by punching processing.

After that, the sheet subjected to punching processing is restarted to be conveyed by the correction roller 816 and the conveyance roller 813 and is then conveyed toward the downstream side by the conveyance rollers 818 and 819. The sheet conveyed by the conveyance roller 819 is guided to the discharge roller 808 by the diverter 807 and is then discharged to the discharge tray 809 by the discharge roller 808.

In the sixth exemplary embodiment, the punching processing apparatus 800 is connected downstream of the varnish application apparatus 200 in the sheet conveyance direction. As long as this configuration is employed, a configuration in which another processing apparatus such as an inserter, an inspection apparatus, or a decurler apparatus is connected between the image forming apparatus 100 and the varnish application apparatus 200 can be employed.

<Control of Image Forming System>

Figure 17:
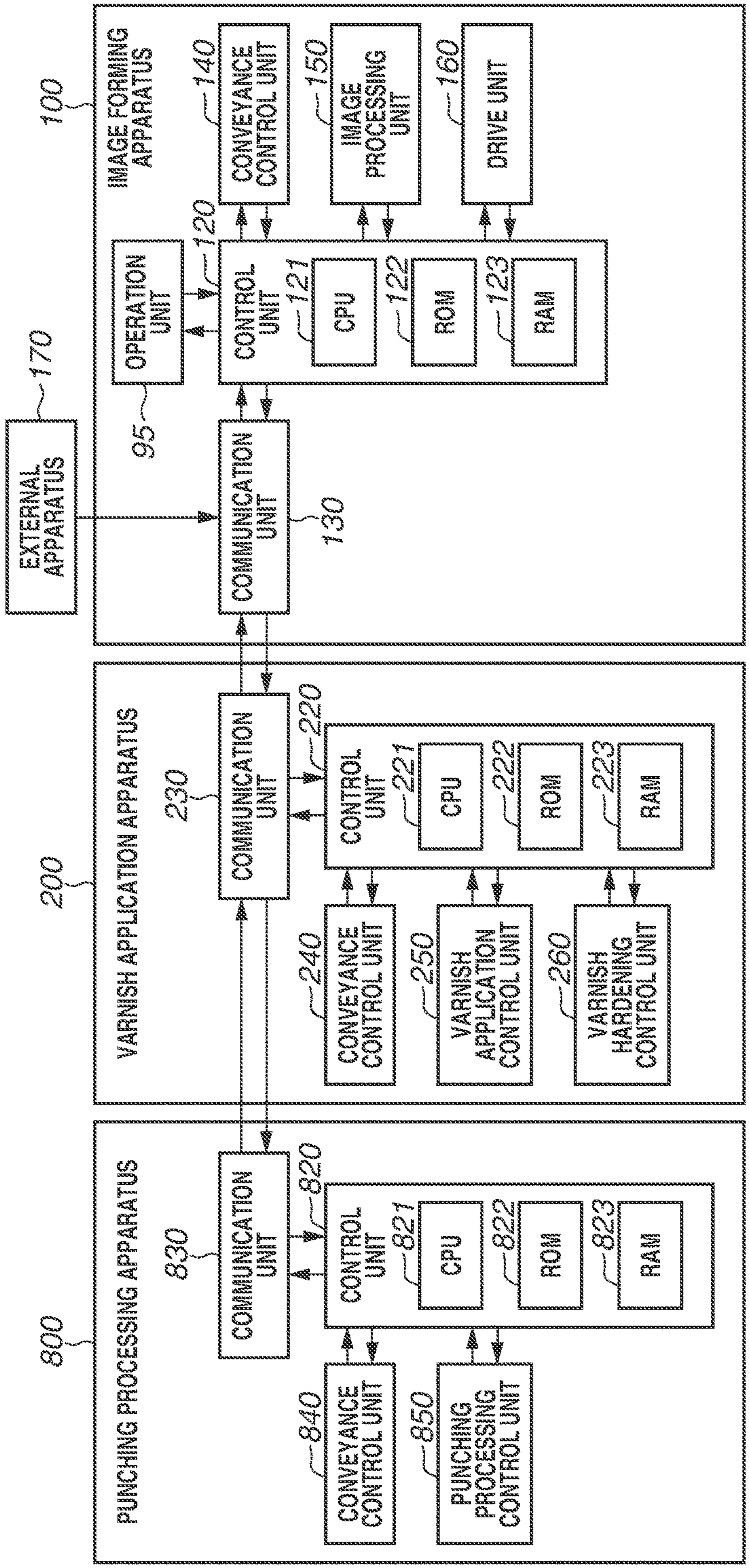
FIG. 17 is a control block diagram in the sixth exemplary embodiment.
Figure 18:
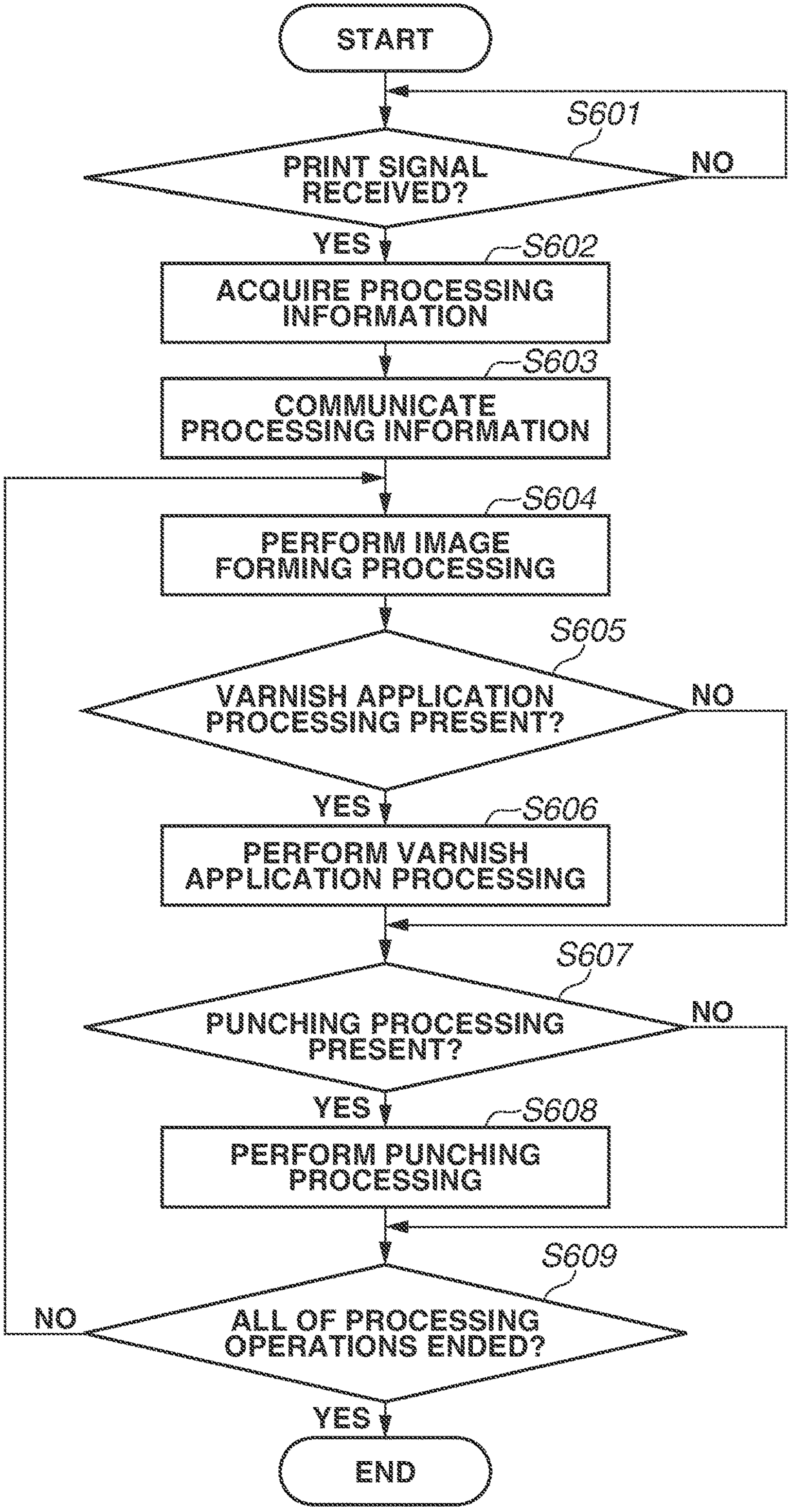
FIG. 18 is a flowchart illustrating a control flow in the sixth exemplary embodiment.

Next, an operation and control of the image forming system 6000 in the sixth exemplary embodiment are described. FIG. 17 is a control block diagram of the image forming system 6000, and FIG. 18 is a flowchart illustrating the control flow of the image forming system 6000 in the sixth exemplary embodiment. In the sixth exemplary embodiment, configurations of the image forming apparatus 100 and the varnish application apparatus 200 are similar to those in the first exemplary embodiment, and the respective constituent elements thereof are assigned the respective same reference characters and are, therefore, omitted from description.

In the image forming system 6000, the image forming apparatus 100 includes a control unit 120, the varnish application apparatus 200 includes a control unit 220, and the punching processing apparatus 800 includes a control unit 820. The control units 120, 220, and 820 are configured to be able to communicate with each other via communication units 130, 230, and 830. In the sixth exemplary embodiment, the control unit 120 is an example of a first control unit, the control unit 220 is an example of a second control unit, and the control unit 820 is an example of a third control unit.

The control unit 120 of the image forming apparatus 100 is capable of receiving a print signal from an external apparatus 170 such as a PC via the communication unit 130. Moreover, the control unit 120 is capable of receiving a print signal via the operation unit 95. The print signal, which is a signal generated according to the processing content set by the user, includes, for example, the presence or absence of execution of various processing operations, such as image forming processing, punching processing, and varnish application processing, the number of sheets to be processed, and the type of a sheet to be processed.

The control unit 820 of the punching processing apparatus 800 includes a CPU 821, a ROM 822, and a RAM 823. The ROM 822 stores various programs used for the CPU 821 to control the punching processing apparatus 800. The RAM 823 is used as a primary storage region for the CPU 821 to control various programs. Furthermore, the control of the punching processing apparatus 800 includes, for example, conveyance control for conveying a sheet conveyed into the punching processing apparatus 800 and punching processing control by the punching unit 814.

The control unit 820 of the punching processing apparatus 800 controls conveyance units, such as the receiving roller 801, the conveyance rollers 804 to 806, 811 to 813, 818, and 819, the discharge roller 808, and the correction roller 816, via a conveyance control unit 840, thus performing conveyance control of a sheet in the punching processing apparatus 800. Moreover, the control unit 820 controls the punching unit 814 via a punching processing control unit 850, thus performing punching processing for a sheet.

The punching processing apparatus 800 is connected to the image forming apparatus 100 via the communication unit 830. When receiving a print signal from the user, the control unit 120 of the image forming apparatus 100 transmits information about, for example, the punching position and the number of sheets for punching processing to the punching processing apparatus 800 via the communication unit 130. The control unit 820 of the punching processing apparatus 800 performs punching processing on a sheet based on the information received from the control unit 120 of the image forming apparatus 100.

Furthermore, while, in the sixth exemplary embodiment, a configuration in which the punching processing apparatus 800 is connected to the communication unit 130 of the image forming apparatus 100 via the communication unit 230 of the varnish application apparatus 200 has been described, another configuration can be employed. For example, a configuration in which the communication unit 830 of the punching processing apparatus 800 is directly connected to the communication unit 130 of the image forming apparatus 100 can be employed.

As mentioned above, the image forming apparatus 100, the varnish application apparatus 200, and the punching processing apparatus 800 are connected via the communication units 130, 230, and 830. Accordingly, in a case where a print signal has been input to the image forming system 6000, the image forming apparatus 100 transmits a processing content corresponding to the print signal to the punching processing apparatus 800 and the varnish application apparatus 200. Moreover, in a case where an abnormality has occurred in the image forming apparatus 100, the image forming apparatus 100 is able to transmit a stop signal for stopping an operation of the varnish application apparatus 200 or the punching processing apparatus 800. Additionally, since the communication units 130, 230, and 830 are able to perform bidirectional communication with each other, in a case where an abnormality has occurred in the varnish application apparatus 200 or the punching processing apparatus 800, the image forming apparatus 100 is also able to stop an operation thereof in response to receiving information transmitted from the communication unit 230 or 830.

While, in the sixth exemplary embodiment, a configuration in which the entirety of the image forming system 6000 is controlled by the control unit 120 included in the image forming apparatus 100 is described, the present exemplary embodiment does not need to be limited to this configuration. For example, a configuration in which a controller serving as a control unit for controlling the entirety of the image forming system 6000 is provided in a housing different from that of the image forming apparatus 100 and outside of the image forming apparatus 100 can be employed. In this case, the control unit only needs to have a configuration which is connected to the control unit 220 of the varnish application apparatus 200 or the control unit 820 of the punching processing apparatus 800 via the control unit 120 of the image forming apparatus 100. Moreover, the controller unit can have a configuration which is directly connected to each of the control units 120, 220, and 820.

Next, a control flow representing a series of operations of image forming processing which is performed by the image forming apparatus 100, varnish application processing which is performed by the varnish application apparatus 200, and punching processing which is performed by the punching processing apparatus 800 in the image forming system 6000 is described.

The control flow illustrated in FIG. 18 is started when a print signal is received in a standby state in which, for example, the adjustment of the entirety of the image forming system 6000 is completed. Here, the standby state is a state in which, in the image forming apparatus 100, the temperature of the fixing device 8 has reached a predetermined temperature available for fixing a toner image and is also a state in which, in response to receiving a print signal, the image forming apparatus 100 is ready to immediately form an image on a sheet. Moreover, the standby state is a state in which, in the varnish application apparatus 200, varnish is being supplied to the varnish application roller 213, is a state in which the heater 271 has reached a predetermined temperature and the radiation force of the UV radiation unit 272 has become a predetermined radiation force, and is also a state in which the varnish application apparatus 200 is ready to apply varnish to a sheet and harden the applied varnish.

If the control unit 120 has received a print signal via the communication unit 130 or the operation unit 95 (YES in step S601), then in step S602, the control unit 120 acquires processing information related to image forming processing, varnish application processing, and punching processing included in the print signal. Moreover, if the control unit 120 has not received a print signal (NO in step S601), the control unit 120 waits until receiving a print signal, thus maintaining the standby state of the image forming system 6000.

Then, in step S603, based on the processing information acquired in step S602, the control unit 120 transmits processing information related to the presence or absence of punching processing to the punching processing apparatus 800 via the communication units 130, 230, and 830 and transmits processing information related to the presence or absence of varnish application processing to the varnish application apparatus 200. While, here, an example in which the control unit 120 transmits processing information related to the presence or absence of punching processing and the presence or absence of varnish application processing is described, a configuration in which, only when there are punching processing and varnish application processing, the control unit 120 transmits each piece of processing information to the punching processing apparatus 800 or the varnish application apparatus 200 can be employed.

Next, in step S604, the control unit 120 controls the conveyance control unit 140, the image processing unit 150, and the drive unit 160 based on the processing information acquired in step S602, thus performing image forming processing on a sheet fed from the cassette 10.

Then, in step S605, the control unit 120 determines whether to perform varnish application processing on a sheet with an image formed thereon by the image forming apparatus 100 in step S604, based on the processing information acquired in step S602.

If it is determined to perform varnish application processing (YES in step S605), then in step S606, the control unit 120 transmits a signal to the control unit 220 via the communication units 130 and 230 and thus causes the control unit 220 to control the conveyance control unit 240, the varnish application control unit 250, and the varnish hardening control unit 260 to perform varnish application processing by the varnish application apparatus 200.

On the other hand, if it is determined not to perform varnish application processing (NO in step S605), the control unit 120 transmits a signal to the control unit 220 via the communication units 130 and 230 and thus causes the control unit 220 to move the varnish application roller 213 away from the varnish drum 214, thus allowing passage of a sheet. At this time, the sheet is conveyed by the conveyance belts 231 and 233. Furthermore, a configuration in which a conveyance roller pair for pinching and conveying a sheet when the varnish application roller 213 is moved away from the varnish drum 214 is further provided can be employed.

Next, in step S607, the control unit 120 determines whether to perform punching processing by the punching processing apparatus 800 based on the processing information acquired in step S602.

If it is determined to perform punching processing (YES in step S607), then in step S608, the control unit 120 outputs a signal to the control unit 820 via the communication units 130 and 830 and thus causes the control unit 820 to control the conveyance control unit 840 and the punching processing control unit 850, thus performing punching processing by the punching processing apparatus 800.

On the other hand, if it is determined not to perform punching processing (NO in step S607), then in step S609, the control unit 120 determines whether all of the processing operations included in the print signal received in step S601 have ended.

If it is determined that all of the processing operations have ended (YES in step S609), the control unit 120 causes the image forming system 6000 to transition to the standby state. Moreover, if it is determined that not all of the processing operations have ended (NO in step S609), the control unit 120 returns the processing to step S604 and then performs each processing operation on a next sheet.

While, in the sixth exemplary embodiment, a configuration in which the control units 220 and 820 operate based on a signal received from the control unit 120 of the image forming apparatus 100 has been described as an example, a configuration in which, after transmission of the processing information in step S603, the control units 220 and 820 perform respective control operations taking, for example, conveyance timing of a sheet as the starting point can be employed. Thus, a configuration in which, in step S603, the control unit 120 transmits processing information including timing for performing varnish application processing to the control unit 220 of the varnish application apparatus 200, in step S605, the control unit 220 determines the presence or absence of execution of varnish application processing, and, in step S606, the control unit 220 controls the varnish application apparatus 200 can be employed. Moreover, a configuration in which, in step S603, the control unit 120 transmits processing information including timing for performing punching processing to the control unit 820 of the punching processing apparatus 800, in step S607, the control unit 820 determines the presence or absence of execution of punching processing, and, in step S608, the control unit 820 controls the punching processing apparatus 800 can be employed.

In this way, in the image forming system 6000, in which the image forming apparatus 100, the varnish application apparatus 200, and the punching processing apparatus 800 are connected inline, since the punching processing apparatus 800 is arranged on the downstream side of the varnish application apparatus 200, it is possible to perform punching processing even on a sheet with varnish applied thereto.

If, however, the punching processing apparatus 800 is connected between the image forming apparatus 100 and the varnish application apparatus 200, as a result, the varnish application apparatus 200 performs varnish application processing on a sheet with punching processing performed thereon by the punching processing apparatus 800.

Accordingly, in a case where a varnish application apparatus 200 for overcoat is connected, hole portions created by punching processing performed by the punching processing apparatus 800 may be covered by varnish. This may cause a printed product with hole portions of the sheet thereof stemmed in spite of the application of punching processing. On the other hand, in the image forming system 6000 in the sixth exemplary embodiment, since the punching processing apparatus 800 is connected to the downstream side of the varnish application apparatus 200, it becomes possible to perform punching processing on a sheet with varnish application processing performed thereto. Accordingly, it is possible to prevent or reduce hole portions created by punching processing from being covered by varnish.

Furthermore, while, in the sixth exemplary embodiment, punching processing for forming punch holes has been described as an example, the sixth exemplary embodiment can also be applied to a processing apparatus for perforating a sheet by forming slits or hole portions in the sheet.

Moreover, the sixth exemplary embodiment can also be applied to a processing apparatus for applying treatment for changing the planar shape of a printed product, such as die cutting or trimming. Even in this case, connecting the processing apparatus to the downstream side of the varnish application apparatus 200 enables preventing or reducing hole portions created by perforation or die cutting from being covered by varnish.

As described above, in the sixth exemplary embodiment, in an image forming system which performs both varnish application processing and processing other than the varnish application processing inline on a sheet with an image formed thereon by an image forming apparatus, it is possible to prevent or reduce a decrease in quality of a printed product and it is possible to produce a printed product which the user desires.

Figure 19:
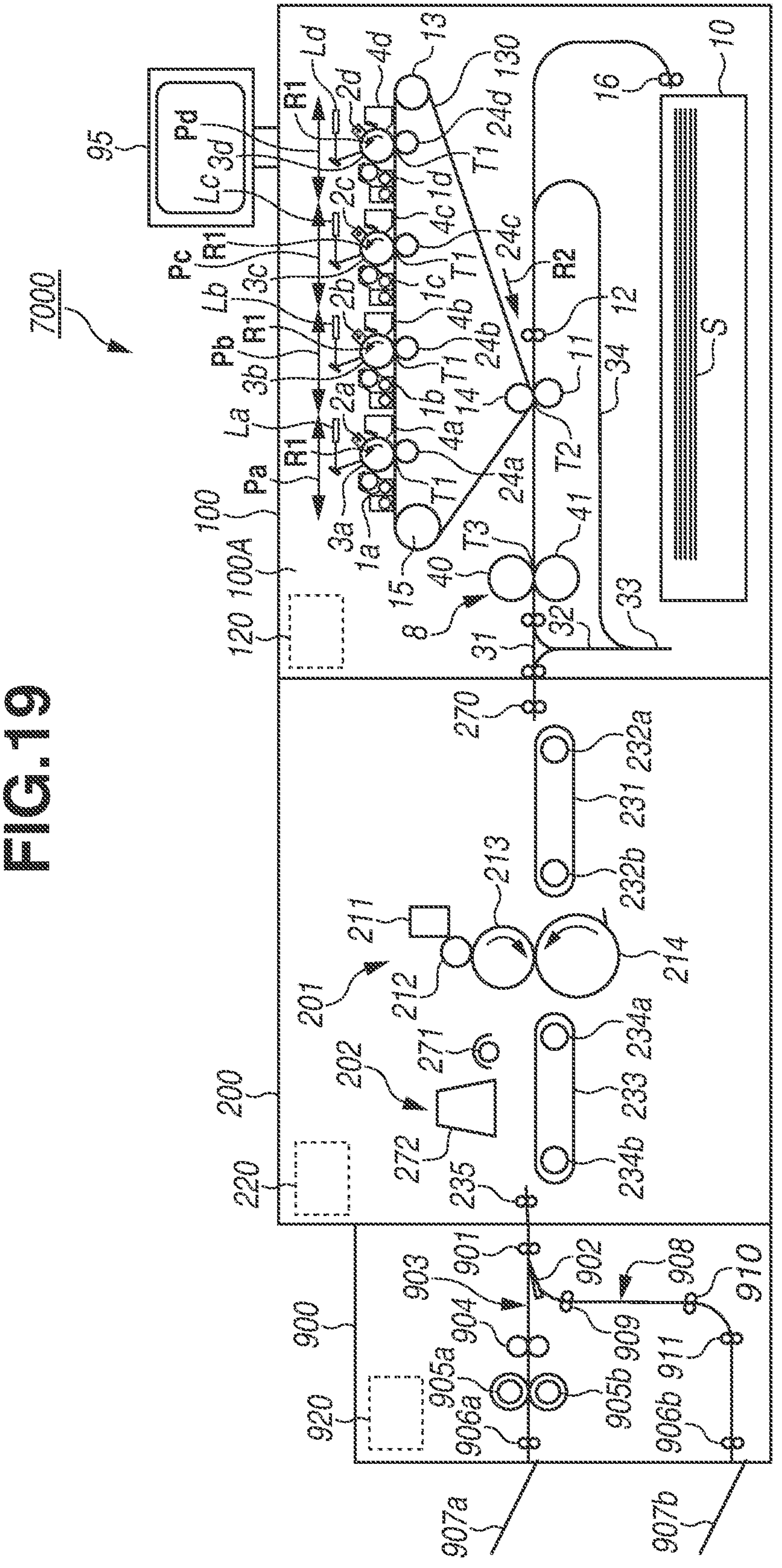
FIG. 19 is an outline sectional view of an image forming system in a seventh exemplary embodiment.

Next, a seventh exemplary embodiment of the present invention is described. As illustrated in FIG. 19, an image forming system 7000 in the seventh exemplary embodiment includes an image forming apparatus 100, which forms an image on a sheet, a varnish application apparatus 200, which applies varnish to a sheet with an image formed thereon, and a slitter apparatus 900, which cuts a sheet. In the seventh exemplary embodiment, the slitter apparatus 900 is an example of a sheet conveyance apparatus.

The image forming apparatus 100, the varnish application apparatus 200, and the slitter apparatus 900 are connected in series and are configured to be able to apply varnish to a sheet conveyed from the image forming apparatus 100 and perform cutting processing on the sheet. Thus, varnish application processing and cutting processing are performed on a sheet during a period from when the sheet is fed by the image forming apparatus 100 to when the sheet is discharged to outside the image forming system 7000.

In the image forming system 7000 in the seventh exemplary embodiment, the image forming apparatus 100 and the varnish application apparatus 200 have respective configurations similar to those in the first exemplary embodiment, and the respective constituent elements thereof are assigned the respective same reference characters and are, therefore, omitted from description. Furthermore, as with the fifth exemplary embodiment, the seventh exemplary embodiment differs from the first to fourth exemplary embodiments in that the varnish application apparatus 200 is connected to the image forming apparatus 100. Accordingly, the receiving roller 270 of the varnish application apparatus 200 conveys a sheet discharged from the image forming apparatus 100 through the discharge conveyance path 31 to the inside of the varnish application apparatus 200. Moreover, a sheet discharged by the discharge roller 235 of the varnish application apparatus 200 is then conveyed to the slitter apparatus 900.

<Slitter Apparatus>

The slitter apparatus 900 performs cutting processing for cutting a sheet. A sheet discharged by the discharge roller 235 of the varnish application apparatus 200 is conveyed to the inside of the slitter apparatus 900 by a receiving roller 901 of the slitter apparatus 900.

In a case where cutting processing is included in a print signal which the image forming system 7000 has received, a sheet which is conveyed by a receiving roller 901 is guided to a first conveyance path 903 by a diverter 902 and is then conveyed toward a correction roller 904. Then, any skew of the sheet is corrected by the correction roller 904.

After that, the sheet with any skew thereof corrected by the correction roller 904 is subjected to cutting processing in parallel with the sheet conveyance direction by cutting rollers **905*a* and 905*b*. Then, the sheet subjected to cutting processing in parallel with the sheet conveyance direction is discharged to a discharge tray 907*a* by a discharge roller 906*a*. Here, the cutting rollers 905*a* and 905*b* are an example of a cutting unit and are an example of a processing unit which performs predetermined processing on a sheet received by the receiving roller 901**. Furthermore, while, in the seventh exemplary embodiment, an example in which cutting processing is applied in parallel with the sheet conveyance direction is described, a configuration in which cutting processing is applied in a direction perpendicular to the sheet conveyance direction can be employed.

Moreover, in a case where cutting processing is not included in a print signal which the image forming apparatus 100 has received, the sheet is conveyed toward a second conveyance path 908 by the diverter 902 and is then conveyed on the second conveyance path 908 by conveyance rollers 909 to 911.

Then, the sheet conveyed by the conveyance roller 911 is discharged to a discharge tray 907*b* by a discharge roller 906*b*.

In the seventh exemplary embodiment, the slitter apparatus 900 is connected downstream of the varnish application apparatus 200 in the sheet conveyance direction. As long as this configuration is employed, a configuration in which another processing apparatus such as an inserter, an inspection apparatus, or a decurler apparatus is connected between the image forming apparatus 100 and the varnish application apparatus 200 can be employed.

<Control of Image Forming System>

Figure 20:
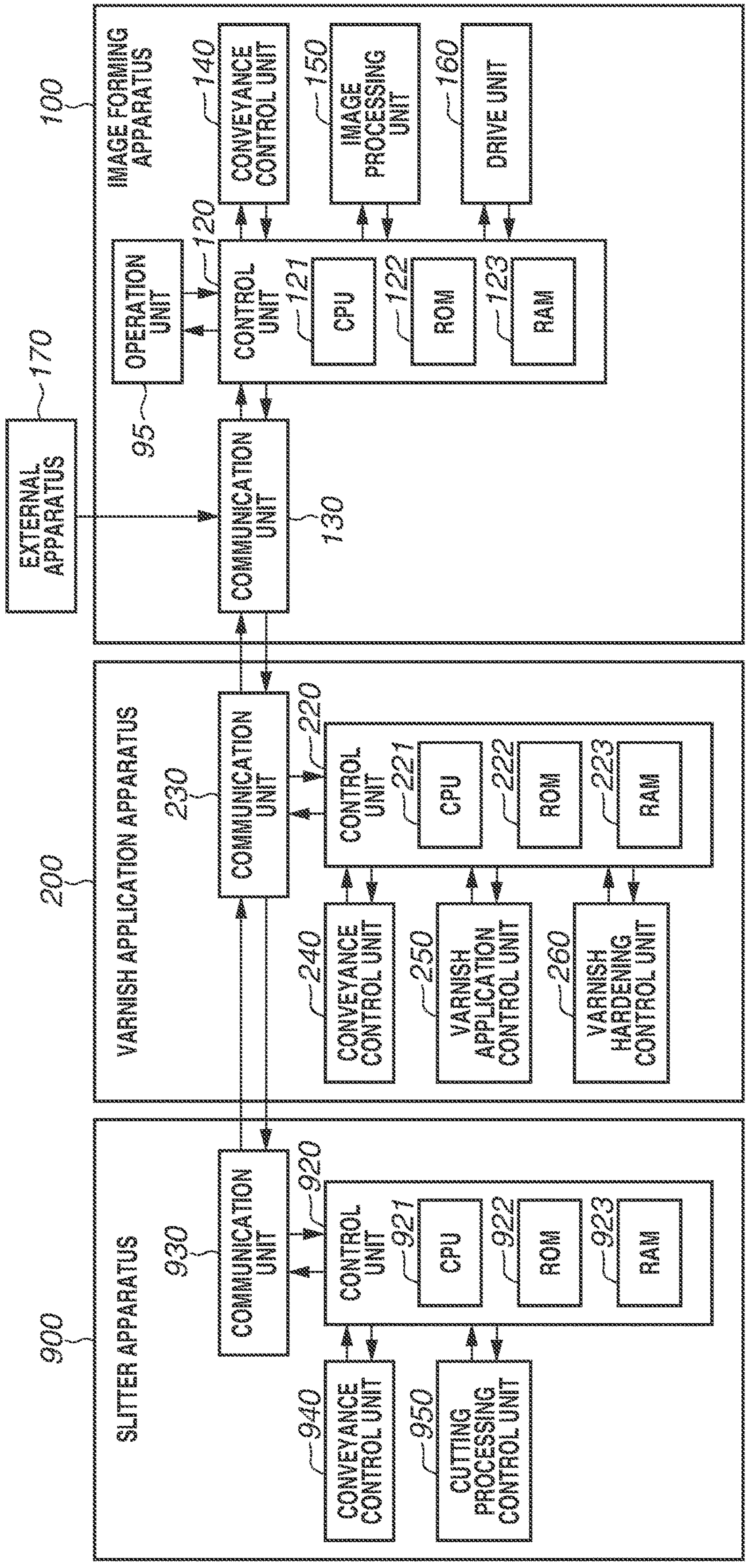
FIG. 20 is a control block diagram in the seventh exemplary embodiment.
Figure 21:
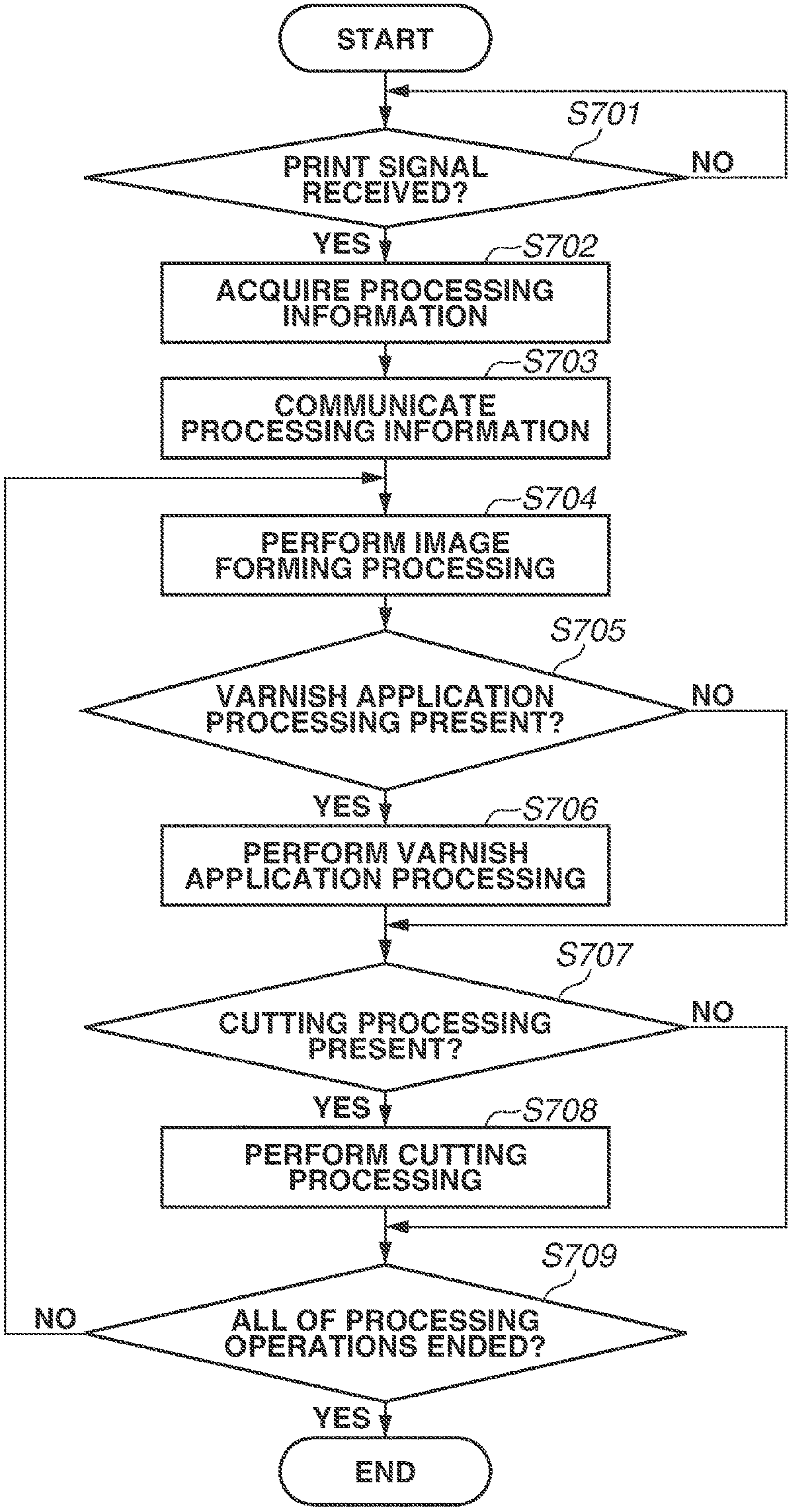
FIG. 21 is a flowchart illustrating a control flow in the seventh exemplary embodiment.

Next, an operation and control of the image forming system 7000 in the seventh exemplary embodiment are described. FIG. 20 is a control block diagram of the image forming system 7000, and FIG. 21 is a flowchart illustrating the control flow of the image forming system 7000 in the seventh exemplary embodiment. In the seventh exemplary embodiment, configurations of the image forming apparatus 100 and the varnish application apparatus 200 are similar to those in the first exemplary embodiment, and the respective constituent elements thereof are assigned the respective same reference characters and are, therefore, omitted from description.

In the image forming system 7000, the image forming apparatus 100 includes a control unit 120, the varnish application apparatus 200 includes a control unit 220, and the slitter apparatus 900 includes a control unit 920. The control units 120, 220, and 920 are configured to be able to communicate with each other via communication units 130, 230, and 930. In the seventh exemplary embodiment, the control unit 120 is an example of a first control unit, the control unit 220 is an example of a second control unit, and the control unit 920 is an example of a third control unit.

The control unit 120 of the image forming apparatus 100 is capable of receiving a print signal from an external apparatus 170 such as a PC via the communication unit 130. Moreover, the control unit 120 is capable of receiving a print signal via the operation unit 95. The print signal, which is a signal generated according to the processing content set by the user, includes, for example, the presence or absence of execution of various processing operations, such as image forming processing, cutting processing, and varnish application processing, the number of sheets to be processed, and the type of a sheet to be processed.

The control unit 920 of the slitter apparatus 900 includes a CPU 921, a ROM 922, and a RAM 923. The ROM 922 stores various programs used for the CPU 921 to control the slitter apparatus 900. The RAM 923 is used as a primary storage region for the CPU 921 to control various programs. Furthermore, the control of the slitter apparatus 900 includes, for example, conveyance control for conveying a sheet conveyed into the slitter apparatus 900 and cutting processing control for controlling, for example, a pressure force of the cutting rollers 905*a* and 905*b* and the cutting position.

The control unit 920 of the slitter apparatus 900 controls conveyance units, such as the receiving roller 901, the correction roller 904, the discharge rollers 906*a* and 906*b*, and the conveyance rollers 909 to 911, via a conveyance control unit 940, thus performing conveyance control of a sheet in the slitter apparatus 900. Moreover, the control unit 920 controls the cutting rollers 905*a* and 905*b* via a cutting processing control unit 950, thus performing cutting processing on a sheet.

The slitter apparatus 900 is connected to the image forming apparatus 100 via the communication unit 930. When receiving a print signal from the user, the control unit 120 of the image forming apparatus 100 transmits information about, for example, the cutting position, the number of sheets, and a pressure force for cutting processing to the slitter apparatus 900 via the communication unit 130. The control unit 920 of the slitter apparatus 900 performs cutting processing on a sheet based on the information received from the control unit 120 of the image forming apparatus 100.

Furthermore, while, in the seventh exemplary embodiment, a configuration in which the slitter apparatus 900 is connected to the communication unit 130 of the image forming apparatus 100 via the communication unit 230 of the varnish application apparatus 200 has been described, another configuration can be employed. For example, a configuration in which the communication unit 930 of the slitter apparatus 900 is directly connected to the communication unit 130 of the image forming apparatus 100 can be employed.

As mentioned above, the image forming apparatus 100, the varnish application apparatus 200, and the slitter apparatus 900 are connected via the communication units 130, 230, and 930. Accordingly, in a case where a print signal has been input to the image forming system 7000, the image forming apparatus 100 transmits a processing content corresponding to the print signal to the slitter apparatus 900 and the varnish application apparatus 200. Moreover, in a case where an abnormality has occurred in the image forming apparatus 100, the image forming apparatus 100 is able to transmit a stop signal for stopping an operation of the varnish application apparatus 200 or the slitter apparatus 900. Additionally, since the communication units 130, 230, and 930 are able to perform bidirectional communication with each other, in a case where an abnormality has occurred in the varnish application apparatus 200 or the slitter apparatus 900, the image forming apparatus 100 is also able to stop an operation thereof in response to receiving information transmitted from the communication unit 230 or 930.

While, in the seventh exemplary embodiment, a configuration in which the entirety of the image forming system 7000 is controlled by the control unit 120 included in the image forming apparatus 100 is described, the present exemplary embodiment does not need to be limited to this configuration. For example, a configuration in which a controller serving as a control unit for controlling the entirety of the image forming system 7000 is provided in a housing different from that of the image forming apparatus 100 and outside of the image forming apparatus 100 can be employed. In this case, the control unit only needs to have a configuration which is connected to the control unit 220 of the varnish application apparatus 200 or the control unit 920 of the slitter apparatus 900 via the control unit 120 of the image forming apparatus 100. Moreover, the controller unit can have a configuration which is directly connected to each of the control units 120, 220, and 920.

Next, a control flow representing a series of operations of image forming processing which is performed by the image forming apparatus 100, varnish application processing which is performed by the varnish application apparatus 200, and cutting processing which is performed by the slitter apparatus 900 in the image forming system 7000 is described.

The control flow illustrated in FIG. 21 is started when a print signal is received in a standby state in which, for example, the adjustment of the entirety of the image forming system 7000 is completed. Here, the standby state is a state in which, in the image forming apparatus 100, the temperature of the fixing device 8 has reached a predetermined temperature available for fixing a toner image and is also a state in which, in response to receiving a print signal, the image forming apparatus 100 is ready to immediately form an image on a sheet. Moreover, the standby state is a state in which, in the varnish application apparatus 200, varnish is being supplied to the varnish application roller 213, is a state in which the heater 271 has reached a predetermined temperature and the radiation force of the UV radiation unit 272 has become a predetermined radiation force, and is also a state in which the varnish application apparatus 200 is ready to apply varnish to a sheet and harden the applied varnish.

If the control unit 120 has received a print signal via the communication unit 130 or the operation unit 95 (YES in step S701), then in step S702, the control unit 120 acquires processing information related to image forming processing, varnish application processing, and cutting processing included in the print signal. Moreover, if the control unit 120 has not received a print signal (NO in step S701), the control unit 120 waits until receiving a print signal, thus maintaining the standby state of the image forming system 7000.

Then, in step S703, based on the processing information acquired in step S702, the control unit 120 transmits processing information related to the presence or absence of cutting processing to the slitter apparatus 900 via the communication units 130, 230, and 930 and transmits processing information related to the presence or absence of varnish application processing to the varnish application apparatus 200.

While, here, an example in which the control unit 120 transmits processing information related to the presence or absence of cutting processing and the presence or absence of varnish application processing is described, a configuration in which, only when there are cutting processing and varnish application processing, the control unit 120 transmits each piece of processing information to the slitter apparatus 900 or the varnish application apparatus 200 can be employed.

Next, in step S704, the control unit 120 controls the conveyance control unit 140, the image processing unit 150, and the drive unit 160 based on the processing information acquired in step S702, thus performing image forming processing on a sheet fed from the cassette 10.

Then, in step S705, the control unit 120 determines whether to perform varnish application processing on a sheet with an image formed thereon by the image forming apparatus 100 in step S704, based on the processing information acquired in step S702.

If it is determined to perform varnish application processing (YES in step S705), then in step S706, the control unit 120 transmits a signal to the control unit 220 via the communication units 130 and 230 and thus causes the control unit 220 to control the conveyance control unit 240, the varnish application control unit 250, and the varnish hardening control unit 260 to perform varnish application processing by the varnish application apparatus 200.

On the other hand, if it is determined not to perform varnish application processing (NO in step S705), the control unit 120 transmits a signal to the control unit 220 via the communication units 130 and 230 and thus causes the control unit 220 to move the varnish application roller 213 away from the varnish drum 214, thus allowing passage of a sheet. At this time, the sheet is conveyed by the conveyance belts 231 and 233. Furthermore, a configuration in which a conveyance roller pair for pinching and conveying a sheet when the varnish application roller 213 is moved away from the varnish drum 214 is further provided can be employed.

Next, in step S707, the control unit 120 determines whether to perform cutting processing by the slitter apparatus 900 based on the processing information acquired in step S702.

If it is determined to perform cutting processing (YES in step S707), then in step S708, the control unit 120 outputs a signal to the control unit 920 via the communication units 130 and 930 and thus causes the control unit 920 to control the conveyance control unit 940 and the cutting processing control unit 950, thus performing cutting processing by the slitter apparatus 900.

On the other hand, if it is determined not to perform cutting processing (NO in step S707), then in step S709, the control unit 120 determines whether all of the processing operations included in the print signal received in step S701 have ended. If it is determined that all of the processing operations have ended (YES in step S709), the control unit 120 causes the image forming system 7000 to transition to the standby state. Moreover, if it is determined that not all of the processing operations have ended (NO in step S709), the control unit 120 returns the processing to step S704 and then performs each processing operation on a next sheet.

While, in the seventh exemplary embodiment, a configuration in which the control units 220 and 920 operate based on a signal received from the control unit 120 of the image forming apparatus 100 has been described as an example, a configuration in which, after transmission of the processing information in step S703, the control units 220 and 920 perform respective control operations taking, for example, conveyance timing of a sheet as the starting point can be employed. Thus, a configuration in which, in step S703, the control unit 120 transmits processing information including timing for performing varnish application processing to the control unit 220 of the varnish application apparatus 200, in step S705, the control unit 220 determines the presence or absence of execution of varnish application processing, and, in step S706, the control unit 220 controls the varnish application apparatus 200 can be employed. Moreover, a configuration in which, in step S703, the control unit 120 transmits processing information including timing for performing cutting processing to the control unit 920 of the slitter apparatus 900, in step S707, the control unit 920 determines the presence or absence of execution of cutting processing, and, in step S708, the control unit 920 controls the slitter apparatus 900 can be employed.

In this way, in the image forming system 7000, in which the image forming apparatus 100, the varnish application apparatus 200, and the slitter apparatus 900 are connected inline, since the slitter apparatus 900 is arranged on the downstream side of the varnish application apparatus 200, it is possible to perform cutting processing on a sheet with varnish applied thereto.

If, however, the slitter apparatus 900 is connected between the image forming apparatus 100 and the varnish application apparatus 200, as a result, the varnish application apparatus 200 performs varnish application processing on a sheet with cutting processing performed thereon by the slitter apparatus 900.

Accordingly, in a case where a varnish application apparatus 200 for overcoat is connected, a slit portion created by cutting processing performed by the slitter apparatus 900 may be covered by varnish.

Moreover, varnish being applied to the slit portion may smudge a conveyance path.

On the other hand, in the image forming system 7000 in the seventh exemplary embodiment, since the slitter apparatus 900 is connected to the downstream side of the varnish application apparatus 200, it becomes possible to perform cutting processing on a sheet with varnish application processing performed thereto. Accordingly, it is possible to prevent or reduce a slit portion created by cutting processing from being covered by varnish. Moreover, it is possible to prevent or reduce a conveyance path from being smudged due to varnish being applied to the slit portion and prevent or reduce a conveyance failure from occurring due to the smudged conveyance path.

As described above, in the seventh exemplary embodiment, in an image forming system which performs both varnish application processing and processing other than the varnish application processing inline on a sheet with an image formed thereon by an image forming apparatus, it is possible to prevent or reduce a decrease in quality of a printed product and a decrease in productivity due to a conveyance failure and it is possible to produce a printed product which the user desires.

Figure 22:
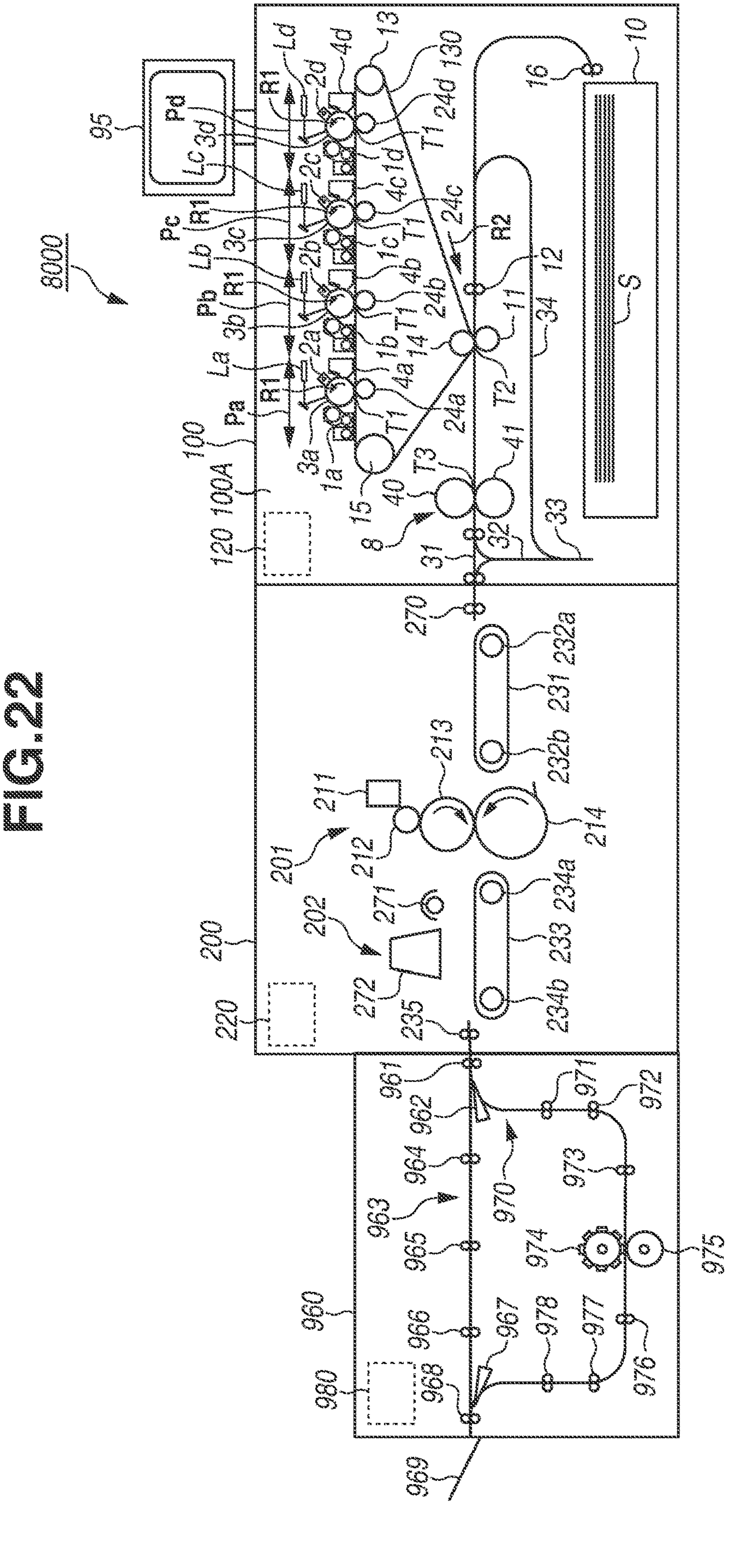
FIG. 22 is an outline sectional view of an image forming system in an eighth exemplary embodiment.

Next, an eighth exemplary embodiment of the present invention is described. As illustrated in FIG. 22, an image forming system 8000 in the eighth exemplary embodiment includes an image forming apparatus 100, which forms an image on a sheet, a varnish application apparatus 200, which applies varnish to a sheet with an image formed thereon, and an embossing apparatus 960, which applies embossing to a sheet. In the eighth exemplary embodiment, the embossing apparatus 960 is an example of a sheet conveyance apparatus.

The image forming apparatus 100, the varnish application apparatus 200, and the embossing apparatus 960 are connected in series and are configured to be able to apply varnish to a sheet conveyed from the image forming apparatus 100 and perform embossment processing on the sheet. Thus, varnish application processing and embossment processing are performed on a sheet during a period from when the sheet is fed by the image forming apparatus 100 to when the sheet is discharged to outside the image forming system 8000.

In the image forming system 8000 in the eighth exemplary embodiment, the image forming apparatus 100 and the varnish application apparatus 200 have respective configurations similar to those in the first exemplary embodiment, and the respective constituent elements thereof are assigned the respective same reference characters and are, therefore, omitted from description. Furthermore, as with the fifth exemplary embodiment, the eighth exemplary embodiment differs from the first to fourth exemplary embodiments in that the varnish application apparatus 200 is connected to the image forming apparatus 100. Accordingly, the receiving roller 270 of the varnish application apparatus 200 conveys a sheet discharged from the image forming apparatus 100 through the discharge conveyance path 31 to the inside of the varnish application apparatus 200. Moreover, a sheet discharged by the discharge roller 235 of the varnish application apparatus 200 is then conveyed to the embossing apparatus 960.

<Embossing Apparatus>

The embossing apparatus 960 performs embossment processing for applying embossing to a sheet.

A sheet discharged by the discharge roller 235 of the varnish application apparatus 200 is conveyed to the inside of the embossing apparatus 960 by a receiving roller 961 of the embossing apparatus 960.

In a case where embossment processing is not included in a print signal which the image forming system 8000 has received, a sheet which is conveyed by the receiving roller 961 is conveyed toward a first conveyance path 963 by a diverter 962 and is then conveyed through the first conveyance path 963 by conveyance rollers 964, 965, and 966. Then, the sheet conveyed by the conveyance roller 966 is guided to a discharge roller 968 by a diverter 967 and is then discharged to a discharge tray 969, which is provided at the embossing apparatus 960, via the discharge roller 968. Thus, the sheet is discharged to the outside of the image forming system 8000.

Moreover, in a case where embossment processing is included in a print signal which the image forming apparatus 100 has received, a sheet which is conveyed by the receiving roller 961 is conveyed toward a second conveyance path 970 by the diverter 962 and is then conveyed through the second conveyance path 970 by conveyance rollers 971, 972, and 973.

Then, the sheet conveyed by the conveyance roller 973 is pinched and conveyed by an embossing roller 974, which has a surface with an unevenness formed thereon, and a receiver roller 975, which is provided opposite to the embossing roller 974. The receiver roller 975 is pressed against the embossing roller 974 by a pressure mechanism (not illustrated), and a nip portion for nipping and conveying a sheet is formed between the embossing roller 974 and the receiver roller 975. Since, in this way, the sheet is conveyed by the nip portion formed by the embossing roller 974 and the receiver roller 975, the sheet becomes deformed in such a way as to coordinate with the unevenness of the surface of the embossing roller 974, so that an unevenness shape is formed on the sheet. An unevenness shape being formed on a sheet in the above-mentioned way is referred to as "embossment processing" in the eighth exemplary embodiment. In the eighth exemplary embodiment, the embossing roller 974 and the receiver roller 975 are an example of a processing unit which performs predetermined processing on a sheet received by the receiving roller 961 and is an example of an embossment processing unit.

The sheet with embossment processing performed thereto by the embossing roller 974 and the receiver roller 975 is conveyed toward the downstream side by conveyance rollers 976, 977, and 978. The sheet conveyed by the conveyance roller 978 is guided toward the discharge roller 968 by the diverter 967 and is then discharged to the discharge tray 969 by the discharge roller 968.

In the eighth exemplary embodiment, the embossing apparatus 960 is connected downstream of the varnish application apparatus 200 in the sheet conveyance direction. As long as this configuration is employed, a configuration in which another processing apparatus such as an inserter, an inspection apparatus, or a decurler apparatus is connected between the image forming apparatus 100 and the varnish application apparatus 200 can be employed.

<Control of Image Forming System>

Figure 23:
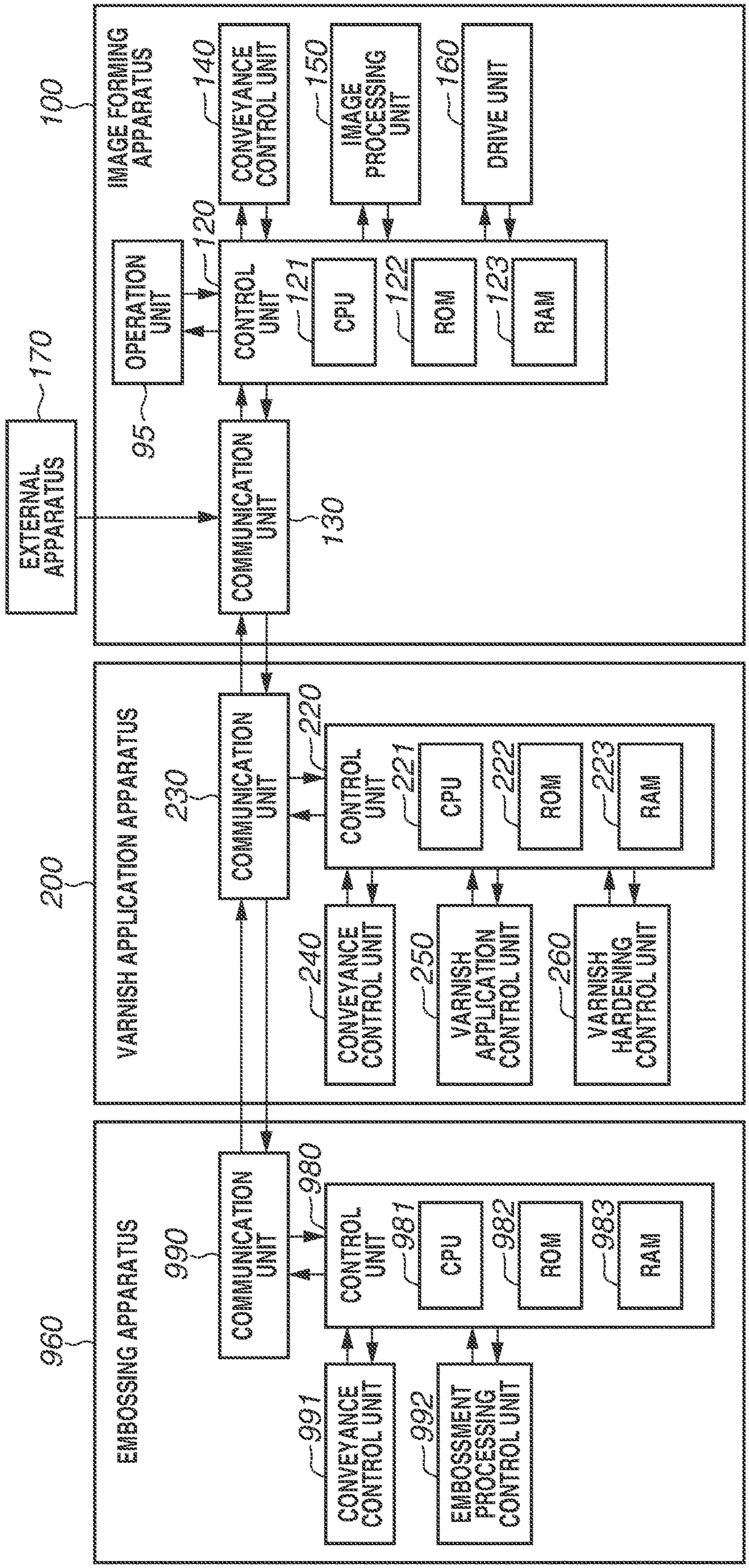
FIG. 23 is a control block diagram in the eighth exemplary embodiment.
Figure 24:
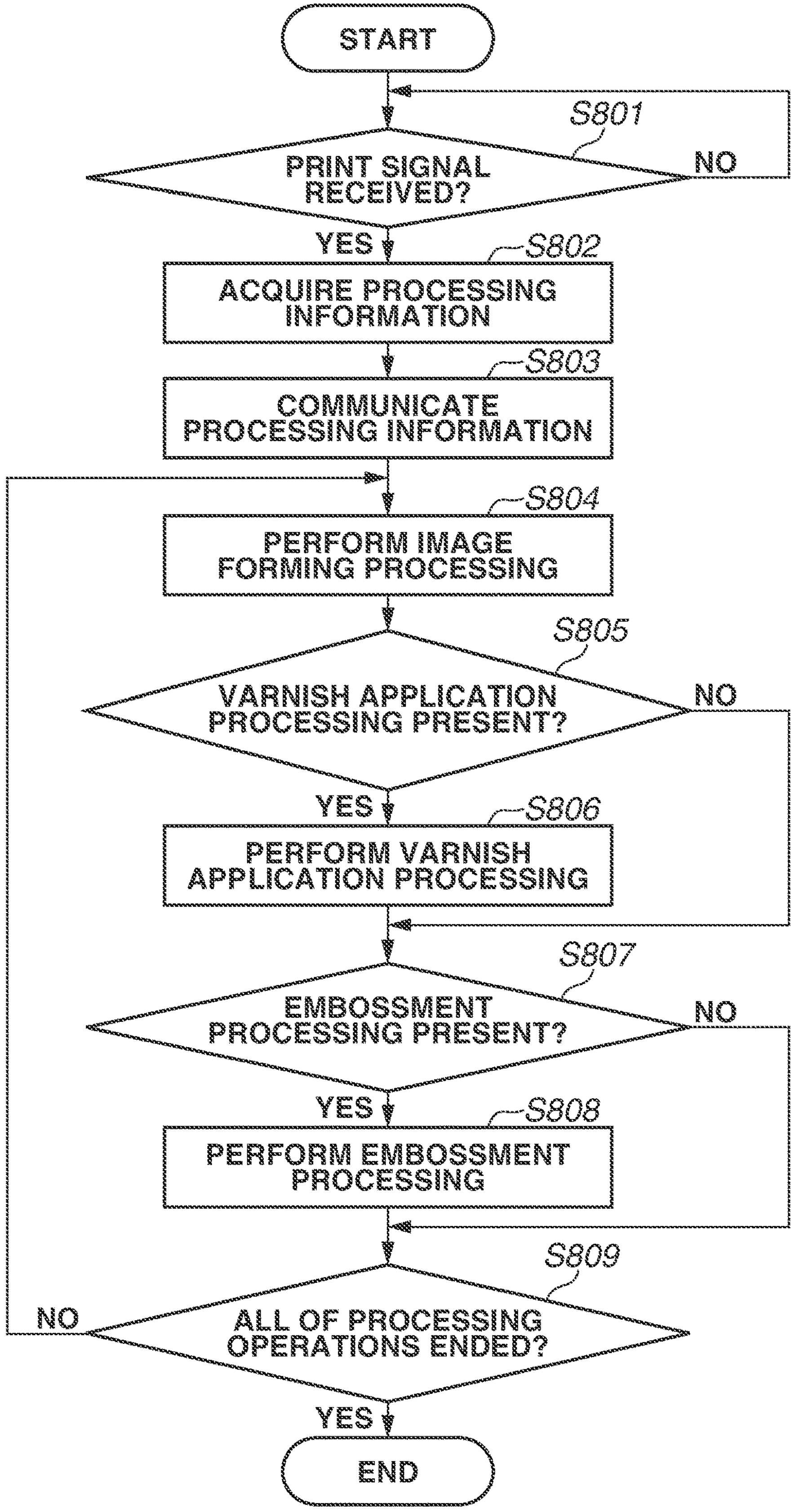
FIG. 24 is a flowchart illustrating a control flow in the eighth exemplary embodiment.

Next, an operation and control of the image forming system 8000 in the eighth exemplary embodiment are described. FIG. 23 is a control block diagram of the image forming system 8000, and FIG. 24 is a flowchart illustrating the control flow of the image forming system 8000 in the eighth exemplary embodiment. In the eighth exemplary embodiment, configurations of the image forming apparatus 100 and the varnish application apparatus 200 are similar to those in the first exemplary embodiment, and the respective constituent elements thereof are assigned the respective same reference characters and are, therefore, omitted from description.

In the image forming system 8000, the image forming apparatus 100 includes a control unit 120, the varnish application apparatus 200 includes a control unit 220, and the embossing apparatus 960 includes a control unit 980. The control units 120, 220, and 980 are configured to be able to communicate with each other via communication units 130, 230, and 990. In the eighth exemplary embodiment, the control unit 120 is an example of a first control unit, the control unit 220 is an example of a second control unit, and the control unit 980 is an example of a third control unit.

The control unit 120 of the image forming apparatus 100 is capable of receiving a print signal from an external apparatus 170 such as a PC via the communication unit 130. Moreover, the control unit 120 is capable of receiving a print signal via the operation unit 95. The print signal, which is a signal generated according to the processing content set by the user, includes, for example, the presence or absence of execution of various processing operations, such as image forming processing, embossment processing, and varnish application processing, the number of sheets to be processed, and the type of a sheet to be processed.

The control unit 980 of the embossing apparatus 960 includes a CPU 981, a ROM 982, and a RAM 983. The ROM 982 stores various programs used for the CPU 981 to control the embossing apparatus 960. The RAM 983 is used as a primary storage region for the CPU 981 to control various programs. Furthermore, the control of the embossing apparatus 960 includes, for example, conveyance control for conveying a sheet conveyed into the embossing apparatus 960 and embossment processing control for controlling, for example, a pressing force and the processing position of the embossing roller 974 and the receiver roller 975.

The control unit 980 of the embossing apparatus 960 controls conveyance units, such as the receiving roller 961, and the conveyance rollers 964 to 966, 971 to 973, and 976 to 978, and the discharge roller 968, via a conveyance control unit 991, thus performing conveyance control of a sheet in the embossing apparatus 960. Moreover, the control unit 980 controls the embossing roller 974 and the receiver roller 975 via an embossment processing control unit 992, thus performing embossment processing on a sheet.

The embossing apparatus 960 is connected to the image forming apparatus 100 via the communication unit 990. When receiving a print signal from the user, the control unit 120 of the image forming apparatus 100 transmits information about, for example, the processing position, the number of sheets, and a pressure force for embossment processing to the embossing apparatus 960 via the communication unit 130. The control unit 980 of the embossing apparatus 960 performs embossment processing on a sheet based on the information received from the control unit 120 of the image forming apparatus 100.

Furthermore, while, in the eighth exemplary embodiment, a configuration in which the embossing apparatus 960 is connected to the communication unit 130 of the image forming apparatus 100 via the communication unit 230 of the varnish application apparatus 200 has been described, another configuration can be employed. For example, a configuration in which the communication unit 990 of the embossing apparatus 960 is directly connected to the communication unit 130 of the image forming apparatus 100 can be employed.

As mentioned above, the image forming apparatus 100, the varnish application apparatus 200, and the embossing apparatus 960 are connected via the communication units 130, 230, and 990. Accordingly, in a case where a print signal has been input to the image forming system 8000, the image forming apparatus 100 transmits a processing content corresponding to the print signal to the embossing apparatus 960 and the varnish application apparatus 200. Moreover, in a case where an abnormality has occurred in the image forming apparatus 100, the image forming apparatus 100 is able to transmit a stop signal for stopping an operation of the varnish application apparatus 200 or the embossing apparatus 960. Additionally, since the communication units 130, 230, and 990 are able to perform bidirectional communication with each other, in a case where an abnormality has occurred in the varnish application apparatus 200 or the embossing apparatus 960, the image forming apparatus 100 is also able to stop an operation thereof in response to receiving information transmitted from the communication unit 230 or 990.

While, in the eighth exemplary embodiment, a configuration in which the entirety of the image forming system 8000 is controlled by the control unit 120 included in the image forming apparatus 100 is described, the present exemplary embodiment does not need to be limited to this configuration. For example, a configuration in which a controller serving as a control unit for controlling the entirety of the image forming system 8000 is provided in a housing different from that of the image forming apparatus 100 and outside of the image forming apparatus 100 can be employed. In this case, the control unit only needs to have a configuration which is connected to the control unit 220 of the varnish application apparatus 200 or the control unit 980 of the embossing apparatus 960 via the control unit 120 of the image forming apparatus 100. Moreover, the controller unit can have a configuration which is directly connected to each of the control units 120, 220, and 980.

Next, a control flow representing a series of operations of image forming processing which is performed by the image forming apparatus 100, varnish application processing which is performed by the varnish application apparatus 200, and embossment processing which is performed by the embossing apparatus 960 in the image forming system 8000 is described.

The control flow illustrated in FIG. 24 is started when a print signal is received in a standby state in which, for example, the adjustment of the entirety of the image forming system 8000 is completed. Here, the standby state is a state in which, in the image forming apparatus 100, the temperature of the fixing device 8 has reached a predetermined temperature available for fixing a toner image and is also a state in which, in response to receiving a print signal, the image forming apparatus 100 is ready to immediately form an image on a sheet. Moreover, the standby state is a state in which, in the varnish application apparatus 200, varnish is being supplied to the varnish application roller 213, is a state in which the heater 271 has reached a predetermined temperature and the radiation force of the UV radiation unit 272 has become a predetermined radiation force, and is also a state in which the varnish application apparatus 200 is ready to apply varnish to a sheet and harden the applied varnish.

If the control unit 120 has received a print signal via the communication unit 130 or the operation unit 95 (YES in step S801), then in step S802, the control unit 120 acquires processing information related to image forming processing, varnish application processing, and embossment processing included in the print signal. Moreover, if the control unit 120 has not received a print signal (NO in step S801), the control unit 120 waits until receiving a print signal, thus maintaining the standby state of the image forming system 8000.

Then, in step S803, based on the processing information acquired in step S802, the control unit 120 transmits processing information related to the presence or absence of embossment processing to the embossing apparatus 960 via the communication units 130, 230, and 990 and transmits processing information related to the presence or absence of varnish application processing to the varnish application apparatus 200. While, here, an example in which the control unit 120 transmits processing information related to the presence or absence of embossment processing and the presence or absence of varnish application processing is described, a configuration in which, only when there are embossment processing and varnish application processing, the control unit 120 transmits each piece of processing information to the embossing apparatus 960 or the varnish application apparatus 200 can be employed.

Next, in step S804, the control unit 120 controls the conveyance control unit 140, the image processing unit 150, and the drive unit 160 based on the processing information acquired in step S802, thus performing image forming processing on a sheet fed from the cassette 10.

Then, in step S805, the control unit 120 determines whether to perform varnish application processing on a sheet with an image formed thereon by the image forming apparatus 100 in step S804, based on the processing information acquired in step S802.

If it is determined to perform varnish application processing (YES in step S805), then in step S806, the control unit 120 transmits a signal to the control unit 220 via the communication units 130 and 230 and thus causes the control unit 220 to control the conveyance control unit 240, the varnish application control unit 250, and the varnish hardening control unit 260 to perform varnish application processing by the varnish application apparatus 200.

On the other hand, if it is determined not to perform varnish application processing (NO in step S805), the control unit 120 transmits a signal to the control unit 220 via the communication units 130 and 230 and thus causes the control unit 220 to move the varnish application roller 213 away from the varnish drum 214, thus allowing passage of a sheet. At this time, the sheet is conveyed by the conveyance belts 231 and 233. Furthermore, a configuration in which a conveyance roller pair for pinching and conveying a sheet when the varnish application roller 213 is moved away from the varnish drum 214 is further provided can be employed.

Next, in step S807, the control unit 120 determines whether to perform embossment processing by the embossing apparatus 960 based on the processing information acquired in step S802.

If it is determined to perform embossment processing (YES in step S807), then in step S808, the control unit 120 outputs a signal to the control unit 980 via the communication units 130 and 990 and thus causes the control unit 980 to control the conveyance control unit 991 and the embossment processing control unit 992, thus performing embossment processing by the embossing apparatus 960.

On the other hand, if it is determined not to perform embossment processing (NO in step S807), then in step S809, the control unit 120 determines whether all of the processing operations included in the print signal received in step S801 have ended. If it is determined that all of the processing operations have ended (YES in step S809), the control unit 120 causes the image forming system 8000 to transition to the standby state. Moreover, if it is determined that not all of the processing operations have ended (NO in step S809), the control unit 120 returns the processing to step S804 and then performs each processing operation on a next sheet.

While, in the eighth exemplary embodiment, a configuration in which the control units 220 and 980 operate based on a signal received from the control unit 120 of the image forming apparatus 100 has been described as an example, a configuration in which, after transmission of the processing information in step S803, the control units 220 and 980 perform respective control operations taking, for example, conveyance timing of a sheet as the starting point can be employed. Thus, a configuration in which, in step S803, the control unit 120 transmits processing information including timing for performing varnish application processing to the control unit 220 of the varnish application apparatus 200, in step S805, the control unit 220 determines the presence or absence of execution of varnish application processing, and, in step S806, the control unit 220 controls the varnish application apparatus 200 can be employed. Moreover, a configuration in which, in step S803, the control unit 120 transmits processing information including timing for performing embossment processing to the control unit 980 of the embossing apparatus 960, in step S807, the control unit 980 determines the presence or absence of execution of embossment processing, and, in step S808, the control unit 980 controls the embossing apparatus 960 can be employed.

In this way, in the image forming system 8000, in which the image forming apparatus 100, the varnish application apparatus 200, and the embossing apparatus 960 are connected inline, since the embossing apparatus 960 is arranged on the downstream side of the varnish application apparatus 200, it is possible to perform embossment processing even on a sheet with varnish applied thereto.

If, however, the embossing apparatus 960 is connected between the image forming apparatus 100 and the varnish application apparatus 200, as a result, the varnish application apparatus 200 performs varnish application processing on a sheet with embossment processing performed thereon by the embossing apparatus 960. In this case, since varnish application processing is performed on a sheet with embossment processing performed thereto, it becomes difficult to apply varnish in a homogeneous manner, so that a printed product which the user desires may be unable to be obtained.

On the other hand, in the image forming system 8000 in the eighth exemplary embodiment, the embossing apparatus 960 is connected to the downstream side of the varnish application apparatus 200, it becomes possible to perform embossment processing on a sheet with varnish application processing performed thereto. Accordingly, since it is possible to perform embossment processing in a state in which varnish is homogenously applied to a sheet, it becomes possible to provide a printed product which the user desires.

Furthermore, while, in the eighth exemplary embodiment, an example in which the surface of a sheet is processed by applying embossment processing to the sheet has been described, the eighth exemplary embodiment can be applied to a processing apparatus which processes the surface of a sheet by applying crease processing, such as creasing, to the sheet. Even in this case, since it is possible to perform crease processing in a state in which varnish is homogenously applied to a sheet, it becomes possible to provide a printed product which the user desires.

As described above, in the eighth exemplary embodiment, in an image forming system which performs both varnish application processing and processing other than the varnish application processing inline on a sheet with an image formed thereon by an image forming apparatus, it is possible to prevent or reduce a decrease in quality of a printed product and it is possible to provide a printed product which the user desires.

According to aspects of the present invention, in an image forming system which performs both varnish application processing and processing other than the varnish application processing inline on a sheet with an image formed thereon by an image forming apparatus, it is possible to prevent or reduce, for example, a decrease in quality of a printed product and a decrease in productivity caused by a conveyance failure.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-138073 filed Aug. 26, 2021, which is hereby incorporated by reference herein in its entirety.

What is claimed is:

1. An image forming system comprising:

an image forming apparatus including an image forming unit configured to perform printing processing to form an image on a sheet as a printed product and a first control unit configured to control the image forming unit;

a varnish application apparatus provided downstream in a sheet conveyance direction with respect to the image forming apparatus, wherein the varnish application apparatus includes a varnish application unit configured to apply varnish to the sheet with the image formed on the sheet by the image forming unit and a second control unit configured to control the varnish application unit; and a sheet processing apparatus provided downstream in the sheet conveyance direction with respect to the varnish application apparatus, wherein the sheet processing apparatus includes an inlet receiving roller configured to receive the sheet discharged from the varnish application apparatus, a processing unit configured to perform predetermined processing on the sheet received by the inlet receiving roller, and a third control unit configured to control the processing unit, wherein the sheet processing apparatus includes an emboss roller configured to have a surface with an unevenness formed on the emboss roller and a nip portion receiving roller configured to form a nip portion with the emboss roller, wherein the sheet processing apparatus includes a first conveyance path which does not convey the sheet to the emboss roller and a second conveyance path which conveys the sheet to the emboss roller, wherein, in a case where a first print instruction for causing the varnish application apparatus to perform varnish application processing and not causing the emboss roller to perform embossing processing is received, the sheet processing apparatus conveys the sheet on which the varnish application apparatus has performed the varnish application processing to the first conveyance path so that the conveyed sheet does not receive the embossing processing by the emboss roller and is discharged to a discharge tray, wherein, in a case where a second print instruction for causing the varnish application apparatus to perform varnish application processing and causing the emboss roller to perform embossing processing is received, the sheet processing apparatus conveys the sheet on which the varnish application apparatus has performed the varnish application processing to the second conveyance path so that the conveyed sheet receives the embossing processing by the emboss roller and is discharged to the discharge tray, wherein the first conveyance path and the second conveyance path branch off from each other at a branching point on an upstream side in the sheet conveyance direction inside the sheet processing apparatus, and merge at a merging point on a downstream side, wherein both a sheet having been conveyed along the first conveyance path and a sheet having been conveyed along the second conveyance path are discharged to the discharge tray that is identical one via the merging point, and wherein the first control unit is capable of communicating with the second control unit and the third control unit.

2. The image forming system according to claim 1, wherein the varnish application unit includes a varnish reservoir portion configured to reserve varnish and an application roller configured to apply varnish supplied from the varnish reservoir portion to a whole surface of the sheet.

3. The image forming system according to claim 1, wherein the varnish application unit includes a varnish reservoir portion configured to reserve varnish and an application portion configured to eject and apply varnish supplied from the varnish reservoir portion to the sheet.

4. The image forming system according to claim 1, wherein the varnish application apparatus further includes a hardening unit configured to harden varnish applied by the varnish application unit.

5. The image forming system according to claim 1, wherein the varnish application apparatus is directly connected to the image forming apparatus.

6. The image forming system according to claim 1, wherein the varnish application apparatus directly conveys the sheet having the varnish-application processed image formed on the sheet to an inside of the sheet processing apparatus including the emboss roller.

* * * * *